(12) United States Patent
Meifu et al.

(10) Patent No.: US 7,290,000 B2
(45) Date of Patent: Oct. 30, 2007

(54) SERVER, USER TERMINAL, INFORMATION PROVIDING SERVICE SYSTEM, AND INFORMATION PROVIDING SERVICE METHOD

(75) Inventors: Yoshinobu Meifu, Kawasaki (JP); Shinichiro Mori, Kawasaki (JP); Keiji Mizuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1116 days.

(21) Appl. No.: 09/809,498

(22) Filed: Mar. 15, 2001

(65) Prior Publication Data

US 2002/0046212 A1    Apr. 18, 2002

(30) Foreign Application Priority Data

Oct. 18, 2000    (JP)    ............... 2000-318537

(51) Int. Cl.
G06F 17/30    (2006.01)
G06F 15/16    (2006.01)

(52) U.S. Cl. ............... 707/101; 707/100; 707/104.1; 709/203

(58) Field of Classification Search ............... 707/3, 707/101, 104.1; 701/200, 207, 209; 709/203; 342/357.06, 357.07, 357.13
See application file for complete search history.

(56) References Cited

U.S. PATENT DOCUMENTS

| | | | |
|---|---|---|---|
| 5,603,054 | A | 2/1997 | Theimer et al. |
| 5,815,411 | A | 9/1998 | Elllenby |
| 5,926,116 | A | 7/1999 | Kitano et al. |
| 6,023,278 | A | 2/2000 | Margolin |
| 6,108,533 | A | 8/2000 | Brohoff |
| 6,173,239 | B1 | 1/2001 | Ellenby |
| 6,411,897 | B1 * | 6/2002 | Gaspard, II ............... 701/209 |
| 6,522,292 | B1 * | 2/2003 | Ellenby et al. ........ 342/357.07 |
| 6,725,155 | B1 * | 4/2004 | Takahashi et al. .......... 701/209 |

(Continued)

FOREIGN PATENT DOCUMENTS

EP    0 785 535    7/1997

(Continued)

OTHER PUBLICATIONS

Notice of Reasons of Rejection dated Feb. 28, 2006, with translation.

(Continued)

*Primary Examiner*—Jeffrey Gaffin
*Assistant Examiner*—Tony "Hassan" Mahmoudi
(74) *Attorney, Agent, or Firm*—Katten Muchin Rosenman LLP

(57) ABSTRACT

The present invention relates to a positional information service. A service center comprises a database for retaining bubble data in which spatial range information in a three-dimensional space is associated with retrieval information for obtaining service information to be provided, an extracting section for extracting, on the basis of positional information transmitted from the user terminal, specified retrieval information corresponding to specified spatial range information including the positional information, of the spatial range related in the database, and a providing section for providing, to the terminal, specified service information corresponding to the specified retrieval information extracted in the extracting section. This enables acquisition of information on a building in a predetermined range from the user terminal position or service information on a store existing in a specified building in a visual range, and further allows precise seizing of the user's moving direction.

25 Claims, 45 Drawing Sheets

U.S. PATENT DOCUMENTS 6,748,317 B2 * 6/2004 Maruyama et al. ......... 701/200
6,789,102 B2 * 9/2004 Gotou et al. ................ 709/203

FOREIGN PATENT DOCUMENTS

| EP | 0 959 418 | | 11/1999 |
|----|-----------|---|---------|
| EP | 0 982 672 | | 3/2000 |
| EP | 1072987 | A1 * | 1/2001 |
| JP | 7-280583 | | 10/1995 |
| JP | 9-297532 | | 11/1997 |
| JP | 10-148535 | | 6/1998 |
| JP | 10-304339 | | 11/1998 |
| JP | 11-66347 | | 3/1999 |
| JP | 11-211993 | | 8/1999 |
| JP | 11-288341 | | 10/1999 |
| JP | 2000-167233 | | 6/2000 |
| JP | 2000-180199 | | 6/2000 |
| JP | 2000-184431 | | 6/2000 |
| JP | 2000-250842 | | 9/2000 |
| JP | 2000-258171 | | 9/2000 |
| WO | 99/42946 | | 8/1999 |
| WO | WO 00/00908 | | 1/2000 |

OTHER PUBLICATIONS

H. Tarumi, et al. "Space Tag: An Overland Virtual System and its Applications" IEEE International Conference on Multimedia Computing & Systems (ICMCS'99), vol. 1, Italy, pp. 207-212, Jun. 1999.

H. Tarumi, et al. "Communications Through Virtual Active Objects Overlaid Onto the Real World" Third International Conference on Collaborative Virtual Environments (CVE 2000), ACM, USA, pp. 155-164, Sep. 2000.

Notice for Reasons of Rejection dated Sep. 13, 2005.

European Search Report dated Oct. 11, 2005.

* cited by examiner

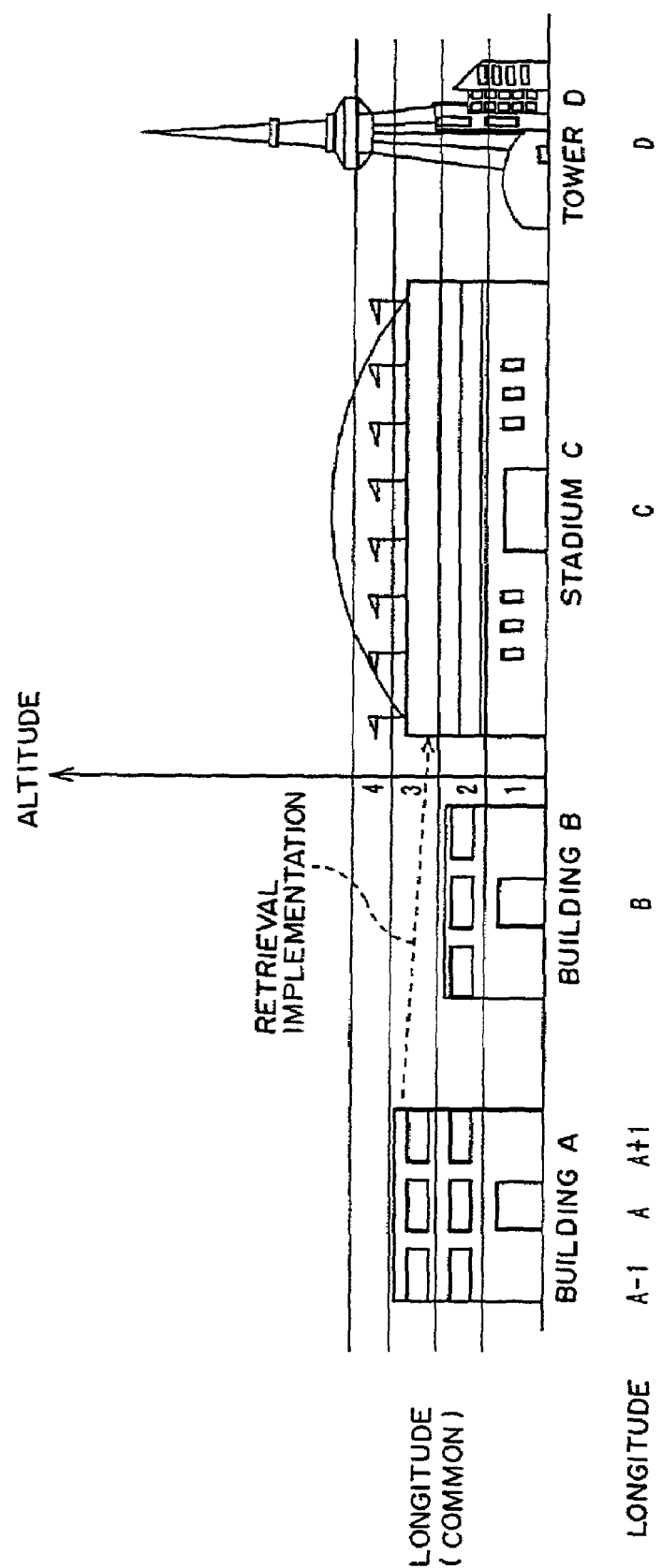

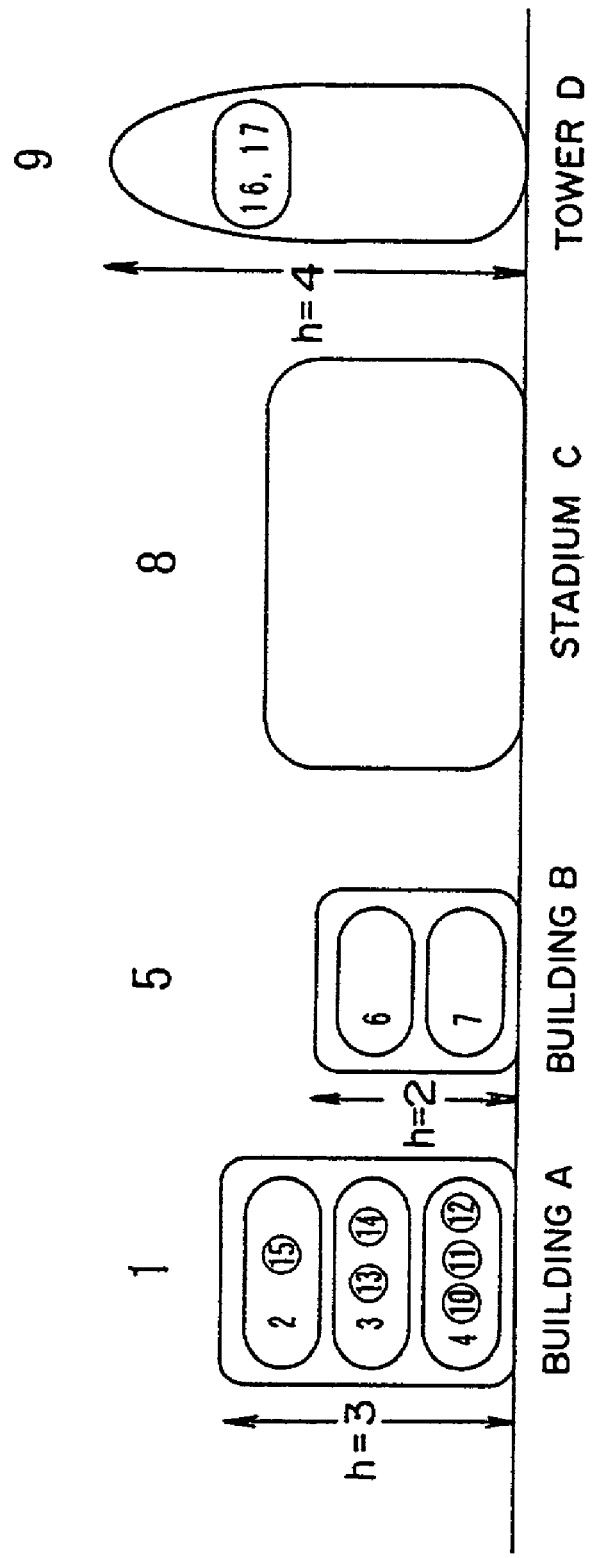

FIG. 8

| BUBBLE NUMBER | SPATIAL OCCUPANCY INFORMATION | URL |
|---|---|---|
| 1 | A/X/0/3 | http://www.xxx.100 |
| 2 | A/X/3/1 | http://www.xxx.101 |
| 3 | A/X/2/1 | http://www.xxx.102 |
| 4 | A/X/1/1 | http://www.xxx.103 |
| 5 | B/X/0/2 | http://www.xxx.200 |
| 6 | B/X/2/1 | http://www.xxx.201 |
| 7 | B/X/1/1 | http://www.xxx.202 |
| 8 | C/X/0/3 | http://www.xxx.300 |
| 9 | D/X/0/4 | http://www.xxx.400 |
| 10 | A-1/X/1/0.5 | http://www.xxx.110 |
| 11 | 1/X/1/0.5 | http://www.xxx.111 |
| 12 | A+1/X/1/0.5 | http://www.xxx.112 |
| 13 | A-1/X/2/0.5 | http://www.xxx.120 |
| 14 | A/X/2/0.5 | http://www.xxx.121 |
| 15 | A/X/3/0.5 | http://www.xxx.130 |
| 16 | D/X/4/0.5 | http://www.xxx.410 |
| 17 | D/X/4/0.5 | http://www.xxx.411 |

FIG. 9

| BUBBLE NUMBER | SPATIAL OCCUPANCY INFORMATION (LATITUDE/LONGITUDE/ ALTITUDE/BUBBLE DIAMETER) | SUBJECT URL | CONTENT NAME |
|---|---|---|---|
| 1 | 149° 22' 20" / 62° 11' 11" /30/5 | http://www.nifty.ne.jp/ gps/user/mori/index.html | BUILDING A |
| 2 | 149° 21' 15" / 62° 09' 04" /15/20 | http://www.nifty.ne.jp/ gps/user/yashi/index.html | BUILDING B (RESTAURANT) |
| 3 | 149° 19' 12" / 62° 14' 07" /50/200 | http://www.nifty.ne.jp/ gps/com/fujitsu/index.html | STADIUM C |
| 4 | | | |

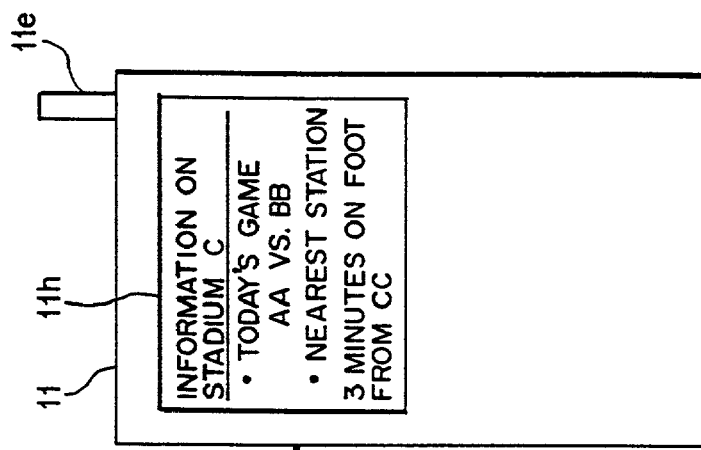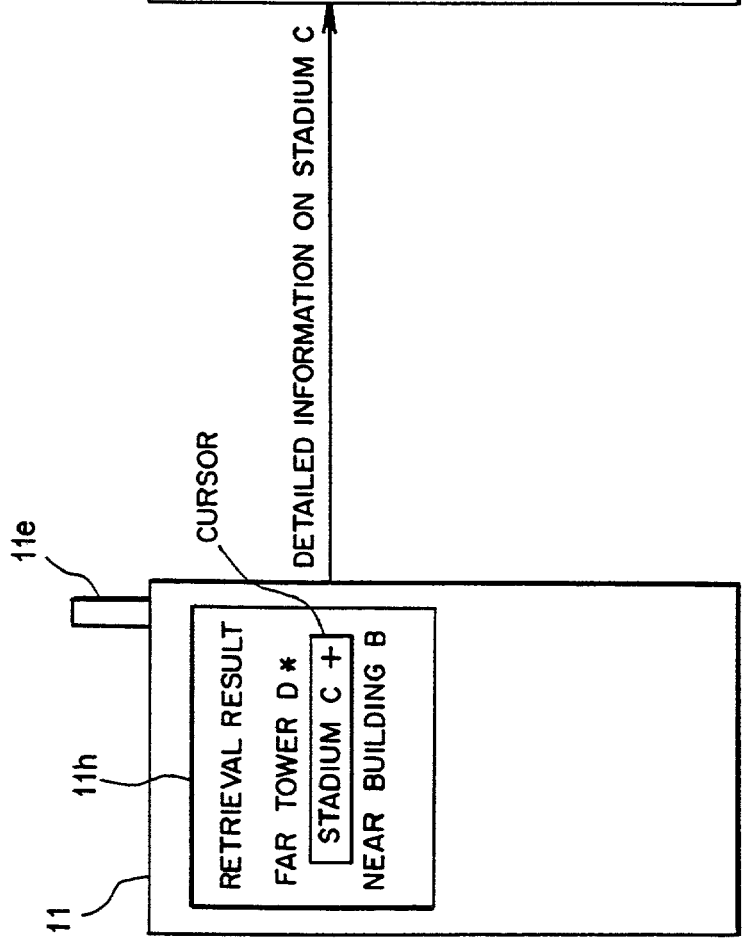

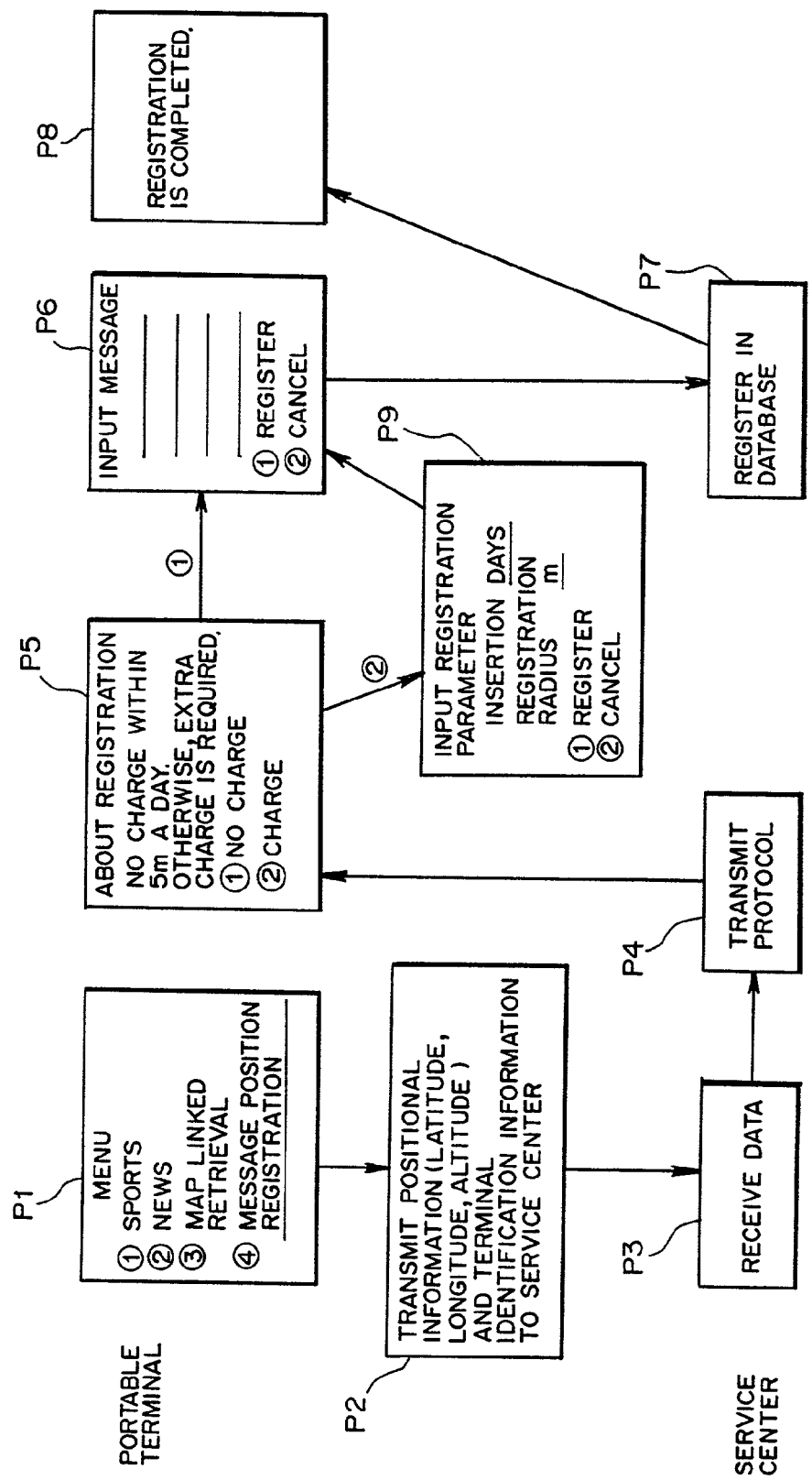

FIG. 16

| BUBBLE DIAMETER (m) | INFORMATION PRESENTATION TIME (DAY) | CHARGE | REMARKS |
|---|---|---|---|
| 5 | ONE DAY<br>TWO WEEKS<br>THREE MONTHS | ¥0<br>¥100<br>¥1000 | USE FOR ATTACHMENT TO INDIVIDUAL<br>USE FOR CIRCLE INVITATION OR THE LIKE<br>MENU OF PERSONAL STORE OR THE LIKE |
| 20 | ONE DAY<br>TWO WEEKS | ¥1000<br>¥5000 | ADVERTISEMENT ON BARGAIN SALE<br>NAVIGATION |
| 50 | ONE DAY<br>ONE WEEK | ¥2000<br>¥10000 | GUIDE TO PLACE OF EVENT |
| 100 | ONE MONTH<br>SIX MONTHS | ¥100000<br>¥500000 | CORPORATION'S ADVERTISEMENT (ENTERPRISE'S PROFILE) |

BUILDING A  BUILDING B  BUILDING C  BUILDING D

BUBBLE DIAMETER

BUILDING A    BUILDING B    BUILDING C    BUILDING D

BUBBLE DIAMETER

BUILDING A   BUILDING B   BUILDING C   BUILDING D

FIG. 26(b)

WAITING SQUARE
① 9/14/18:00
IF YOU FAVOR US WITH YOUR COMPANY AT DRINK, PLEASE CONTACT

TEL 090-4444-7777
② 9/14/19:00
TRAIN SCHED IN FRONT OF STATION
http://www.ekimae.**
③ 9/14/19:00
STORE A START OF BARGAIN 14TH TO 20TH
DETAILS
http://www.rumine.**

} INFORMATION REGISTERED BY INDIVIDUAL

FIG. 26(a)

| SPATIAL OCCUPANCY INFORMATION | URL |
|---|---|
| A/B/0/20 | http://www.aaa.*** |
| A/B/0/1 | http://www.aaa.*** |
| A/B/0/1 | http://www.aaa.*** |

F I G. 42(a)
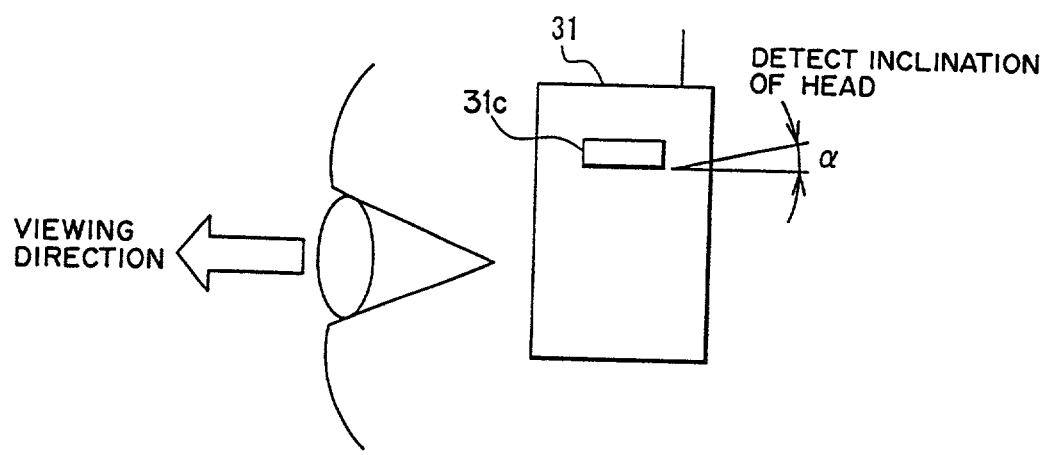
F I G. 42(b)
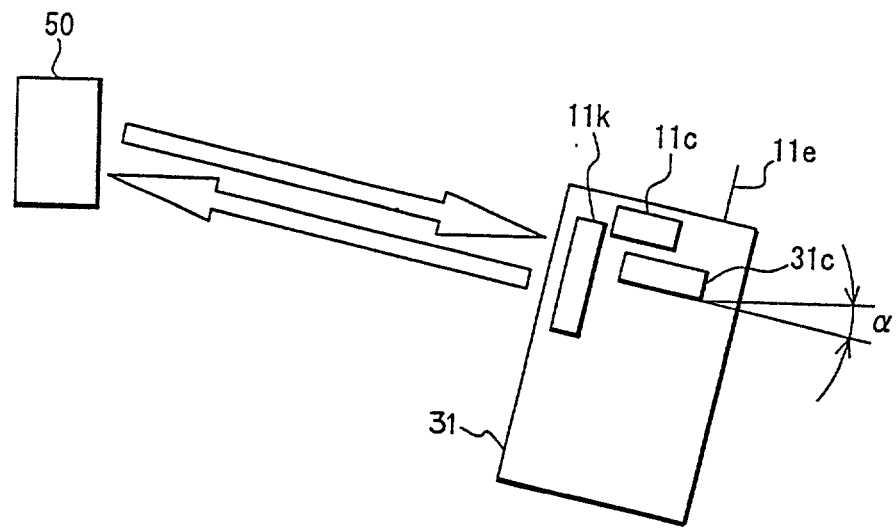

SERVER, USER TERMINAL, INFORMATION PROVIDING SERVICE SYSTEM, AND INFORMATION PROVIDING SERVICE METHOD

BACKGROUND OF THE INVENTION (1) Field of the Invention

The present invention relates to a server, a user terminal, an information providing service system and an information providing service method suitable, for example, for use in a positional information service using portable terminals.

(2) Description of the Related Art

In general, for preservation of electronic data, a user (enterprise, individual) uses a processing device such as a keyboard or a mouse. For signifying his/her intention, the user conducts conversion into another hardware and gives an instruction to the processing device for retrieving or preserving data to the contents to be processed.

Furthermore, in the recent years, the widespread use of portable terminals has prepared mobile environments, which has popularized small-sized GPS (Global Positioning System) modules whereby a position of human beings is measurable, thus providing a variety of services, with a portion thereof being used as a navigation (road guide) service which measures and shows a place a user stands.

However, when retrieving or preserving data, the user is required to once convert user's intention into data in a different format, and in this case, there is a need to process the data in digital form; therefore, the user cannot conduct direct processing, such as placing something appearing in his/her sight on a shelf. That is, a problem exists in that the user cannot make a retrieval, so to speak, with an analog sensation, such as "go toward the north", "relatively right/left" and "somewhat right/forward/backward". This is not familiar with human sensation, thus resulting in a hard-to-use manner.

Accordingly, in data retrieval and preservation, although the manipulation according to an analog sensation is more convenient, the user is forced to conduct the processing in a digital manner, and this digital processing requires special knowledge and experience.

In addition, service for portable terminals mainly involve voice service, and a display thereof is small in size and is not suitable for indication of a position the user exists.

Still additionally, in a navigation service using voice, the user identifies a position by employing a GPS module built in or attached externally to the portable terminal. Thus, in the navigation service, the system side can offer a navigation in the absolute expression such as "go toward the north".

On the other hand, difficulty is encountered in seizing the direction the user faces; hence, the system side cannot show a navigation such as "go straight" in a relative expression taking a user's situation into consideration. For this reason, according to this service, a navigation becomes hard in a case in which difficulty exists in identification of "east", "west", "south" and "north".

Moreover, in a case in which an object, for example, a motor vehicle, travels at a high speed, owing to the Doppler effect occurring between a GPS satellite and a portable terminal, it is possible to seize the user's traveling direction. However, there is a problem in that, when the moving speed is low like walking, or while the user is in a stopping condition, difficulty is experienced in seizing the user or vehicle traveling direction.

Meanwhile, in fact, there are very few of system providers (system operating people or firms) who can invest in high-priced facilities for seizing user' motion.

SUMMARY OF THE INVENTION

The present invention has been developed in consideration of these problems, and it is therefore an object of the invention to provide a server, a user terminal, an information providing service system and an information providing service method, which are capable of, in providing an information service using a portable telephone, acquiring information on a building standing in a predetermined range (of distance) from a user's terminal position, service information on a store existing in the interior of a specific building in a visual range, or the like, and further of seizing a user's moving direction precisely.

For this purpose, in a system which provides information to a user terminal, a server according to the present invention comprises a database for retaining bubble data in which spatial range information in a three-dimensional space is associated with retrieval information for obtaining service information to be provided, an extracting section (unit) for extracting, on the basis of positional information transmitted from the user terminal, specified retrieval information corresponding to specified spatial range information including the positional information, of the spatial range information retained in the database, and a providing section for providing, to the user terminal, specified service information corresponding to the specified retrieval information extracted in the extracting section.

Thus, a user can easily acquire information on a store in auser's visual range, and the user can turn the user terminal at a building in front for obtaining information on goods a store in that building deals in.

Furthermore, a server according to the invention comprises a database for retaining bubble data in which spatial range information including a latitude of an object, a longitude thereof, an altitude thereof and a bubble diameter thereof in a three-dimensional space is associated with an address for acquiring assorted information related to the object or service information related to the assorted information, an extracting section for extracting, on the basis of positional information including a latitude of a user terminal, a longitude thereof, an altitude thereof, a direction thereof and an inclination angle thereof transmitted from the user terminal, a specified address corresponding to specified spatial range information including the positional information, of the spatial range information retained in the database, and a providing section for providing, to the user terminal, specified service information corresponding to the specified address extracted in the extracting section.

Thus, for example, an advertiser can insert an advertisement to users having user terminals, and an information providing service system provider can provide a service while obtaining an advertising revenue, and further a user can acquire service information to his/her heart's content and easily. That is, all the advertiser, service provider and user can gain the benefits.

Still furthermore, a server according to the invention comprises a database for retaining bubble data in which spatial range information including a latitude of a building, a longitude thereof, an altitude thereof and a bubble diameter thereof in a three-dimensional space is associated with a uniform resource locator for acquiring facility information related to the building or service information related to the facility information, an extracting section for extracting, on the basis of positional information including a latitude of a user terminal, a longitude thereof, an altitude thereof, a direction thereof and an inclination angle thereof transmitted from the user terminal, a specified uniform resource locator corresponding to specified bubble data including the positional information, of the bubble data retained in the database, and a providing section for providing, to the user terminal, specified service information corresponding to the specified uniform resource locator extracted in the extracting section.

Thus, a user can easily obtain information on a subject to be retrieved, such as a building, each floor of a building or a sign, and the system provider can provide service information without investing in high-priced facilities.

In this case, it is also possible that a web information outputting section is provided to hold user information and an address generating section is provided to generate an address retaining the user information held in the web information output section.

In this way, a list of uniform resource locators is manageable, which precisely provides service information corresponding to a subject to be retrieved.

In addition, a server according to the invention comprises a database for retaining bubble data in which spatial range information including a latitude of a target, a longitude thereof, an altitude thereof and a bubble diameter thereof in a three-dimensional space is associated with an message information retaining address established in a range of the bubble diameter, an extracting section for extracting message information retained in the database on the basis of positional information including a latitude of a user terminal, a longitude thereof, an altitude thereof, a direction thereof and an inclination angle thereof transmitted from the user terminal, and a providing section for providing, to the user terminal, the message information extracted in the extracting section.

Thus, a large number of users can register their own information, and a service information providing system provider can offer a personally high value added service in a business sense, and a user can get a higher value added service.

In this case, it is also appropriate that the database is designed to sequentially update the bubble diameter of the bubble data on the basis of positional information transmitted from a moving object. This enables a user to obtain fine information.

Moreover, it is also appropriate that the database sets an address based on the spatial range information as an electronic mail address, and retains the spatial range information in corresponding relation to the electronic mail address.

In this way, a user can obtain information easily and fast.

Still moreover, it is also appropriate that the database retains, as the bubble data, service information on a public transportation terminal and information on transportation time. This enables a user to obtain a precise time easily, and the user to obtain useful information from the external without entering a station to see a railroad schedule or a guide plate.

In addition, it is also possible that the database is designed to update the information on transportation time according to the present time. This enables the user to obtain more accurate transportation time, thus accomplishing an improved service.

Furthermore, in accordance with another aspect of the invention, there is provided a user terminal comprising a detecting section for detecting positional information on an object, a transmitting section for transmitting the positional information detected in the detecting section to a server, a receiving section for receiving, in connection with the positional information transmitted from the transmitting section, specified service information corresponding to specified spatial range information including the positional information, of spatial range information in a three-dimensional space transmitted from the server, and a displaying section for displaying the specified service information received in the receiving section.

This permits retrieval according to analog sensation based on human sensation.

Still furthermore, a user terminal according to the invention comprises a detecting section for detecting positional information including a latitude of an object, a longitude thereof, an altitude thereof, a direction thereof and an inclination angle thereof, a transmitting section for transmitting the positional information detected in the detecting section to a server, a receiving section for receiving, in connection with the positional information transmitted from the transmitting section, specified service information corresponding to specified spatial range information including the positional information, of the spatial range information comprising a latitude of an object, a longitude thereof, an altitude thereof and a bubble diameter thereof in a three-dimensional space transmitted from the server, and a displaying section for displaying the specified service information received in the receiving section.

Thus, this enables retrieval according to analog sensation based on human sensation.

In addition, a user terminal according to the invention comprises a detecting section for detecting positional information including a latitude of the terminal, a longitude thereof, an altitude thereof, a direction thereof and an inclination angle thereof, a transmitting section for transmitting the positional information detected in the detecting section to a server, a receiving section for receiving, in connection with the positional information transmitted from the transmitting section, specified service information corresponding to specified spatial range information including the positional information, of the spatial range information comprising a latitude of an object, a longitude thereof, an altitude thereof and a bubble diameter thereof in a three-dimensional space transmitted from the server, and a displaying section for displaying the specified service information received in the receiving section.

Thus, a user can easily acquire information on a store in auser's visual range, and the user can turn the user terminal at a building in front for obtaining information on goods a store in that building deals in.

In this case, it is also appropriate that the detecting section is composed of a direction sensor for measuring a direction and a satellite information receiving section for receiving satellite information through the use of a global positioning system. This enables seizing a user's moving direction not only when a user's moving speed is high but also when the user is in a low-speed moving condition or in a stopping condition.

Moreover, it is also appropriate that the detecting section includes an inclination sensor made to measure an inclination angle of a user terminal with respect to the horizontal line, which enables, for example, a restaurant to realize a service without preparing special equipment.

Still moreover, it is also appropriate that the user terminal further comprises a hand-in-use discriminating section for detecting the number of fingers on a housing of the user terminal to make a decision on a hand of a user being used.

This can reduce the volume of information on a direction of the user terminal, to be transmitted to the server.

In addition, it is also appropriate that the user terminal further comprises a voice guide section for conducting a guide to a place for the specified service information, received in the receiving section, through the use of a voice file. This can reduce the volume of data to be transmitted from the server to the user terminal.

Furthermore, in accordance with a further aspect of the invention, there is provided an information providing service system comprising a server made to retain bubble data in which spatial range information including a latitude of an object, a longitude thereof, an altitude thereof and a bubble diameter thereof in a three-dimensional space is associated with an address holding service information related to assorted information related to the object or the assorted information and a user terminal connected through a network to the server for displaying assorted information retrieved through the use of the bubble data, wherein the server includes a database for retaining bubble data in which the spatial range information is associated with retrieval information for retrieving service information to be provided, an extracting section for extracting, on the basis of positional information transmitted from the user terminal, specified retrieval information corresponding to specified spatial range information containing the positional information, of the spatial range information retained in the database, and a providing section for providing, to the user terminal, specified service information corresponding to the specified retrieval information extracted in the extracting section, while the user terminal includes a detecting section for detecting the positional information, a transmitting section for transmitting the positional information detected in the detecting section to the server, a receiving section for receiving the specified service information retained in the server in connection with the positional information transmitted from the transmitting section, and a displaying section for displaying the service information received in the receiving section.

Thus, a user can easily retrieve, with analog sensation, a thing in a building in a visual range the user shows interest in, and the user can obtain information on manufactures, natural things and celestial sphere existing in a direction the user designates, and additionally acquire character, image and voice data, and others, on the object to be retrieved.

In this case, it is also appropriate that the transmitting section is designed to transmit a user's viewing direction (line of vision) detected on the basis of an inclination angle of the user terminal with respect to the horizontal line and the server is designed to retrieve a desired subject on the basis of the viewing direction. This achieves automatic detection of the inclination angle of the user terminal so that the user can expect smooth voice guide service.

Furthermore, in accordance with a further aspect of the invention, there is provided an information providing service method comprising a measuring step in which a user terminal measures positional information including its own latitude, longitude, altitude, direction and inclination angle, a measured information transmitting step in which the user terminal transmits, to a server, the positional information measured in the measuring step and a retrieval condition, a retrieving step in which the server retrieves, on the basis of the positional information transmitted in the measured information transmitting step, a plurality of specified service information of a plurality of bubble data in which spatial range information including a latitude of an object, a longitude thereof, an altitude thereof and a bubble diameter thereof in a three-dimensional space is associated with an address for obtaining assorted information related to the object or a service information related to the assorted information, and a retrieval result notifying step in which the server notifies the user terminal of the plurality of specified service information retrieved in the retrieving step.

Thus, a user can accept a high-value added service, and, for example, a system provider can advertise enterprise.

In this case, it is also appropriate that the retrieving step includes an extracting step of extracting a second information bubble from a plurality of information bubbles representative of images of spatial occupancy information of bubble data under a first condition on the basis of the positional information and the spatial range information of the bubble data, an address extracting step of selecting a third information bubble from the second information bubble, extracted in the extracting step, under a second condition for extracting a uniform resource locator corresponding to the third information bubble, and a selecting step of selecting and outputting the specified service information corresponding to the uniform resource locator extracted in the address extracting step. This permits setting of a condition according to service.

In addition, the foregoing retrieving step can also perform the extraction and outputting as stated in the following (1) to (5).

(1) From the plurality of information bubbles, an intersection information bubble intersecting a retrieval vector representative of a direction of the user terminal toward a subject to be retrieved is extracted as the second information bubble. In this case, the user can easily retrieve a building appearing in sight without depending on the size of the building.

(2) The extracting step is made to extract a bubble, positioned in a direction of the retrieval vector, as the second information bubble from the plurality of information bubbles, and the selecting step is made to output all the second information bubbles. In this case, a building owner, even if his/her own building is smaller in size than other buildings, can set a larger bubble diameter so that the hit ratio of the building becomes higher than those of the other buildings, which achieving the retrieval without depending on the dimension of buildings.

(3) The selecting step is made to output, of the second information bubble, a bubble existing in a predetermined range, which allows the user to conduct a narrow-down retrieval for obtaining desired service information.

(4) The extracting step is made to extract, as the object, the first visible object in a direction the user terminal takes, through the use of map data. This enables data extraction in consideration of more accurate location so that the user can retrieve a building in his/her visual range.

(5) The extracting step is made to extract the second information bubble taking configuration and location of a subject to be retrieved into consideration. With this arrangement, the actual dimension reappears, which permits accurate retrieval of a building the user wants to retrieve, and which allows reliable extraction of information on the nearest building.

Furthermore, it is also appropriate that, after the retrieval result notifying step, there are provided a selected information transmitting step in which the user terminal transmits, of the plurality of specified service information notified in the retrieval result notifying step, service information selected by the user to the server and a displaying step in which the user terminal displays the service information selected in the selected information transmitting step. This enables the user to directly obtain useful information on a building appearing in sight.

Still furthermore, it is also acceptable that the retrieval result notifying step is made to give, to a user, information including characters, images or voice, on a subject to be retrieved. This improves operability.

In addition, an information providing service method according to the invention comprises a measuring step in which a user terminal measures positional information including its own latitude, longitude, altitude, direction and inclination angle, a measured information transmitting step in which the user terminal transmits the positional information measured in the measuring step to a server, and a registering step in which the server writes, in a database, the positional information transmitted in the information transmitting step and information on a subject to be retrieved.

Thus, the user can fetch information on a target appearing in sight with extreme ease.

In this case, it is also possible that the measuring step is made such that the user terminal is aligned with an information presenting tower forming the subject to be retrieved, and the information transmitting step is made to transmit a desired message inputted by a user. With this arrangement, for example, a user can leave a message for another user the user is to meet by appointment.

Still additionally, an information providing service method according to the invention comprises a map information acquiring step in which a communication terminal acquires map information, a service providing place selecting step in which the communication terminal selects a desired service providing place from the map information acquired in the map information acquiring step, and a generating step in which a server connected through a network to the communication terminal generates bubble data in association with the place selected in the service providing place selecting step. This enables registration through various types of communication terminals, which enhances the degree of convenience.

Further, a server according to the invention comprises a database for retaining bubble data in which region range information in a two-dimensional space is associated with retrieval information for obtaining service information to be provided, an extracting section for extracting, on the basis of positional information transmitted from the portable terminal, specified retrieval information corresponding to specified region range information including the positional information, of the region range information retained in the database; and a providing section for providing, to the portable terminal, specified service information corresponding to the specified retrieval information extracted in the extracting section.

Thus, a user can easily acquire information on a store in a user's visual range, and the user can turn the user terminal at a building in front for obtaining information on goods a store in that building deals in.

BRIEF DESCRIPTION OF THE DRAWINGS

FIG. 6 illustratively shows an arrangement of buildings for explaining the first embodiment of the invention;

FIG. 7 is an illustration of an image of spatial occupancy information of bubble data according to the first embodiment of the invention;

FIG. 8 is an illustration useful for explaining bubble data according to the first embodiment of the invention;

FIG. 9 is an illustration useful for explaining another bubble data according to the first embodiment of the invention;

FIGS. 13(a) and 13(b) are illustrations of one example of information display according to the first embodiment of the invention;

FIG. 14 is a sequence illustration useful for explaining registration in an information providing service system according to the first embodiment of the invention;

FIG. 16 is an illustration useful for explaining a charge system of bubble data according to the first embodiment of the invention;

FIG. 26(a) is an illustration of one example of bubble data according to the first modification of the first embodiment of the invention;

FIG. 26(b) is an illustration of one example of information display according to the first modification of the first embodiment of the invention;

FIGS. 42(a) and 42(b) are illustrations useful for describing an inclination angle detecting method according to the third embodiment of the invention;

DESCRIPTION OF THE PREFERRED EMBODIMENTS

Embodiments of the present invention will be described hereinbelow with reference to the drawings.

(A) Description of First Embodiment of the Invention

Figure 1:
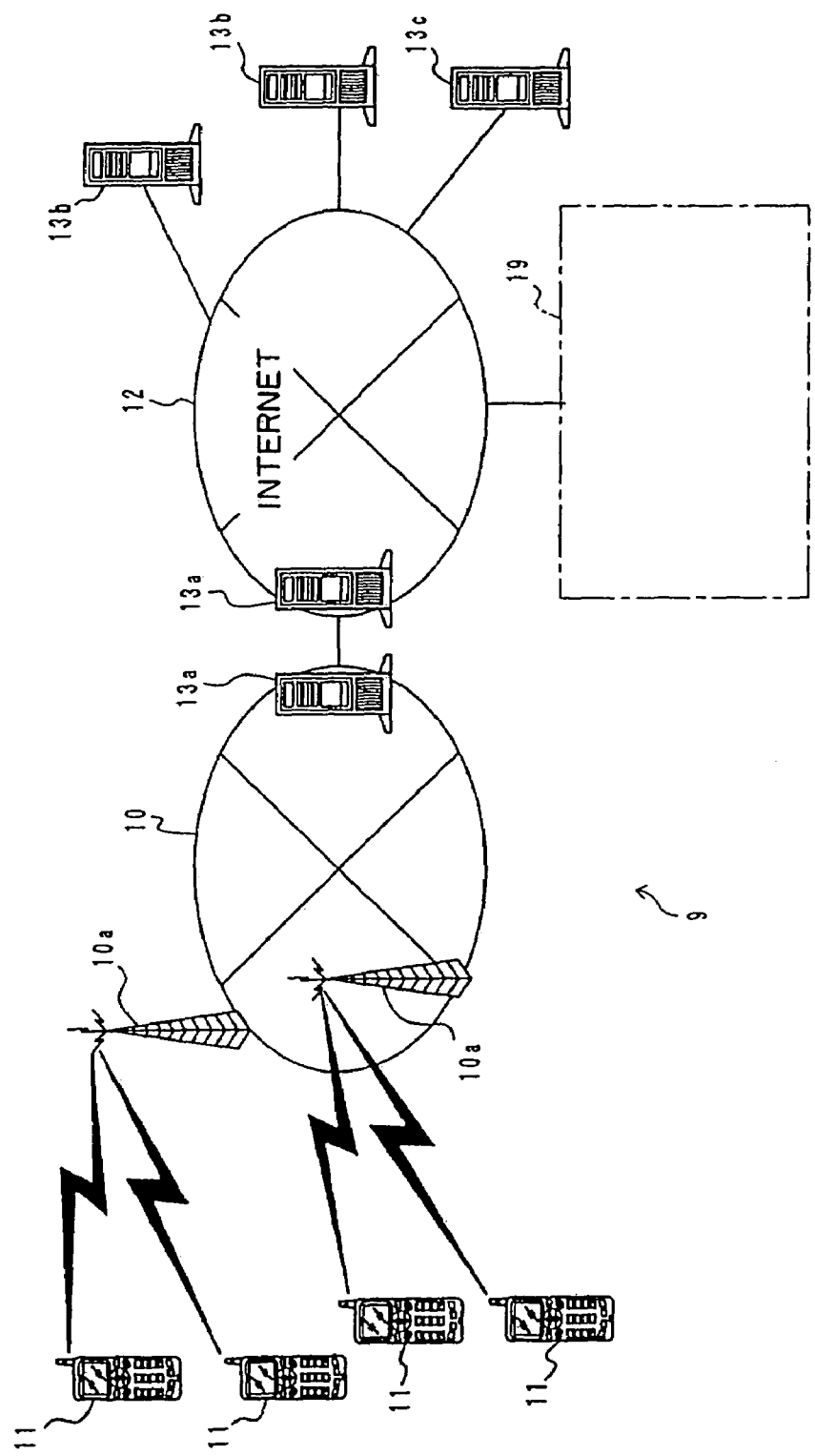
FIG. 1 is an illustration of a configuration of a system to which the present invention is applicable.

FIG. 1 is an illustration of a configuration of a system to which the present invention is applicable. In FIG. 1, an information providing service system (which sometimes will be hereinafter referred to simply as a "system"), designated generally at reference numeral 9, is for providing information to user terminals, and is equipped with a service center 19 and a plurality of portable terminals 11 while being connected to radio base stations (radio towers) 10a, a radio network 10, a gateway server 13a, an internet 12, web servers 13b, a DNS (Domain Name System) server 13c and others.

This system 9 renders the following two kinds of services (1) and (2) in addition to a telephone service and others.

(1) A service (which will sometimes be referred to hereinafter as a "service 1") for displaying, on the portable terminal 11, information on a plurality of buildings existing in a predetermined range and in a direction toward which the portable terminal 11 is faced. For example, when facing the portable terminal 11 toward a desired direction, a user can obtain information on buildings in a range of 100 m from its position.

(2) A service (which will sometimes be referred to hereinafter as a "service 2") for displaying, on the portable terminal 11, information on a specified building designated by the portable terminal 11. For example, a user can face the portable terminal 11 toward one building existing in front for acquiring information on goods a store in that building deals in.

That is, according to the service 1, the user can get information on buildings standing in a range of 100 m from the user, while according to the service 2, the user can obtain information on the first building visible in a user's viewing (line of vision) direction.

In FIG. 1, the radio network 10 belongs to a mobile communication system put in operation by an enterpriser (a communication carrier).

The service center 19 includes a server which retains bubble data in which mapping (association) is established between an object (for example, an actually existing object such as a building, each floor of a building and an advertising sign in a three-dimensional space, or an object traveling in a space) or spatial occupancy information (spatial range information or spatial region information) including a latitude of a desired space, a longitude thereof, an altitude thereof and a bubble diameter thereof, which will be described later, and assorted information related to that object or a URL (Uniform Resource Locator) related to the assorted information. In addition, this server can also include bubble data in which correspondence is set up between spatial occupancy information on a desired space and assorted information to be related to the desired space or a URL related to the assorted information. The aforesaid spatial occupancy information signifies a specified space in a three-dimensional space, and the term "bubble" is derived from a state where the specified space floats like a bubble in the three-dimensional space, with the actual building being regenerated through the use of the bubble. In general, although a bubble is associated in our minds with a spherical configuration, the bubble taken here is not particularly limited to the sphere.

Furthermore, each of the portable terminals (user terminals) 11, such as a portable telephone, is connected through the internet 12 to the service center 19 and is for displaying various kinds of information retrieved on the basis of that bubble data. Moreover, the portable terminal 11 is a subscriber's terminal of the radio network 10, and is made to gain free access to the service center 19.

Each of the radio base stations 10a is connected to each of the portable terminals 11 and the radio network 10 to accomplish interchange of a radio signal therewith. Moreover, each of the gateway servers 13a permits the passage of only a signal outputted from a server having a desired URL, and the internet 12 is constructed such that a large number of servers employing the hypertext transfer protocol (http) are connected to each other. Still moreover, each of the web servers 13b is for retaining the contents of individuals, enterprises and others, with one example of the contents being shown in FIG. 10, and the DNS server 13c is for outputting an IP (Internet Protocol) address corresponding to a host name.

Incidentally, the system 9 in FIG. 1 has a configuration similar to those in each modification of the first embodiment, the second embodiment, the third embodiment and each modification of the third embodiment, which will be described later.

Figure 2:
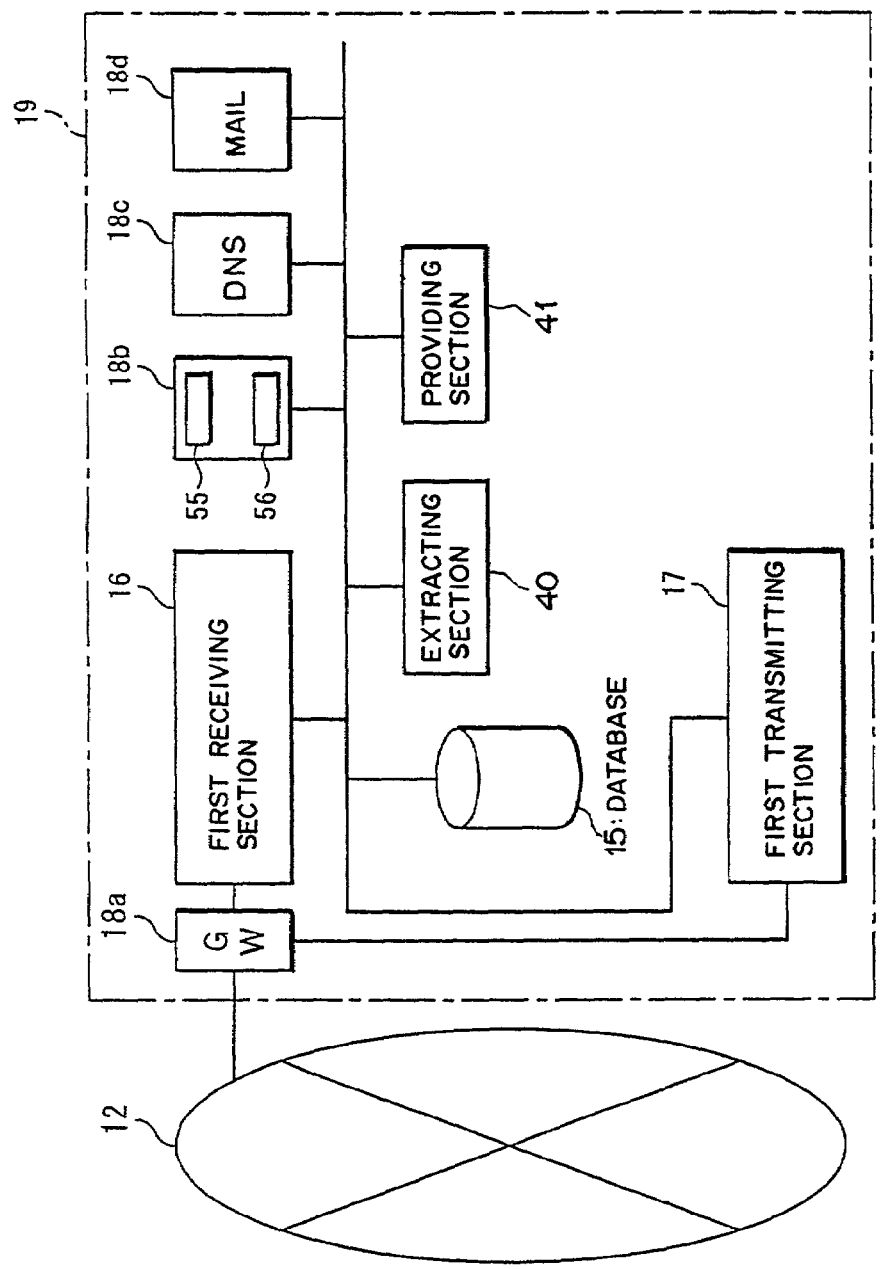
FIG. 2 is a block diagram showing a service center according to a first embodiment of the invention.

FIG. 2 is a block diagram showing the service center 19 according to a first embodiment of the present invention.

As an example according to the first embodiment, a description will be given hereinbelow of a configuration in which one server comprising the following sections constitutes a service center.

In FIG. 2 the service center 19 is made up of a database 15, a first receiving section 16, a first transmitting section 17, an extracting section 40, a providing section 41, a web information outputting section 18b, a gateway section (GW) 18a, a DNS (Domain Name Server) section 18c and a mail transmitting/receiving section 18d.

The database (spatial occupancy information/URL database) 15 retains bubble data in which spatial occupancy information comprising a latitude of an object, a longitude thereof, an altitude thereof and a bubble diameter thereof in a three-dimensional space is associated with assorted information related to the object or a URL for acquiring service information related to the assorted information. In addition, the database 15 has three-dimensional geographic data for processing the spatial occupancy information. Incidentally, the database 15 is not necessarily located in the service center 19, but it is also possible that the database 15 is put in a server existing at a different place and connected to the internet 12. Still incidentally, although not shown, this database function is realizable by a hard disk, a ROM (Read Only Memory), a RAM (Random Access Memory) and other devices.

Furthermore, the assorted information related to the object is facility information concerned with buildings, for example, information on buildings, the Tokyo tower, stores in the buildings and others, or information on public transportation such as stations. Still furthermore, the service information related to the assorted information is service information concerned with the facility information, for example, information on enterprise manufactured products in their own enterprise buildings, information on business hours of the Tokyo tower, information on menu of restaurants or eating houses in buildings, or railroad schedule information. In this case, the URL functions as an address for obtaining the service information. In the following description, if not emphatically said, these will be used in similar meanings. Taking the facilitation of the construction of the database 15 into consideration, it is more efficient that the database 15 is constructed in a manner that the spatial occupancy information and the assorted information are not associated directly with each other but the spatial occupancy information is associated with the URL.

FIG. 8 is an illustration useful for explaining data in the database 15 according to the first embodiment of the present invention.

In FIG. 8, the spatial occupancy information is information on objects such as a buildings registered in advance by building owners, enterprises, restaurants or the like, and in the bubble data, latitude/longitude/altitude/bubble diameter are expressed as A/X/0/3, respectively. In addition, through each URL, the contents in which service information to be provided is written is easily retrievable. In other words, a web site for indicating service information concerned with an object is held in conjunction with the URL.

For rendering the foregoing service 1, when receiving positional information and retrieval range transmitted from a portable terminal 11, the service center 19 retrieves the bubble data corresponding to a building designated by a user through the use of that positional information, and retrieves a plurality of buildings, for example, standing in a range of 100 m from the position of the portable terminal 11 to the north to acquire a plurality of URLs corresponding to each of the plurality of buildings for sending each of the contents held in the plurality of URLs to the portable terminal 11.

Thus, the service center 19 can provide service information on the buildings standing within the range of 100 m from a user.

In more detail, on the basis of the positional information, the service center 19 retrieves the bubble data through the use of a retrieval vector V. This retrieval vector V is a vector directed from a terminal position to a subject to be retrieved (retrieval subject), such as building, store and temple. In addition, the service center 19 generates the retrieval vector V on the basis of the positional information transmitted from the portable terminal 11, and outputs, a retrieval result, a plurality of information bubbles (image of spatial occupancy information of bubble data) intersecting the retrieval subject direction retrieval vector V. Incidentally, the service center 19 can also select, of a plurality of information bubbles, service information on stores existing in the interior of one building standing in a predetermined range to send the service information to the portable terminal 11.

In addition, for rendering the foregoing service 2, when receiving positional information transmitted from the portable terminal 11, the service center 19 similarly generates a retrieval vector V on the basis of the terminal position and direction, and retrieves information bubbles intersecting first with the retrieval vector V for sending, to the portable terminal 11, the contents such as lunch menu of restaurants. Accordingly, for example, the service center 19 can offer service information on stores designated by users.

Still additionally, as will be described later with reference to FIG. 7 or and other figures, an image of the spatial occupancy information has a spherical configuration, elliptical (oval) configuration or rectangular pole configuration conforming to the volume of a building in a space, and this configuration can be registered in various modifications. In addition, the image is not limited to closed spaces (occupied spaces) but being set as a portion of a predetermined range in a space or as a one-side infinite range.

This is equivalent to the effect that, when bubble data is written in the database 15, an image (information bubble) of spatial occupancy information of the bubble data appears, while, on removal of the bubble data from the database 15, the information bubble disappears.

Furthermore, in FIG. 2, the first receiving section 16 is for receiving positional information including latitude, longitude, altitude, direction (azimuth) and inclination angle transmitted from the portable terminal 11. This function is realizable by an input port, a CPU (Central Processing Unit: not shown), a ROM, a RAM and others included in a personal computer or work station.

The extracting section 40 is for extracting a specified URL (signifying specified address or specified retrieval information) corresponding to specified spatial occupancy information including positional information, of spatial occupancy information retained in the database 15 (intersecting the aforesaid retrieval vector V), on the basis of positional information including a latitude of the portable terminal 11, a longitude thereof, an altitude thereof, a direction thereof and an inclination angle thereof transmitted from the portable terminal 11.

The providing section 41 is for providing, to the portable terminal 11, specified service information corresponding to the specified URL extracted by the extracting section 40. This providing section 41 can also provide (transmit) a URL or a content name corresponding to the URL to the portable terminal 11, as will be described later. Thus, a user can get information on a desired retrieval subject, and complicated retrieval becomes unnecessary.

The first transmitting section 17 (see FIG. 2) is for selecting, on the basis of positional information from the portable terminal 11 received in the first receiving section 16, bubble data/URL corresponding to the positional information from a plurality of bubble data/URLs retained in the database 15 to transmit, to the portable terminal 11, service information indicated in a web site corresponding to that URL. This function is realizable by an output port, a CPU, a ROM, a RAM and others included in a personal computer or work station.

The web information outputting section 18$b$ is for retaining contents (see FIG. 10) such as individuals and restaurants, and is composed of a URL generating section (address generating section) 55 and a message storing section 56. This URL generating section 55 is for generating a URL which holds service information on the individuals, enterprises and others retained in the web information outputting section 18$b$. Therefore, the service center 19 can manage a list of URLs through the use of the URL generating section 55, thus providing precise service information corresponding to a retrieval subject. The message storing section 56 will be described later in a first modification of the first embodiment of the invention.

The DNS section 18$c$ has a conversion table between a host name and an IP address and outputs an IP address corresponding to a host name received. The mail transmitting/receiving section 18$d$ is for transmitting and receiving an electronic mail (which sometimes will hereinafter be referred to simply as a "mail"), and has a function to associate four kinds of information of latitude, longitude, altitude and bubble diameter with mail addresses as will be described later in the second embodiment. The gateway section 18$a$ exhibits a well-known gateway function.

Incidentally, each of these functions is realizable by a cooperative operation of a CPU, a ROM, a RAM and other devices. Moreover, each of modifications of the first embodiment, the second embodiment, the third embodiment and a modification of the third embodiment, which will be described later, have a similar configuration. Still moreover, the respective functions of the service center 19 can also be distributed.

Figure 3:
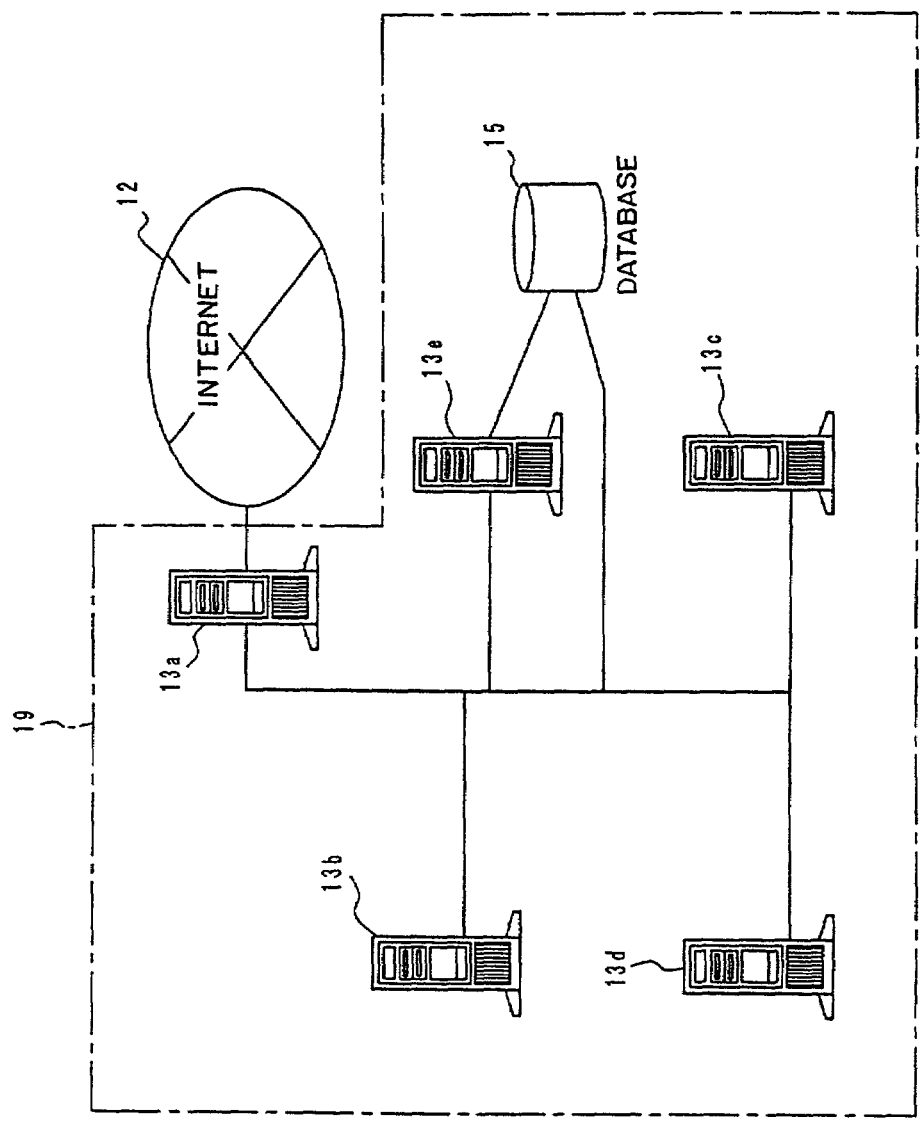
FIG. 3 is another block diagram showing the service center according to the first embodiment of the invention.

FIG. 3 is another block diagram showing a service center 19 according to the first embodiment of the present invention. In an example of FIG. 3, the service center 19 is constructed in a manner that, unlike the configuration using one service shown in FIG. 2, the respective functions are distributed to a plurality of servers. The service center 19 shown in FIG. 3 is made up of a gateway server 13$a$, a web server 13$b$, a DNS server 13$c$, a mail server 13$d$, a retrieval server 13$e$ and a database 15.

The gateway server 13$a$ has a function similar to that of the gateway section 18$a$. Moreover, the web server 13$b$, the DNS server 13$c$, the mail server 13$d$ and the retrieval server 13$e$ are similar to the web information outputting section 18$b$, the DNS section 18$c$, the mail transmitting/receiving section 18$d$ and the providing section 41, respectively.

In addition, the parts marked with the same reference numerals as those used above display the same or corresponding function, and the description thereof will be omitted for avoiding repetition. Incidentally, this configuration is similar to those in each modification of the first embodiment, the second embodiment, the third embodiment and a modification of the third embodiment.

Figure 4:
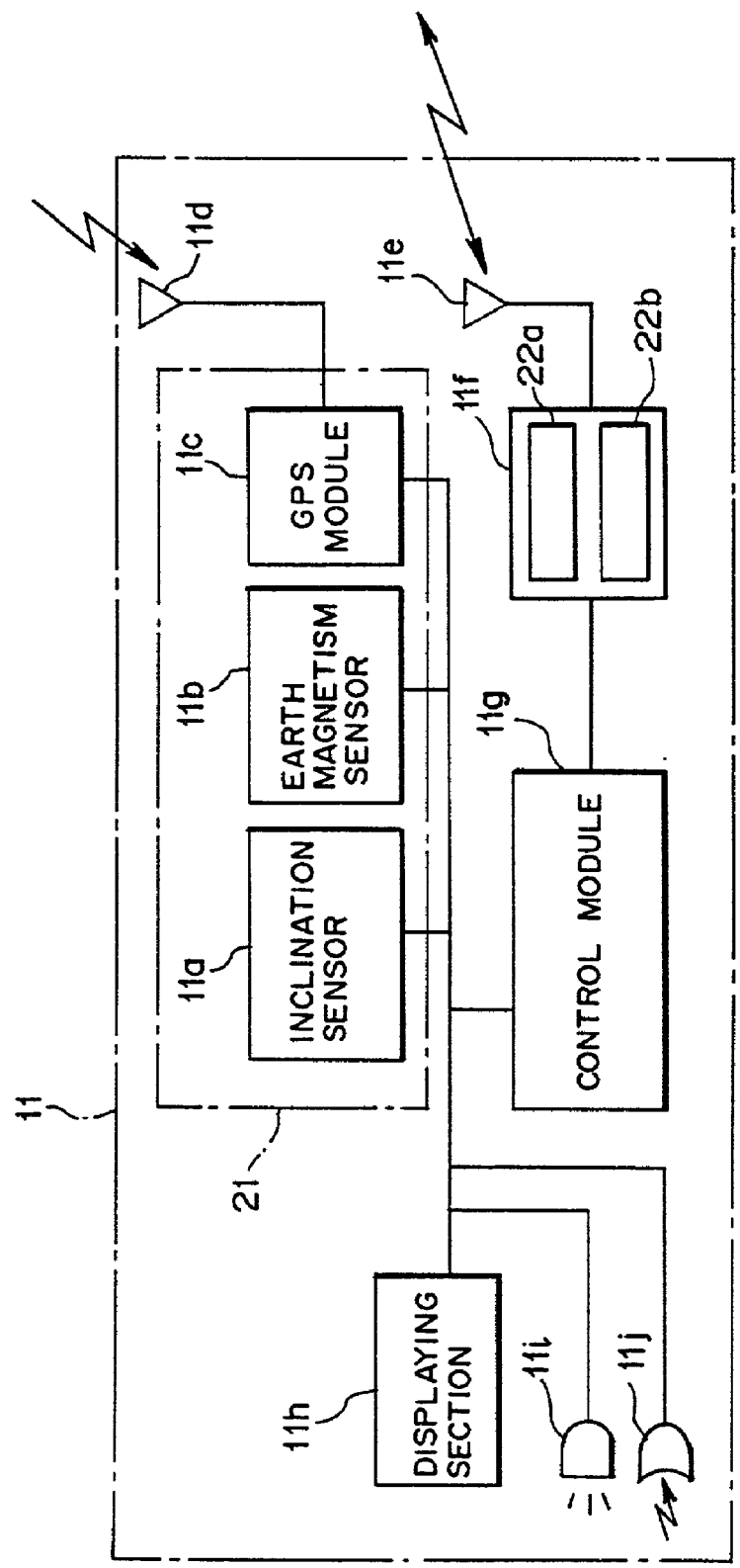
FIG. 4 is a block diagram showing a portable terminal according to the first embodiment of the invention.

FIG. 4 is a block diagram showing the portable terminal 11 according to the first embodiment of the present invention. In FIG. 4, the portable terminal 11 is made up of antennas 11$d$ and 11$e$, a detecting section 21, a radio module 11$f$, a control module 11$g$, a displaying section 11$h$, a speaker 11$i$, and a microphone 11$j$.

The antenna 11$d$ is a GPS antenna for receiving radio signals transmitted from satellites, while the antenna 11$e$ is for transmitting and receiving radio signals to and from the radio network 10.

The detecting section 21 is for detecting positional information on a terminal, including its latitude, longitude, altitude, direction and inclination angle, and is composed of a GPS module (satellite information receiving section) 11$c$, an earth magnetism sensor 11$b$ and an inclination sensor 11$a$.

The GPS module 11$c$ uses a global positioning system for receiving satellite information. This satellite information is information on a latitude of the portable terminal 11, a longitude thereof and an altitude thereof. Moreover, the GPS module 11$c$ can be made to control the direction of the antenna 11$d$.

The earth magnetism sensor (azimuth or direction sensor) 11$b$ detects the earth magnetism for measurement of directions. The direction reference is indicative of, for example, a direction of extension of the antenna 11$e$. This earth magnetism sensor 11$b$ has a coil (not shown) for measuring the earth magnetism on the basis of the magnitude of the magnetic flux penetrating the coil. This measuring method is well known, and the description thereof will be omitted.

The inclination sensor (gyro sensor) 11$a$ measures an inclination angle of the portable terminal 11 with respect to the horizontal line. This inclination sensor 11$a$ detects the posture of the portable terminal 11 in cooperation with a gyro module.

Figure 5:
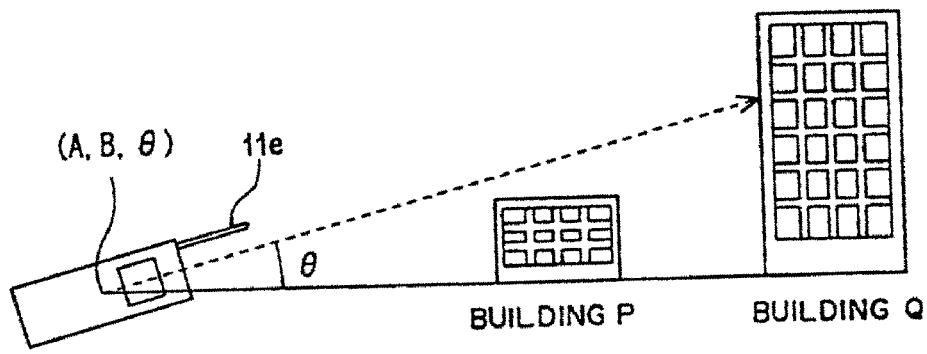
FIG. 5 illustratively shows positional information measurement of a portable terminal according to the first embodiment of the invention.

FIG. 5 illustratively shows positional information measurement in the portable terminal 11 according to the first embodiment of the present invention. In FIG. 5, the portable terminal 11 is positioned at an latitude A, a longitude B and an altitude 0, and is directed to a building Q. Furthermore, the inclination angle is an angle $\theta$ ($\theta$ is a real number above 0 degree but below 90 degrees) made between the longitudinal-axis direction of the portable terminal 11 and the horizontal plane. The long-axis direction thereof agrees with the extending direction of the antenna 11$e$.

Accordingly, the portable terminal 11 obtains a direction measured by the earth magnetism sensor 11$b$ and an inclination angle (in addition to the latitude A, the longitude B and the altitude 0, and sends these positional information to the service sensor 19. On the basis of the positional information, the service center 19 extracts an URL corresponding to, of the spatial occupancy information retained in the database 15, specified spatial occupancy information including that positional information, and sends the contents (service information) corresponding to the extracted URL to the portable terminal 11.

The definition of the inclination angle is the same as those in the first embodiment, each modification of the first embodiment and the second embodiment. In the third embodiment, another inclination angle is employed, which will be stated later. A transmitting procedure of the positional information will be described later with reference to FIG. 22.

Furthermore, the radio module 11f (see FIG. 4) is for transmitting and receiving radio signals, and is composed of a second transmitting section 22a and a second receiving section 22b.

The second transmitting section 22a is for transmitting, to the service center 19, positional information on the portable terminal 11, detected in the detecting section 21, while the second receiving section 22b is for, in connection with the positional information transmitted from the second transmitting section 22a, receiving, of spatial occupancy information comprising a latitude of an object, a longitude thereof, an altitude thereof and a bubble diameter thereof in a three-dimensional space transmitted from the service center 19, specified service information corresponding to specified spatial occupancy information including that positional information. Each of the second transmitting section 22a and the second receiving section 22b is composed of a radio circuit.

The control module 11g is for controlling an operation of each portion of the portable terminal 11 and is for processing a transmission/reception data format on the basis of a predetermined protocol stack, with this function being realizable by a CPU, a ROM, a RAM and others. The displaying section 11h is for displaying specified service information received in the second receiving section 22b, with this function being realizable by a window display. The speaker 11i is for outputting voice, while the microphone 11j is for inputting voice. These are made to be amplified through an amplifier (not shown). Therefore, the portable terminal 11 exhibits a displaying function, a GPS receiving function, a direction detecting function and a radio signal transmitting/receiving function.

For receiving the service 1, a user faces the portable terminal toward a predetermined direction and inputs a retrieving range, for example 100 m, to the portable terminal 11. In addition, the portable terminal 11 acquires the positional information on the portable terminal 11 and transmits the positional information and the retrieving range to the service center 19 for receiving service information from the service center 19. Still additionally, the user can issue a request for selection and transmission of service information on stores in buildings standing within a predetermined range, to the service center 19. Incidentally, the user can also set a distance range, for example 100 m, in the portable terminal 11 in advance in place of inputting the distance range. Alternatively, it is also possible that making a retrieval in, for example, a range of 100 m is set previously in the service center 19 side.

Therefore, the user can get information on three types of buildings: a building A, a building B and a building C in a user's viewing direction, or information concerned therewith.

Moreover, for receiving the service 2, the user aligns the portable terminal 11 with the ninth floor of a building D a restaurant exists, and the portable terminal 11 transmits the obtained positional information to the service center 19 for acquiring service information on the restaurant from the service center 19. Thus, the user can get service information on a specified building.

Secondly, referring to FIGS. 6 to 13, a description will be given hereinbelow of a service by which the service center 19 obtains desired service information on the basis of positional information on the portable terminal 11 and provides the service information to a user.

FIG. 6 illustratively shows an arrangement or location of buildings for explaining the first embodiment of the present invention. In FIG. 6, four buildings are positioned at the same longitude but at different latitudes. For example, a building A is in a range between a latitude A−1 and a latitude A+1, and the central positions of a building B, a stadium C and a tower D are latitudes B, C and D, respectively. The latitude and the longitude are expressed using ° (degree), ′ (minute), ″ (second) as unit, and the same will also be taken in the following description.

For example, for receiving the service 1, a user acquires and transmits positional information through the use of the portable terminal 11.

FIG. 7 is an illustration of images (information bubbles) of spatial occupancy information of bubble data according to the first embodiment of the present invention. In FIG. 7, information bubbles 1 to 17 indicate images corresponding to the buildings A to D shown in FIG. 6. In each of these information bubbles 1 to 17, spatial occupancy information comprising a latitude of an object, a longitude thereof an altitude thereof and a bubble diameter thereof is associated with assorted information related to this object or information such as a URL related to the assorted information.

The information bubbles 1, 5, 8 and 9 represent the building A, the building B, the stadium C and the tower D. The information bubble is generated on the basis of spatial occupancy information including the size of the building. Moreover, the information bubble 1 contains the information bubbles 2, 3 and 4 internally. These information bubbles 2, 3 and 4 denote images corresponding to floors of the building A, respectively.

FIG. 8 is an illustration useful for explaining bubble data according to the first embodiment of the present invention. In FIG. 8, the numbers are identification numbers given to the information bubbles shown in FIG. 7. In addition, each of the spatial occupancy information comprising latitude/longitude/altitude/bubble diameter is expressed in the form of, for example, A/X/0/3, where A and B represent a degree.

Furthermore, the altitude 0 depicts a building of itself, and the altitudes 1, 2 and 3 represent values corresponding to true values (for example, 15 m, 30 m, 45 m), respectively. The altitude of an underground store or the like is expressed by a minus value.

Figure 10:
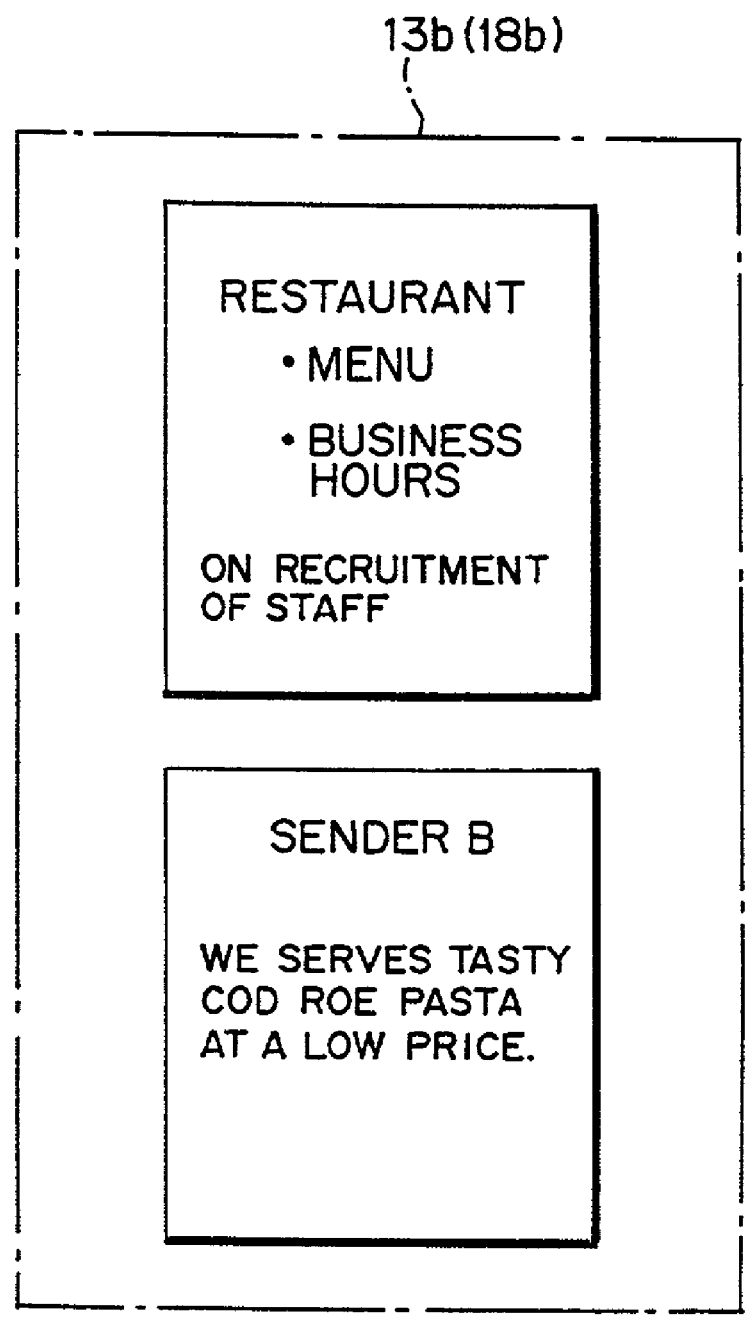
FIG. 10 is an illustration of one example of contents according to the first embodiment of the invention.
Figure 11A:
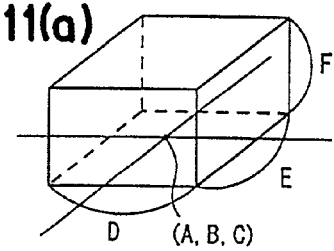
FIGS. 11(a) to 11(h) are illustrations of one example of building data according to the first embodiment of the invention.
Figure 11B:
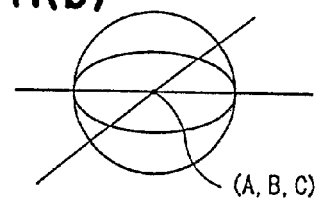
Figure 11C:
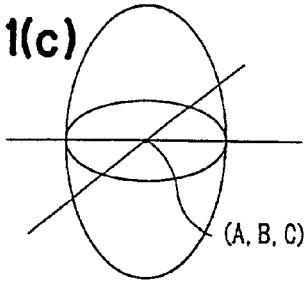
Figure 11D:
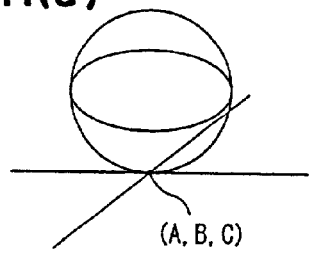
Figure 11E:
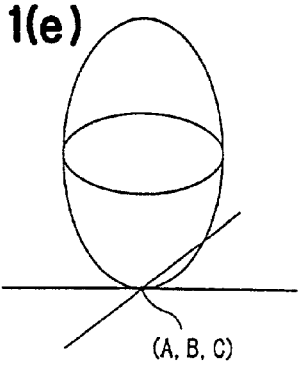
Figure 11F:
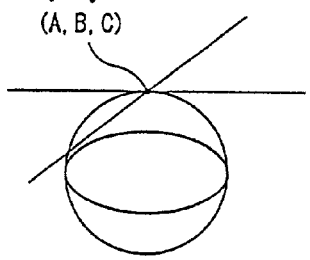
Figure 11G:
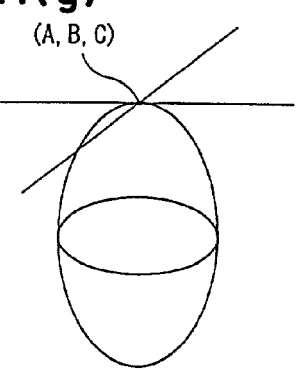
Figure 11H:
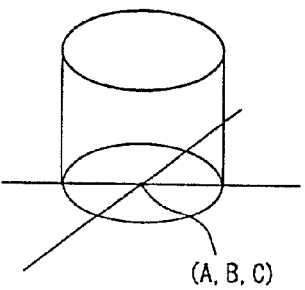

FIG. 9 is an illustration useful for explaining another bubble data according to the first embodiment of the present invention. As FIG. 9 shows, the spatial occupancy information can also be made to hold true values. In addition, a URL or a content name (for example, building A, stadium C) corresponding to the URL is transmitted to the portable terminal 11, and when the user clicks the URL or the content name, the contents shown in FIG. 10 is displayed. The display of the content name is achievable in a manner that the content name is associated previously with the URL and is registered.

FIG. 10 is an illustration of one example of contents according to the first embodiment of the present invention. In FIG. 10, the contents are associated with the spatial occupancy information and held in the web server 13b or the web information outputting section 18b so that a user obtains service information.

In addition, the bubble diameter (see FIG. 8) signifies a radius when the information bubble has a spherical configuration. If the information bubble has an elliptical sphere, it signifies its major axis or its minor axis. There is a need to set values corresponding thereto. In addition, if the information bubble has a rectangular pole configuration conforming to a volume of a building, the bubble diameter depicts a width or the like of the square pole. In FIG. 8, the bubble diameters 1, 2 and 3 signify values corresponding to true values. Alternatively, the information bubble can have a column configuration.

FIGS. 11(*a*) to 11(*h*) are illustrations of one example of building data according to the first embodiment of the present invention, where (A, B, C) represents for example the central position of information bubble. It is possible to arbitrarily uniform what position of the information bubble is set as the central position.

FIG. 11(*a*) shows a rectangular pole configuration whose central position is at the center of the bottom surface. In FIG. 11(*a*), the characters D, E and F denote a latitude amplitude, a longitude amplitude and an altitude amplitude, for example, 20 m, 20 m and 10 m, respectively. These amplitudes are previously retained in the database 15 and is taken into consideration.

For example, in the coordinates (x, y, z), a retrieval vector V passing through the origin (0, 0, 0) is expressed as (x, y, z)=(0, 0, 0)+($V_1$, $V_2$, $V_3$) where $V_1$, $V_2$ and $V_3$ depict the x, y and z components of a directional vector. A calculation is made as to whether the intersection of this retrieval vector V occurs in the aforesaid space amplitudes.

FIG. 11(*b*) shows a sphere, where the central position is at the center of the sphere. For the retrieval of information bubble, a latitude of the portable terminal 11, a longitude thereof and an altitude thereof are taken as the coordinate origin, and the detection of the presence or absence of the intersection is made using an equation expressing a sphere and an equation expressing the retrieval vector V.

For example, a sphere which has a radius of R and in which the origin (0, 0, 0) is taken as the central position is expressed by $x^2+y^2+z^2=R^2$, and the intersection is calculated using the retrieval equation and the sphere equation.

FIG. 11(*c*) shows an elliptical sphere, where the central position is at the center of the elliptical sphere. An elliptical sphere which has a major axis of a and a minor axis of b and in which the origin (0, 0, 0) is set as the central position is expressed by $(x/b)^2+(y/b)^2+(z/a)^2=1$. In addition, the central position of a sphere shown in FIG. 11(*d*) is at the lowermost point of the sphere, and the central position of an elliptical sphere shown in FIG. 11(*e*) is at the lowermost point of the elliptical sphere, and further, the central position of a sphere shown in FIG. 11(*f*) is at the uppermost point of the sphere, and still further, the central position of an elliptical sphere shown in FIG. 11(*g*) is at the uppermost point of the elliptical sphere.

FIG. 11(*h*) shows a column, where the central position is at the center of the bottom surface. A column which has a radius of R and a height of H and in which the origin (0, 0, 0) is taken as the central position is expressed by $x^2+y^2=R^2$ and ($0 \leq z \leq H$).

In addition, the range of the information bubble to be indicated by the service center 19 can be altered diversely according to contract charge or the like. In a case registered individually, the information bubble is basically within a radius of 5 m.

Concretely, the dimension of the radius, major axis or minor axis of the spheres or elliptical spheres shown in FIGS. 11(*b*) to 11(*g*) is changed. In addition, the spatial occupancy information on the rectangular pole shown in FIG. 11(*a*) can be set on not only a closed region but also a large region in a direction parallel to a side indicated as the latitude E. Still additionally, as one example, the spatial occupancy information on the column shown in FIG. 11(*h*) can also be set to the infinity in an upward direction from the central position in the z direction.

Therefore, an enterprise in the building A (see FIGS. 6 and 7) registers a URL of its own home page for advertising its own service contents in bubble data, for example, in a state associated with the spatial occupancy information on its own building. That is, the entire building A is registered as the information bubble 1, while three stores on the first floor of the building A, two stores on the second floor thereof and one store on the third floor thereof are registered as the information bubbles 10 to 15.

Figure 12:
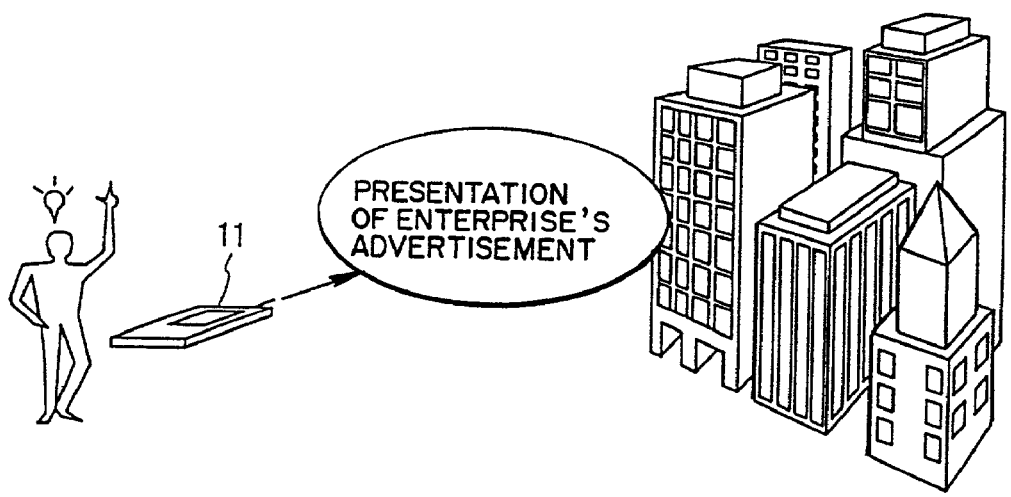
FIG. 12 is a conceptual illustration of a service using bubble data according to the first embodiment of the invention.

FIG. 12 is a conceptual illustration of a service using bubble data according to the first embodiment of the present invention.

When a user faces the portable terminal 11 toward a direction of a building, the service contents of an enterprise existing in that building is displayed on the portable terminal 11 through the service center 19. The contents to be displayed include, in addition to the enterprise advertisement, menus of restaurants and others.

Enterprise advertisements, restaurant menus, rumors and others are registered as bubble data in advance, and a user uses the portable terminal 11 as a retrieval tag to transmit positional information.

Thus, the user can easily obtain a menu of a remote restaurant. In addition, the user can easily get service information on stores existing in a building at the exterior of the building.

FIGS. 13(*a*) and 13(*b*) are illustrations of one example of information display according to the first embodiment of the present invention, showing display of service information on a plurality of buildings existing in a predetermined range, retrieved by the service center 19.

Furthermore, the displaying section 11h selects an item displayed in connection with a retrieval subject, and displays detailed information thereof. That is, the user can get more detailed information by selecting one item from a list of a plurality of subjects obtained. For example, in FIG. 13(*a*), when the user sets the cursor at the "stadium C" and selects it, detailed information on the stadium C is displayed as shown in FIG. 13(*b*). Of the list, the items having detailed information are marked * (no charge) or + (charged). For example, as no-charge detail information, there are bargain information, menus of restaurants, and other information, while as charged detail information, there are travel service information, land prices, and others.

Thus, the user can receive the service 1 only by facing the portable terminal 11 to get various service information from a plurality of bubble data.

In addition, also in the service 2, the user can get service information on registration of restaurants existing in the building B designated.

Accordingly, the user can make a retrieval with analog sensation based on the human sensation without conducting processing in a digital manner like a retrieval service on the internet 12, and can easily obtain information on stores in his/her visual range. That is, the user can obtain desired service information through analog sensation such as "this place" or "that place".

In addition, a restaurant owner or the like can directly render service information on his/her own store to users by registering spatial occupancy information on the store and URL as bubble information in the service center 19 without placing an advertisement in a magazine or the like.

Since the information is opened to the public in this way, a user can derive information on subjects in user's visual range fast with extreme ease.

Moreover, referring to FIGS. 14 to 33, a detailed description will be given hereinbelow of a registration operation of bubble data in an information providing service system with the above-described configuration according to the present invention.

FIG. 14 is a sequence illustration useful for explaining the registration in the information providing service system according to the first embodiment of the present invention, where data to be interchanged between the portable terminal 11 and the service center 19 are shown illustratively. This is an example in which a user makes registration through the use of positional information on the portable terminal 11.

In FIG. 14, at a step P1, a user selects circled numeral 4 from a plurality of menus displayed on the portable terminal 11 to start positional registration (message position registration) so that the portable terminal 11 measures positional information including its own latitude, longitude and altitude through the use of the aforesaid sensor group (measuring step).

At a step P2, the portable terminal 11 sends the measured positional information and terminal identification information to the service center 19 (measured information transmitting step).

When receiving that data (step P3), the service center 19 transmits an application contract and others to the portable terminal 11 (step P4). This contract is for making a user select a charged service or a no-charge service. For example, the user selects a large bubble diameter (for example, 5 m or more) or a small bubble diameter (less than 5 m).

At a step P5, when the user selects a large bubble in expectation of advertisement effects, the operation passes through a route denoted at circled numeral 2, and concrete parameters needed for registration are displayed on the portable terminal 11 (step P9). On the other hand, if the user selects a small bubble, the operation passes through a route indicated by circled numeral 1, and display for demanding input of a message appears on the portable terminal 11 (step P6).

Following this, at a step P7, when the user completes the input, that message is transmitted to the service center 19, and the service center 19 writes the transmitted positional information and the information on a retrieval subject in the database 15 (registering step). At this time, the service center 19 converts spatial occupancy information comprising a latitude of an object, a longitude thereof, an altitude thereof and a bubble diameter thereof in a three-dimensional space into a URL and writes this URL in the URL generating section 55 of the web server 13b. In addition, the service center 19 writes the contents to be linked in the database 15.

In addition, a display indicating the registration completion appears on the portable terminal 11 (step P8). Incidentally, for this registration, is used a dedicated application software.

In this way, bubble data is generated through the user registration by enterprises or individuals.

Moreover, the user can also use a personal computer (not shown) for gaining access through the internet 12 to the service center 19, thereby registering bubble data.

Figure 15:
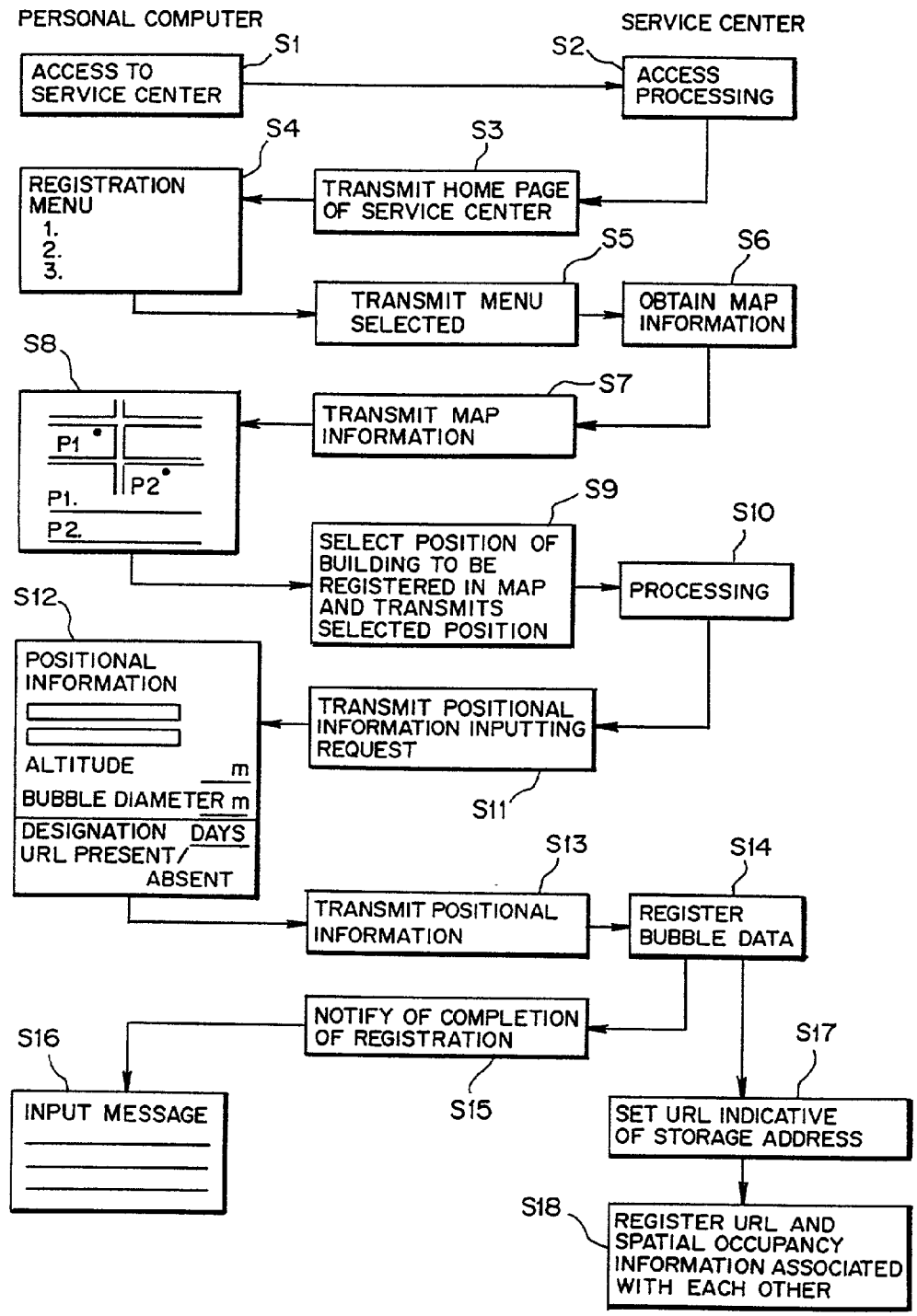
FIG. 15 is a sequence illustration useful for explaining registration in an information providing service system through a personal computer according to the first embodiment of the invention.

FIG. 15 is a sequence illustration useful for explaining registration through a personal computer in the information providing service system according to the first embodiment of the present invention.

First, the user has access through the personal computer to the service center 19 (step S1). Then, the service center 19 conducts access processing (step S2), and transmits the contents of its home page to the portable terminal 11 (step S3) so that the home page contents are displayed thereon (step s4).

At this time, the user selects a registration menu from the home page and sends the selected menu to the service center 19 (step S5). The service center 19 acquires map information (step S6), and sends that map information to the portable terminal 11 (step S7).

At a step S8, the personal computer receives the map information (map information acquiring step).

Following this, at a step S9, the personal computer selects a place of a building, on which its own service information is registered, from the map information received in the map information acquiring step (service providing place selecting step), and sends the selected place to the service center 19.

After the processing (step S10), the service center 19 sends a request for input of positional information to the portable terminal 11 (step S11), with a detailed input screen being displayed on the personal computer (step S12).

In addition, the user sends a bubble diameter determining spatial occupancy information, the number of appearing days, a URL and others (step S13), and the service center 19 registers bubble data (step S14) and notifies the portable terminal 11 of the completion of registration (step S15), while the user writes a content massage to be registered (step S16). At the step S14, if an URL of the home page of the user registered or the like exists, the service center 19 sends the URL. In the case of the absence of the URL, the service center 19 sends desired information to be provided.

Furthermore, at the step S14, the service center 19 connected through the network to the personal computer stores desired information to be provided from the user terminal in the web server 13b, and determines the URL corresponding to the storage location. Moreover, the service center 19 generates bubble data at the place selected at the service providing place selecting step in a state associated with that URL (generating step). That is, the service center 19 generates URL retaining service information (step S17), and associates that URL with spatial occupancy information for registering them in the database 15 (step S18).

Accordingly, the user can make the registration through the use of various types of communication terminals, which improving convenience.

FIG. 16 is an illustration useful for explaining a charge system of bubble data according to the first embodiment of the present invention. In FIG. 16, the charge system is made according to a contrast between a system operating enterprise and a person (or enterprise) utilizing the system 9 for advertisement. Concretely, a low charge is set for a small bubble diameter (5 m), while a high charge is set for a large bubble diameter (100 m). Alternatively, it is also possible that the charge is set according to the appearing time period.

Thus, when a user wants to register service information on the Tokyo tower, the registration can be made through a personal computer without depending on the portable terminal 11.

In addition, for serving convenience of users having communication terminals, on famous buildings such as the Tokyo tower and public facilities, a system operating enterprise can previously set basic information and information bubbles having size equivalent to these buildings.

Figure 17:
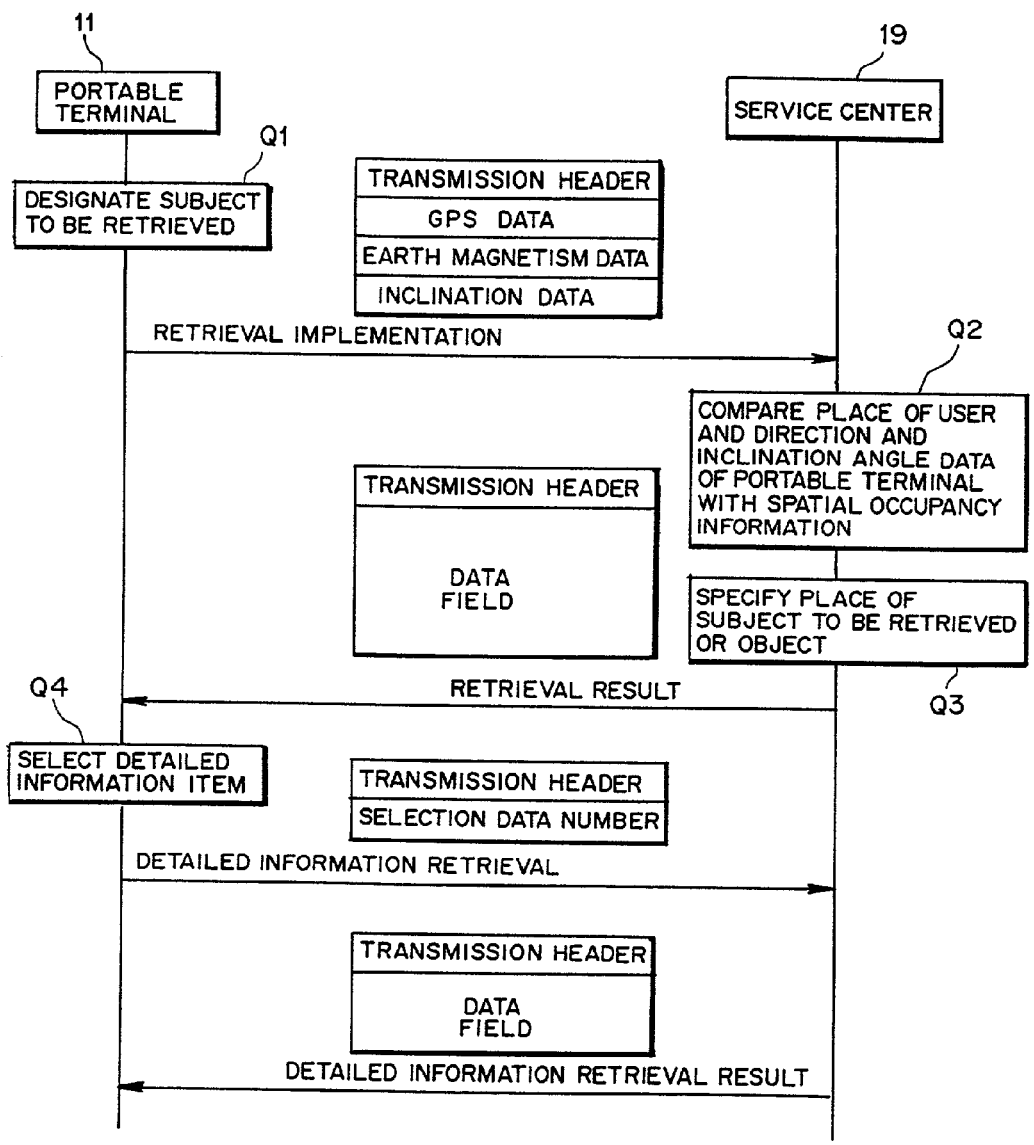
FIG. 17 is an sequence illustration of transmission and reception of data according to the first embodiment of the invention.

Referring to FIG. 17, a description will be given hereinbelow of a flow of data at registration/retrieval of service information by a user.

FIG. 17 is a sequence illustration of data interchange according to the first embodiment of the present invention, showing one example of data transmission/reception between the portable terminal 11 and the service center 19.

First, a user faces the portable terminal 11 toward a retrieving direction and starts an operation to acquire positional information and further designates a retrieval subject (step Q1), with GPS data, earth magnetism data (direction data), inclination data (inclination angle) and altitude data being transmitted to the service center 19.

In this case, for the service 1, the service center 19 compares a location of the user, a direction of the portable terminal 11 and inclination angle data with previously registered spatial occupancy information (inclination angle) (step Q2). The service center 19 selects and specifies, as a list of the retrieval results, three kinds, for example, in the order of separation, from buildings (buildings, stores, temples), mountains, rivers or the like forming retrieval subjects on the basis of the comparison results (step Q3), and inserts the retrieval results in a data field and sends them to the portable terminal 11.

Furthermore, for the service 2, the service center 19 retrieves service information on specified buildings and others, and transmits the retrieval result.

In addition, the user selects an item of detail information, the user wants to know or see, from data transmitted from the service center 19 (step Q4), and sends the selected data number to the service center 19.

After the implementation of the step Q4, the service center 19 retrieves the contents on the basis of the selected data number, and sends the detail information to the portable terminal 11.

Thus, the user can directly obtain useful business information on enterprises or the like in a building in his/her visual range.

Moreover, with reference to FIGS. 18 to 24, a description will be given hereinbelow of a service information retrieving method. In these illustrations, circles represent images (information bubbles) of spatial occupancy information of bubble data, and are marked with numerals.

In an information providing service method according to the present invention, on the basis of positional information and spatial occupancy information of bubble data, the aforesaid retrieving step first extracts one or a plurality of information bubbles (second information bubbles) from a plurality of information bubbles indicative of images of the spatial occupancy information of the bubble data under a first condition which will be described later (extracting step). In this extraction, an intersection information bubble(s) intersecting a retrieval vector V representative of a direction of the portable terminal 11 directed to a retrieval subject is extracted as one or a plurality of information bubbles from a plurality of information bubbles.

One or a plurality of information bubbles (third information bubbles) under a second condition which will be stated later are selected from the one or plurality of information bubbles extracted in the extracting step to extract a URL corresponding to the one or plurality of information bubbles (address extracting step).

Subsequently, service information corresponding to the URL extracted in the address extracting step is selected and outputted (selecting step).

Furthermore, first and second conditions are added for rendering the foregoing service land service 2. A description will be given hereinbelow of retrieval modes with reference to FIGS. 18 to 24. The plurality of conditions enable extraction and selection according to service.

In each of the modes, a user stands in a building A and retrieves thereat buildings standing in a direction of an inclination angle θ. These information bubbles 1, 2 and 3 are registered previously in the service center 19 by, for example, the owners of buildings B, C and D in a state where spatial occupancy information and URL are associated with each other.

First, a description will be given hereinbelow of a mode in the service 1.

Figure 18A:
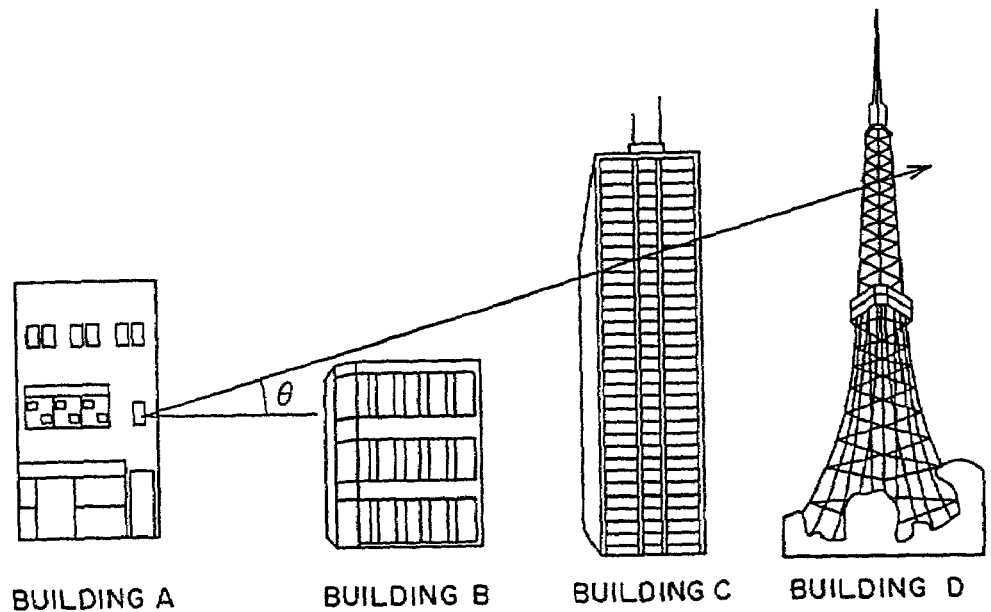
FIGS. 18(a) and 18(b) are illustrations useful for explaining a retrieval mode of a service 1 according to the first embodiment of the invention.
Figure 18B:
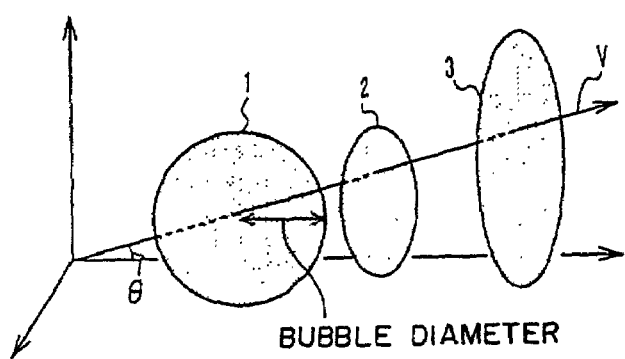

FIGS. 18(a) and 18(b) are illustrations useful for explaining a retrieval mode in the service 1 according to the first embodiment of the present invention. In extraction (extracting step), things existing in a direction of a retrieval vector V are extracted as one or a plurality of information bubbles from a plurality of information bubbles, and in selection (selecting step), all the one or plurality of information bubbles are outputted. Incidentally, in the service 1, the user can also make retrieval while changing the distance.

Therefore, even if the building B is smaller in size than the building C, the owner of the building B can set a large bubble diameter so that its hit rate becomes higher than that of the building C, which permits making a retrieval without depending on the dimensions of buildings.

Thus, since the charge system is set on the basis of the bubble diameter and the information appearing time period, enterprises, restaurants or the like can place advertisements efficiently, which allows the user to see the contents according to the quality of information.

Figure 19:
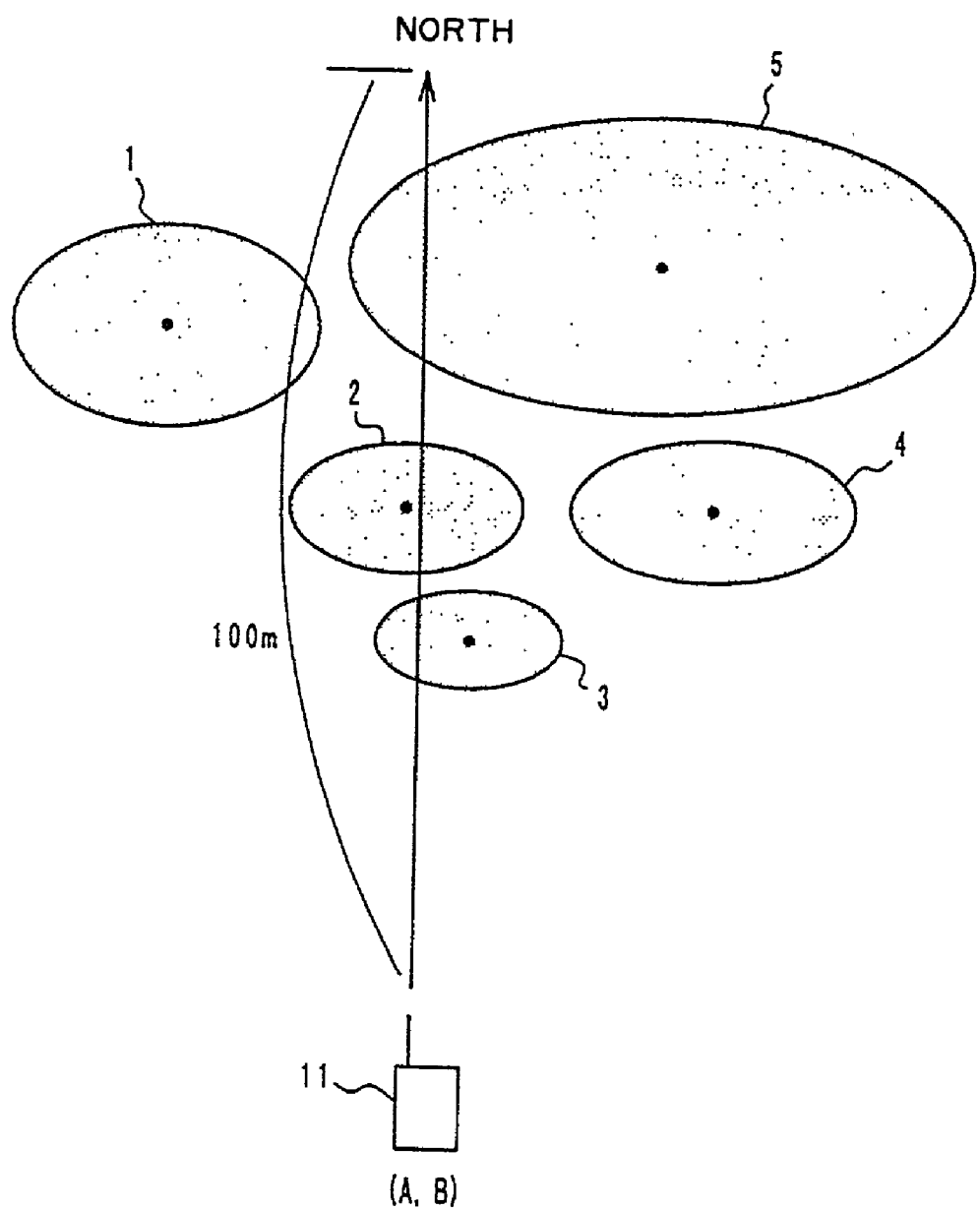
FIG. 19 is an illustration useful for explaining a distance designated retrieval mode of the service 1 according to the first embodiment of the invention.

FIG. 19 is an illustration useful for explaining a distance designated retrieval mode in the service 1 according to the first embodiment of the present invention. In FIG. 19, the portable terminal 11 is located at a position of a latitude A and a longitude B. In the extraction (extracting step), things existing in a direction of a retrieval vector V are extracted, for example, as 50 information bubbles from a plurality of information bubbles, and in the selection (selecting step), of the 50 information bubbles, for example, five information bubbles are outputted which exist within a predetermined range below 100 m from the position (A, B) of the portable terminal 11.

Moreover, a user can also select an information bubble registered between two points in the retrieval vector V direction. Accordingly, the user can narrow information down for obtaining desired service information.

Secondly, a description will be given hereinbelow of a mode in the service 2.

Figure 20A:
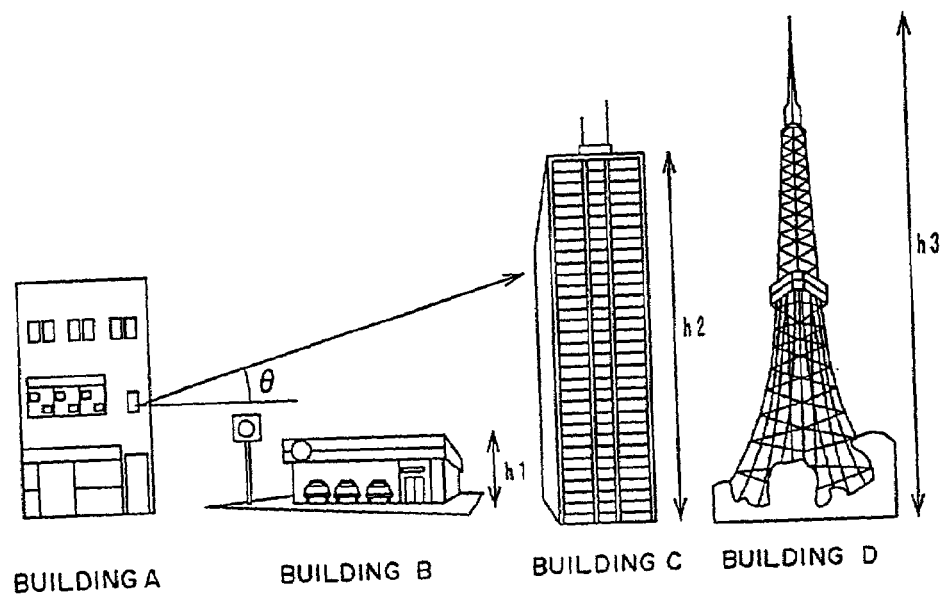
FIGS. 20(a) and 20(b) are illustrations useful for explaining a retrieval mode of a service 2 according to the first embodiment of the invention.
Figure 20B:
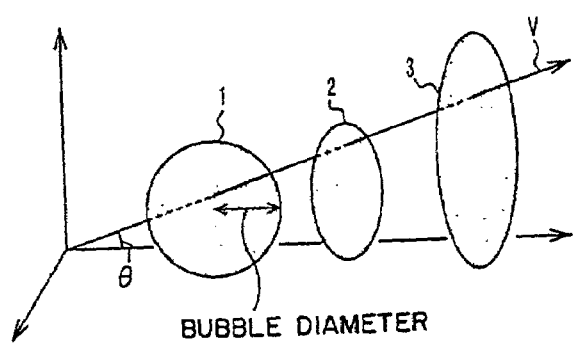

FIGS. 20(a) and 20(b) are illustrations useful for explaining a retrieval mode in the service 2 according to the first embodiment of the present invention. The bubble diameters of information bubbles 1, 2 and 3 are not proportional to the actual dimensions of buildings.

In FIG. 20(b), a retrieval vector V intersects all the information bubbles 1, 2 and 3 respectively corresponding to buildings B, C and D. Accordingly, in FIG. 20(a), the building B is not in the user's visual range while still being selected.

For this reason, in the extraction (extracting step), of objects (buildings or the like), the first object appearing in a direction the portable terminal 11 is aligned is extracted as a second information bubble through the use of map data. This map data is retained in advance in the database 15, and the providing section 41 (see FIG. 2) or the retrieval server 13*e* (see FIG. 3) uses map data including height information to acquire heights h1 (m), h2 (m) and h3 (m) respectively corresponding to the buildings B, C and D, thereby recognizing that a thing the user first sees in the user's visual field is the building C.

In addition, the providing section 41 or the retrieval server 13*e* extracts, as a retrieval result, information on the building C preferentially and transmits that information to the portable terminal 11.

This enables data extraction taking more accurate location into consideration, and enables the user to retrieve buildings in his/her visual range, thus rendering the service 2.

Still additionally, for providing the service 2, one or a plurality of information bubbles can also be extract in consideration of a configuration and location of a retrieval subject.

Figure 21A:
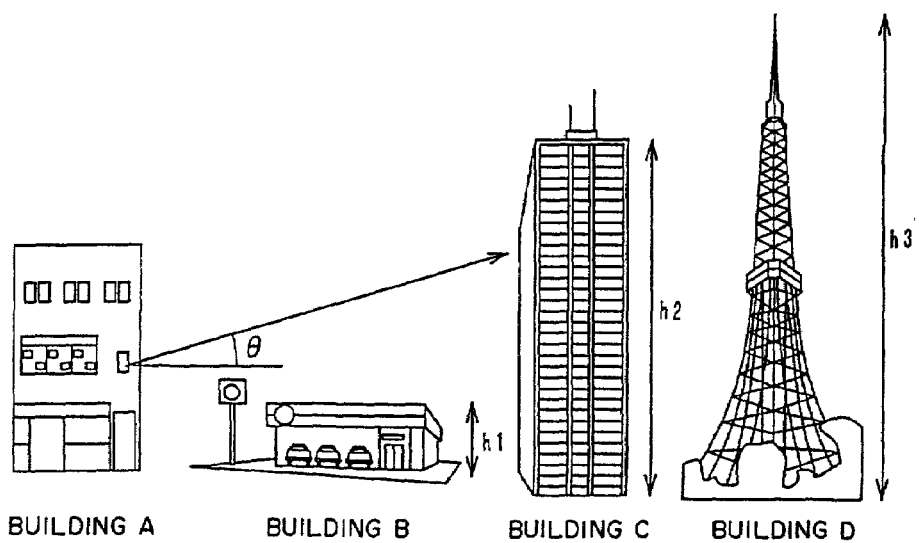
FIGS. 21(a) and 21(b) are illustrations useful for explaining another retrieval mode of the service 2 according to the first embodiment of the invention.
Figure 21B:
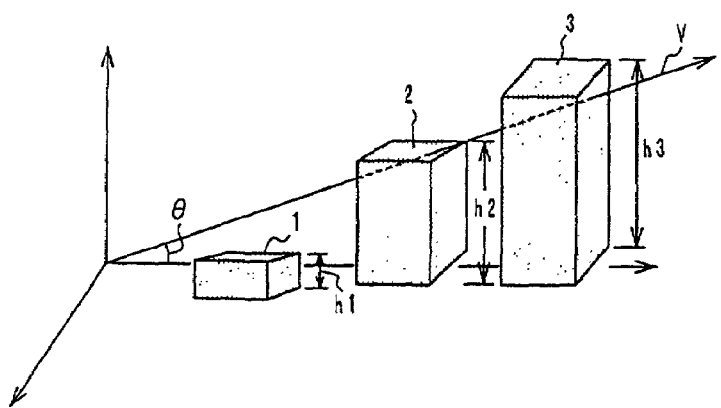

FIGS. 21(*a*) and 21(*b*) are illustrations useful for explaining another retrieval mode in the service 2 according to the first embodiment of the present invention. Information bubbles 1, 2 and 3 respectively corresponding to buildings B, C and D shown in FIG. 21(*b*) are registered in a volume and a dimension respectively identical to the size and the configuration (see FIG. 11(*a*)), and are extracted on the basis of map data.

Thus, since the actual size and others are reproducible, the user can accurately extract a target building to be retrieved, and can surely hit information on the first building appearing in his/her visual range. That is, the information bubble of the building B is removed and the information on the building C is displayed.

Furthermore, with reference to FIGS. 22 to 24, a description will be given hereinbelow of information providing service methods in the service 1 and the service 2.

Figure 22:
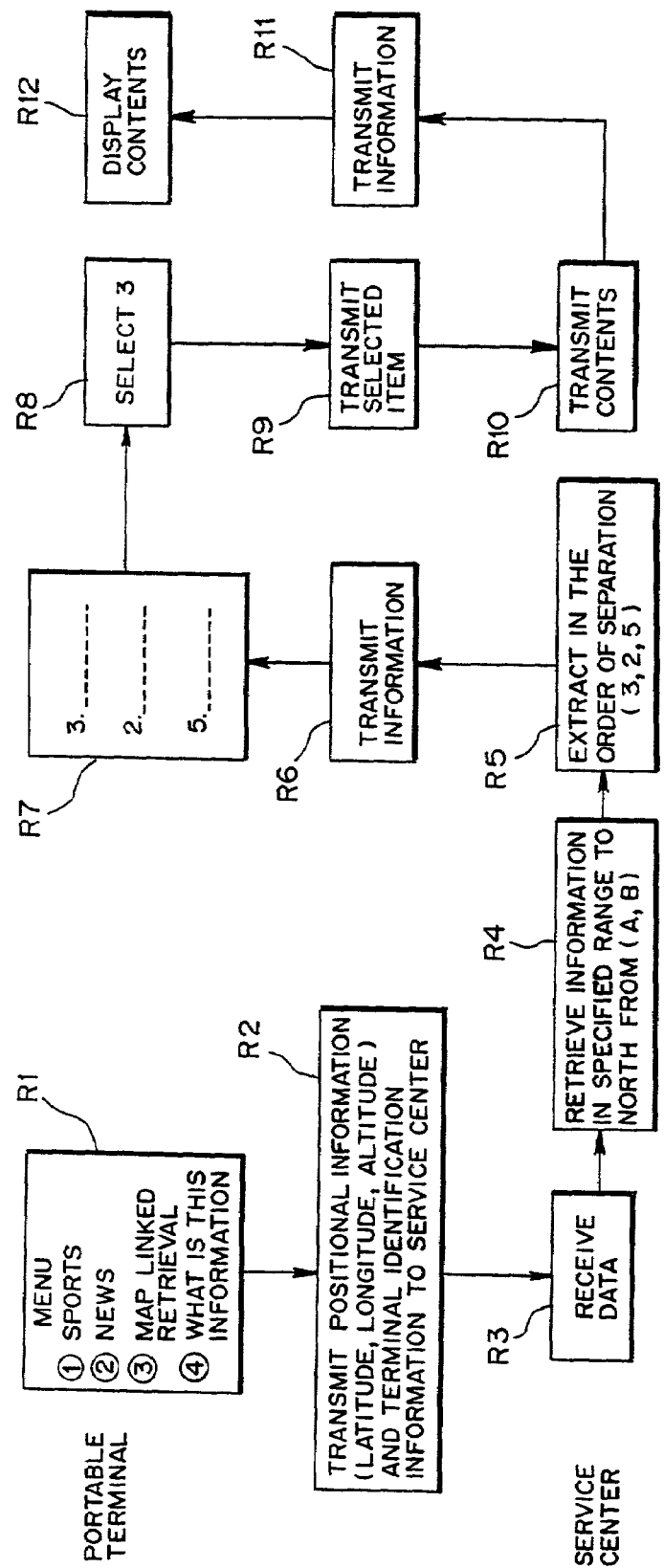
FIG. 22 is a sequence illustration useful for explaining the service 1 according to the first embodiment of the invention.

FIG. 22 is a sequence illustration useful for explaining the service 1 according to the first embodiment of the present invention. Referring to FIG. 22, a description will be given hereinbelow of a method of rendering information service to the portable terminal 11.

At a step R1, a user selects a retrieval item (written as "what is this information") for retrieving a retrieval subject to the north in his/her visual range. In addition, the portable terminal 11 measures positional information comprising its own latitude, longitude, altitude, direction and inclination angle (measuring step).

Then, at a step R2, the portable terminal 11 sends the positional information measured in the measuring step and a retrieval condition to the service center 19 (measured information transmitting step). In this case, the portable terminal 11 further sends terminal identification information to the service center 19.

When receiving that data (step R3), at a step R4, on the basis of the positional information sent in the measured information transmitting step, the service center 19 retrieves a plurality of specified service information from bubble data in which spatial occupancy information is associated with a URL for acquiring service information (retrieving step).

In the retrieval at a step R5, on the basis of the positional information sent from a user terminal, one or a plurality of information bubbles are extracted from a plurality of information bubbles existing in a direction of a retrieval vector V in accordance with coordinates (A, B) and spatial occupancy information in 100 m to the north from the portable terminal 11 (extracting step). Furthermore, one or a plurality of information bubbles 3, 2 and 5 (see FIG. 19) corresponding to the URL are selected from the extracted one or plurality of information bubbles in the order of separation from the portable terminal 11 to extract the URL corresponding to these information bubbles (address extracting step). The service information corresponding to the URL extracted in the address extracting step is selected and outputted (selecting step).

Following this, at a step R6, the service center 19 notifies the portable terminal 11 of the plurality of specified service information retrieved in the retrieving step (retrieval result notifying step). At this time, the user can get information such as characters, images and voices on the retrieval subject, which improves the operability.

The portable terminal 11 displays that result (step R7), and the user obtains a plurality of items on a retrieval subject. In addition, the user selects one from the plurality of items (step R8), and transmits that item to the service center 19 (step R9). The service center 19 retrieves the contents (step R19) and transmits the retrieval result to the portable terminal 11 (step R11), while the portable terminal 11 displays the contents (step R12), which allows the user to obtain service information. Accordingly, a building in the user's visual range is retrievable on the basis of a position of the portable terminal 11 and a distance therefrom.

Furthermore, with reference to FIG. 23 and FIGS. 24(*a*) to 24(*e*), a description will be given hereinbelow of a method of retrieving a restaurant lying in a building by a user.

Figure 23:
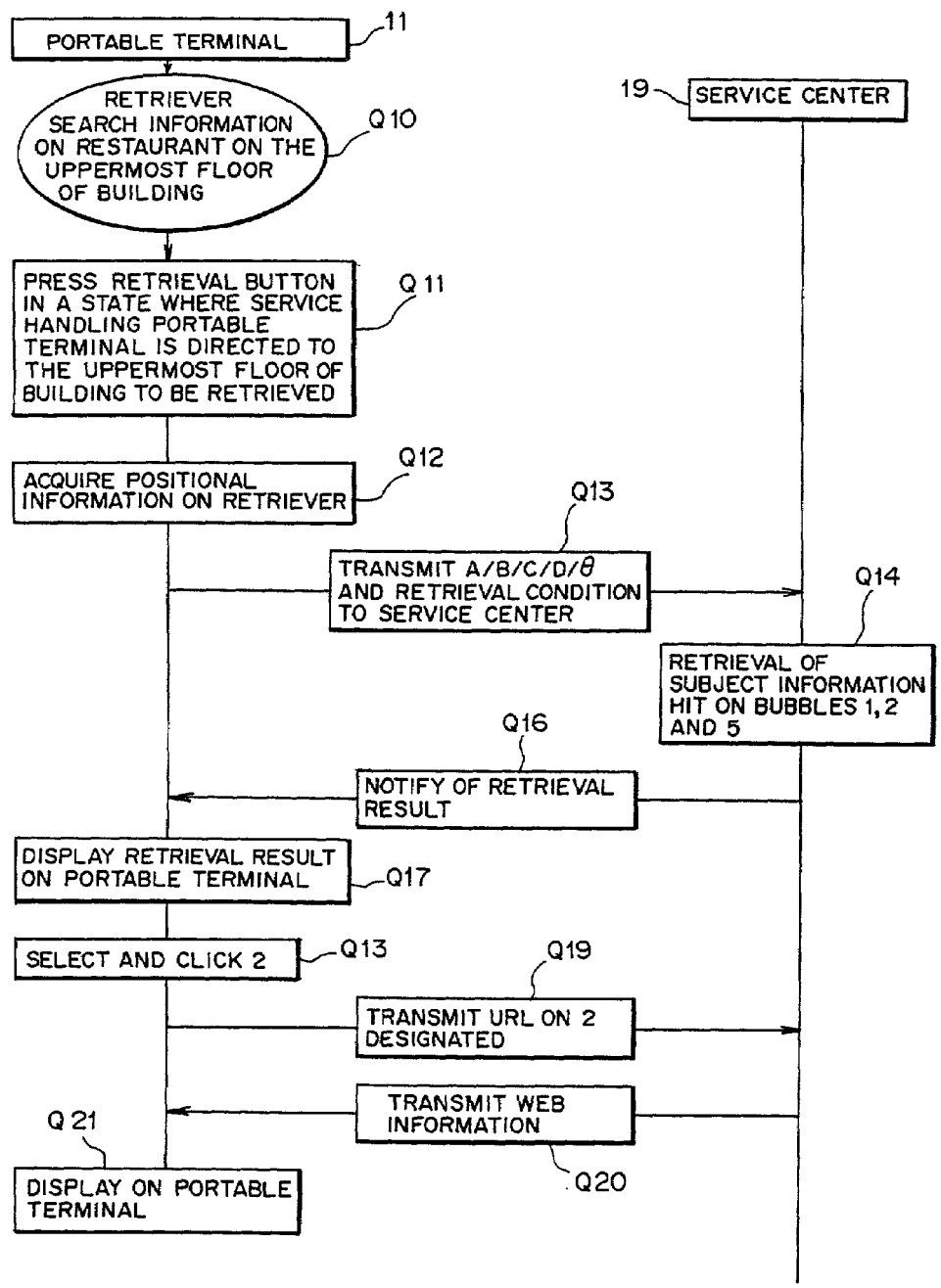
FIG. 23 is a sequence illustration useful for describing a service information acquiring method according to the first embodiment of the invention.
Figure 24A:
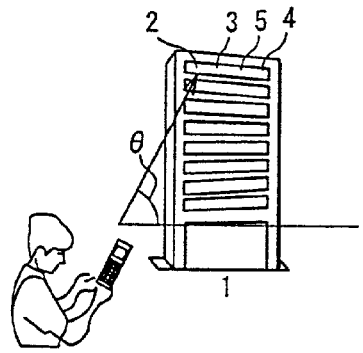
FIGS. 24(a) to 24(e) illustratively show service information acquisition according to the first embodiment of the invention.
Figure 24B:
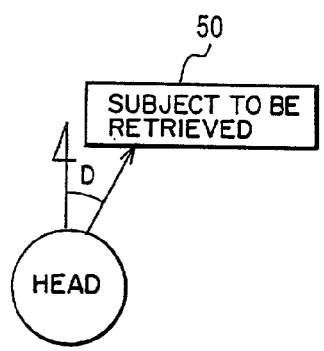
Figure 24C:
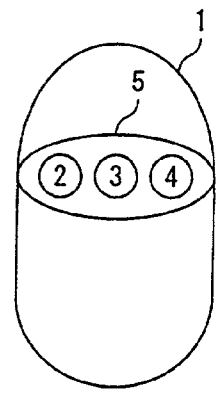
Figure 24D:
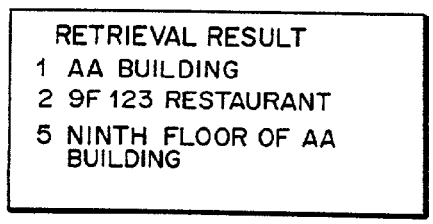
Figure 24E:
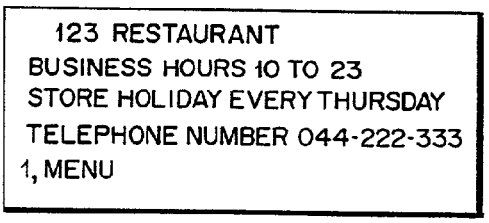

FIG. 23 is a sequence illustration useful for explaining a method of acquiring service information according to the first embodiment of the present invention, and FIGS. 24(*a*) to 24(*e*) illustratively show service information acquisition according to the first embodiment of the invention. In FIG. 24(*a*), a user (retrieving person) retrieves information on restaurants existing on the uppermost floor of a building (step Q10 in FIG. 23).

At a step Q11, the user faces the portable terminal 11 for a service toward the uppermost floor of the building and presses a retrieval button (not shown). This manipulation is equivalent to clicking "what is this information" denoted at circled numeral 4 in FIG. 22 in a state where the user faces the portable terminal 11 toward a restaurant. Subsequently, at a step Q12, the positional information on the retrieving person is acquired (see FIG. 24(*b*)). Concretely, the position of the user and the latitude A/longitude B/direction D of the portable terminal 11 are obtained. In this case, the direction D appears, for example, in the form of north 0/south 180.

Thereafter, at a step Q13, the portable terminal 11 transmits these information and a retrieval condition to the service center 19. At a step Q14, the service center 19 retrieves subject information. As FIG. 24(*c*) shows, hit on the information bubbles 1, 2 and 5 occurs.

At a step Q16, the service center 19 sends the retrieval result to the portable terminal 11. At a step Q17, the portable terminal 11 displays the retrieval result (see FIG. 24(*d*)), and if the user selects, for example, 2 at a step Q18, a step Q19 follows, where the portable terminal 11 sends the URL on the user, designated, to the service center 19. Furthermore, at a step Q20, the service center 19 sends web information to the portable terminal 11, and at a step Q21, that information appears on the portable terminal 11 (see FIG. 24(*e*)).

In this way, it is possible to easily retrieve a building, the user shows interest in, in a user's visual range with analog sensation based on the human sensation. Therefore, the user can get information on a building (manufactured thing, natural thing) existing in a user designated direction.

In addition, when facing the portable terminal 11 toward a desired direction, the user can obtain information on a building existing in a range of 100 m from the terminal position. Still additionally, the user can face the portable terminal 11 toward a building in front for obtaining information on goods the stores in the building deal in.

Thus, the advertiser can place advertisements to users carrying the portable terminal 11. In addition, the service center 19 operating enterprise can render a service while making charge. Still additionally, the user can freely and easily acquire service information.

Moreover, in this way, all the advertiser, service provider and user can gain advantages.

(A1) Description of First Modification of First Embodiment of the Invention

An information providing service according to a first modification is a service using an information presenting tower installed in front of a station or in a square to function as a waiting square in which a user leaves a message. It will be described hereinbelow with reference to FIGS. 2, 3, 25 and 26.

An information providing service system according tot he first modification has a notifying service similar in configuration to the service center 19 shown in FIG. 2 or 3. In FIG. 2, the message storing section 56 is for holding a message inputted from a user, and is composed of a memory. This message is associated with spatial occupancy information of bubble data (in which spatial occupancy information is associated with a URL for obtaining service information), and is written in the message storing section 56.

In addition, for the association between the message and the spatial occupancy information, a plurality of messages are allocated to a plurality of small information bubbles provided in the interior of the spatial occupancy information, and an individual URL is given to each of the plurality of small information bubbles. Moreover, a message is held in each of the individual URLs.

Incidentally, the bubble data registration procedure is the same as mentioned above. In addition, spatial occupancy information including positional information on the portable terminal 11 is retrieved on the basis of the positional information thereon, and a message received by the first receiving section 16 is registered in the message storing section 56 in a state associated with the spatial occupancy information.

On the other hand, the spatial occupancy information including that positional information is retrieved on the basis of the positional information of the portable terminal 11 in the extracting section 40, and a message is extracted from the message storing section 56 associated with the spatial occupancy information. Following this, the message is given to the first transmitting section 17 by the providing section 41, and is transmitted to the portable terminal 11 by the first transmitting section 17.

Therefore, the messages written by a plurality of users are held individually, while the users can obtain messages of other users, which realizes a function as a waiting square.

Incidentally, each modification of the first embodiment employs the same portable terminal as the portable terminal 11 mentioned above, and the parts marked with the same numerals as those used above display the same or similar functions, and the description thereof will be omitted for avoiding repetition.

Referring to the drawings, a description will be given hereinbelow of a method in which the service center 19 functions as a notifying server.

Figure 25A:
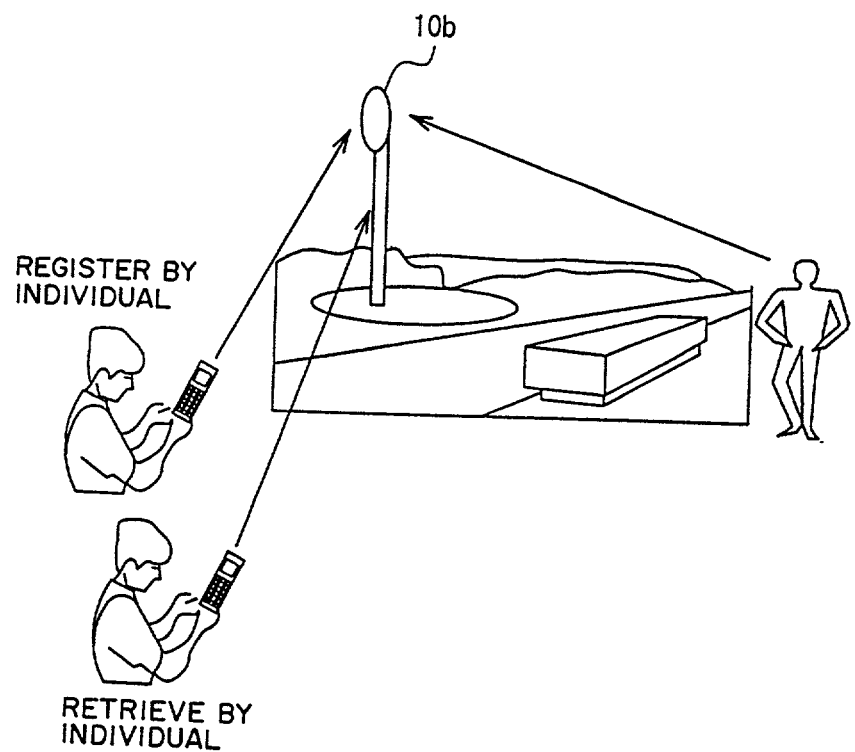
FIGS. 25(a) and 25(b) are illustrations useful for describing a service according to a first modification of the first embodiment of the invention.
Figure 25B:
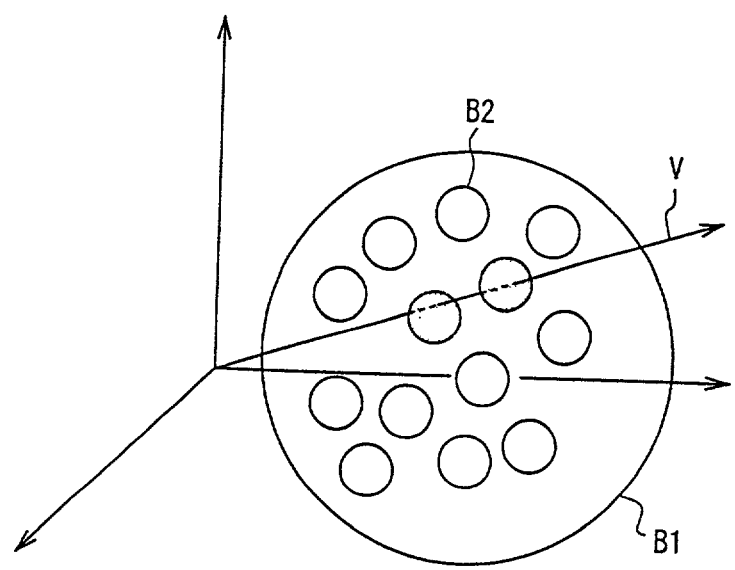

FIGS. 25(a) and 25(b) are illustrations useful for explaining a service according to the first modification of the first embodiment of the present invention. In FIG. 25(a), an information presenting tower 10b is a user's target.

In the first modification, for registration of service information, the portable terminal 11 first measures positional information including its latitude, longitude, altitude, direction and inclination angle (measuring step). The portable terminal 11 is faced toward an information presenting tower forming a retrieval subject to acquire the positional information.

Following this, the portable terminal 11 sends the positional information measured in the measuring step to the service center 19 (measured information transmitting step), and at the same time, transmits a desired message inputted by the user. At this time, the portable terminal 11 transmits, to a base station 10a (see FIG. 1), the obtained positional information in the form of a radio signal.

Then, the service center 19 writes the positional information sent in the information transmitting step and information on a retrieval subject in the database 15 (registering step). In this case, in order to prevent the overwriting on information bubbles written in advance, the service center 19 sets spatial occupancy information so as to avoid the overlapping between a plurality of information bubbles.

In this way, messages from a plurality of users are registered in the service center 19.

Moreover, according to the first modification, in an information providing service method according to the present invention, bubble data (presenting tower bubble) of the presenting tower is retrieved to obtain a URL corresponding to the presenting tower bubble so that a message and service information written in the URL is transmitted to the portable terminal 11.

Accordingly, for example, selling and buying information is interchanged between a large number of users so that the information presenting tower 10b functions as a waiting square.

In FIG. 25(b), are shown information bubbles B1 and B2. Each of the information bubble B2 is a bubble registered by a user (individual), and it has a small bubble diameter. The information bubble B1 has a large bubble diameter, and includes a large number of information bubbles B2. That is, the information bubble B1 functions as a presenting tower information bubble.

Thus, when selecting the information bubble B1, the user can acquire all or specified information bubbles B2 included in the information bubble B1.

Therefore, even if the information bubbles B2, a retrieval vector V from a user intersects, are only two in number, the user can easily retrieve these small information bubbles B2.

FIG. 26(a) is an illustration of one example of bubble data according to the first modification of the first embodiment of the present invention, and FIG. 26(b) is an illustration of one example of information display according to the first modification of the first embodiment of the invention. In FIG. 26(a), of spatial occupancy information, the information written at the uppermost position represents the information bubble B1 having, for example, a bubble diameter of 20 m. Furthermore, each of the information written below denotes the information bubble B2 having a bubble diameter of 1 m. When a user clicks a URL corresponding to the information bubble B1, all the small information bubbles B2 included in the large information bubble B1 appear as shown in FIG. 26(b). Additionally, through the use of a phone-to function, the direct phoning to the information displayed becomes possible. Incidentally, it is also possible to set such that a bubble diameter "1" denotes a distance of 5 m and a bubble diameter "2" denotes a distance of 10 m.

Thus, the user can easily register information through the portable terminal 11, while other users can easily acquire that information.

Accordingly, regional information or the like is used effectively, and the system operating enterprise can provide a high value added service on business or individually, while the user can receive a higher value added service.

(A2) Description of Second Modification of First Embodiment of the Invention

The second modification relates to a service in a terminal of public transportation such as railroad and bus.

Figure 27:
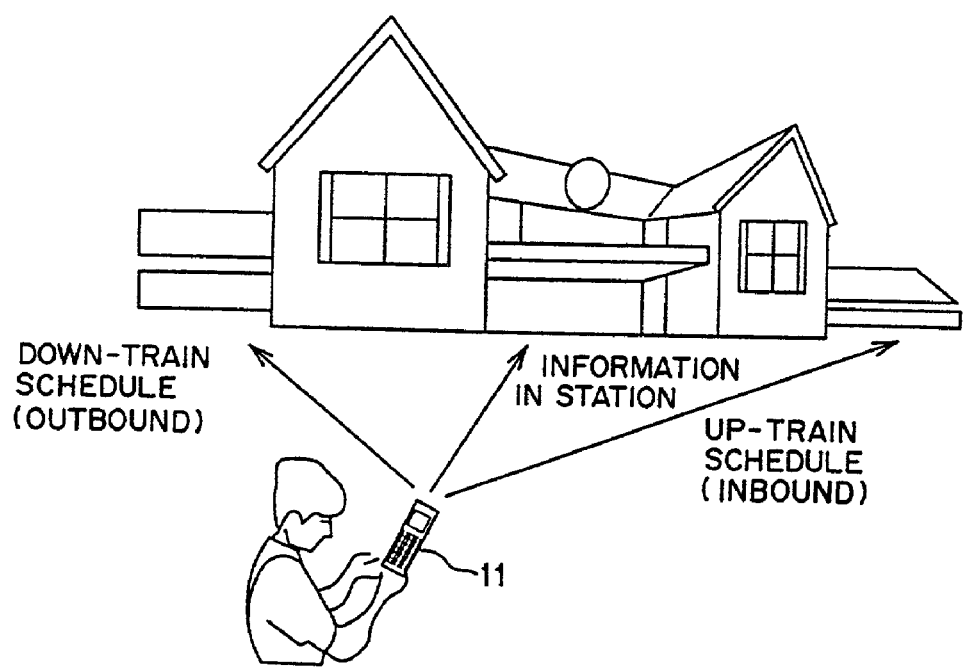
FIG. 27 is an illustration useful for describing a service according to a second modification of the first embodiment of the invention.

FIG. 27 is an illustration useful for explaining a service according to the second modification of the first embodiment of the present invention. In FIG. 27, a user around a station can acquire needed information through the portable terminal 11.

Although omitted from illustration, the database 15 is made to retain service information on public transportation terminals and information on transportation time as bubble data.

Figure 28:
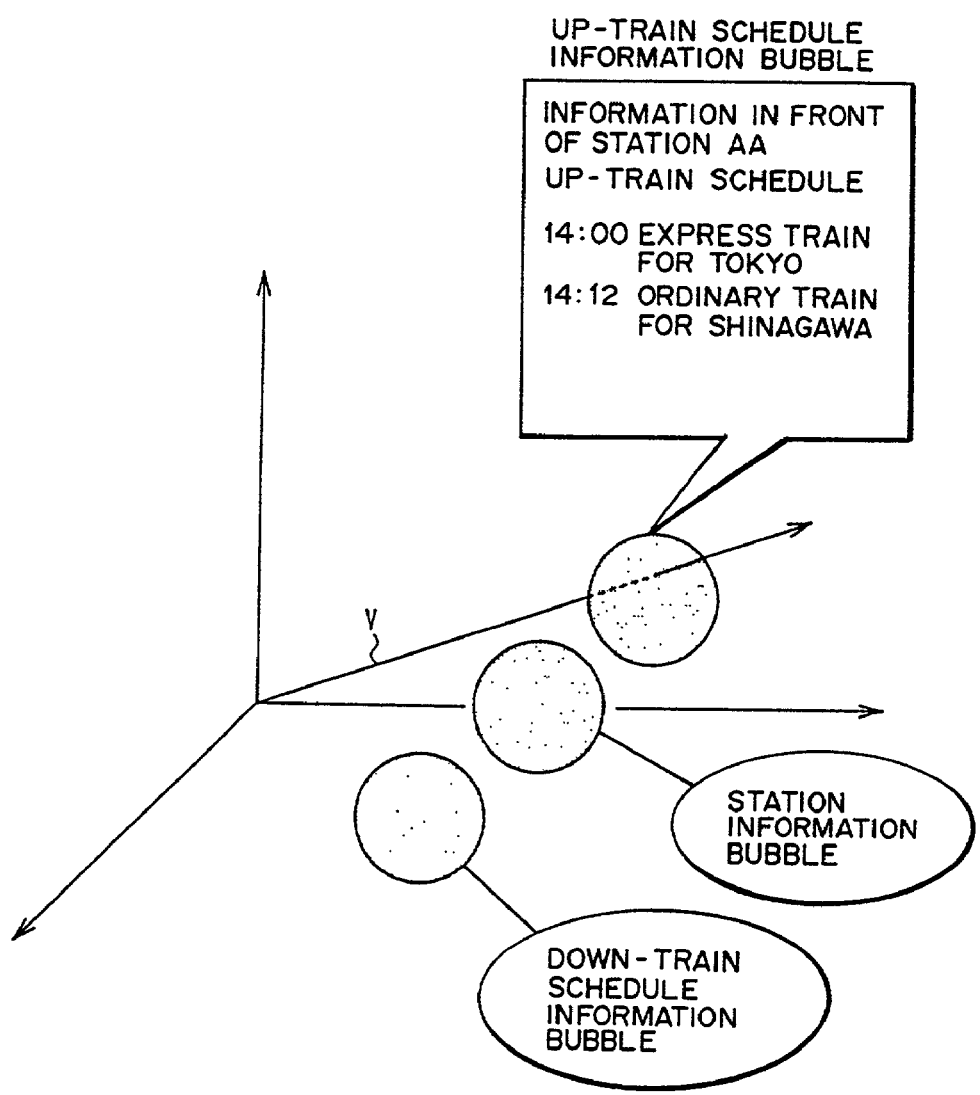
FIG. 28 is an illustration of an image of spatial occupancy information of bubble data according to the second modification of the first embodiment of the invention.

FIG. 28 is an illustration of images (information bubbles) of spatial occupancy information of bubble data according to the second modification of the first embodiment of the present invention. In FIG. 28, the information bubbles of up/down-train schedule information and station information are separately generated. Furthermore, when a user faces the portable terminal 11 toward each direction for hitting the information bubbles individually, the concrete time in each direction appears on the portable terminal 11.

Accordingly, the user can easily learn to precise time. In addition, the user can obtain useful information from the external without entering a station for seeing a train schedule or guide plate.

Incidentally, it is also possible to represent information bubbles, generated separately, as one information bubble.

Figure 29:
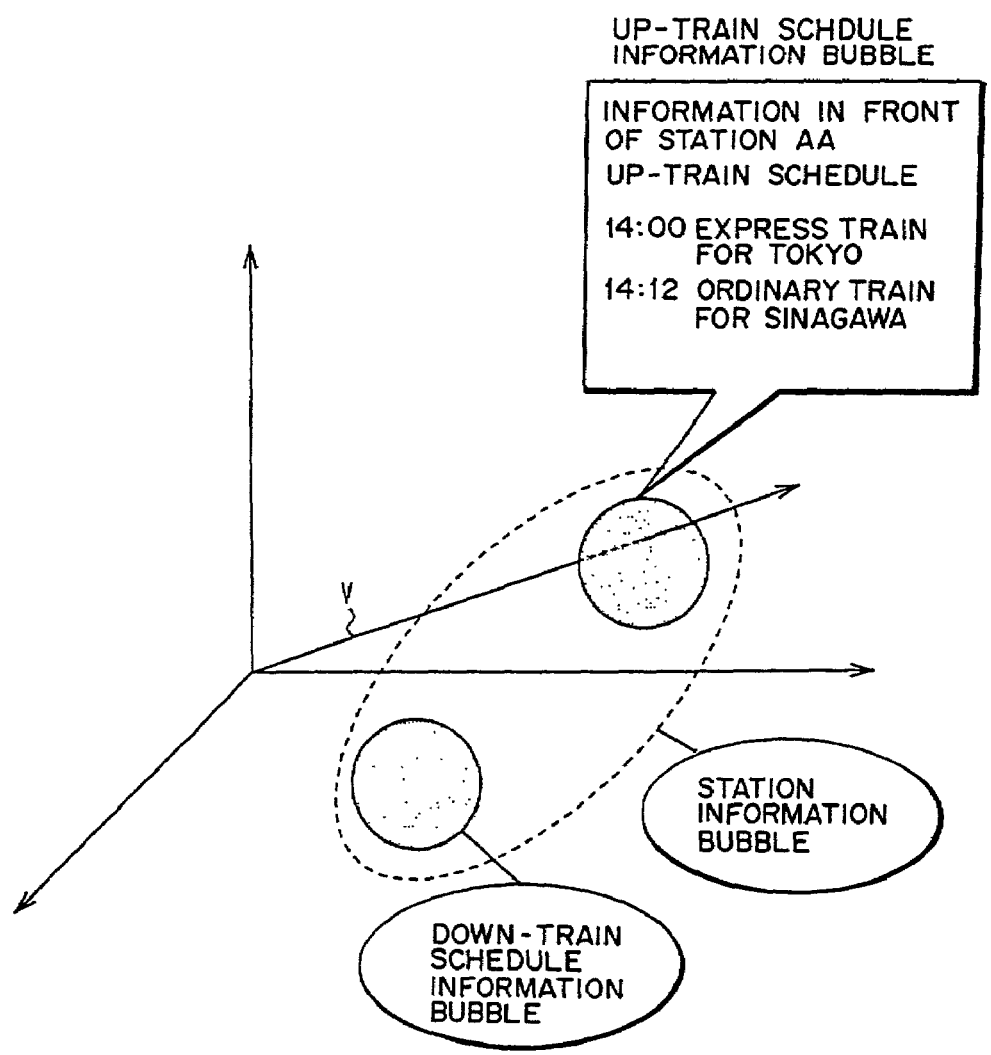
FIG. 29 is an illustration useful for describing a second example of a service according to the second modification of the first embodiment of the invention.

FIG. 29 is an illustration useful for explaining a second example of a service according to the second modification of the first embodiment of the present invention. In FIG. 29, a station information bubble is a large information bubble including up/down-train schedule information bubbles and station yard information (not shown). When a user selects this large information bubble, the up/down-train schedule information are collectively displayed on the portable terminal 11.

In addition, the database 15 is made to update information on transportation time according to the present time, and for example, the up-train schedule is displayed in connection with the present time.

Thus, since the train schedule information bubble varies momentarily, for example, when an accident happens, the user can precisely learn to transportation time, which improves the quality of the service.

Although not shown, this service is also applicable to schedule management for bus or taxi, and information bubbles can be set according to up-lane/down-lane. Accordingly, even if a bus or a taxi cannot travel precisely because of being involved in traffic congestion, the user can obtain precise information owing the present time.

(A3) Description of Third Modification of First Embodiment of the Invention

A third modification relates to a service for moving objects such as motor vehicles and people in walk. The database 15 is made to sequentially update the bubble diameter of spatial occupancy information of bubble data on the basis of positional information transmitted from a moving object.

Figure 30:
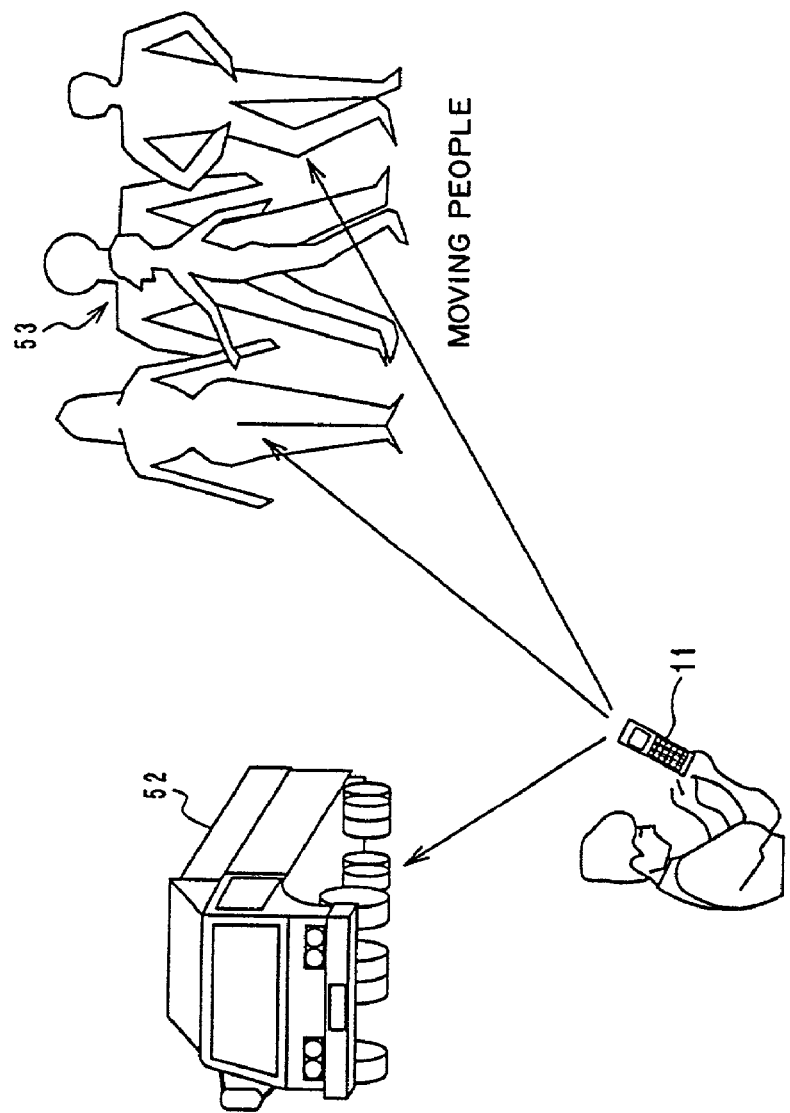
FIG. 30 is an illustration useful for describing a service according to a third modification of the first embodiment of the invention.

FIG. 30 is an illustration useful for explaining a service according to the third modification of the first embodiment of the present invention. In FIG. 30, a motor vehicle 52 or a person 53 in walk individually generates and registers bubble data.

That is, the motor vehicle 52 transmits positional information at that time to the service center at an interval of predetermined time or travel distance. Moreover, the person 53 himself/herself also transmits positional information at that time.

Figure 31:
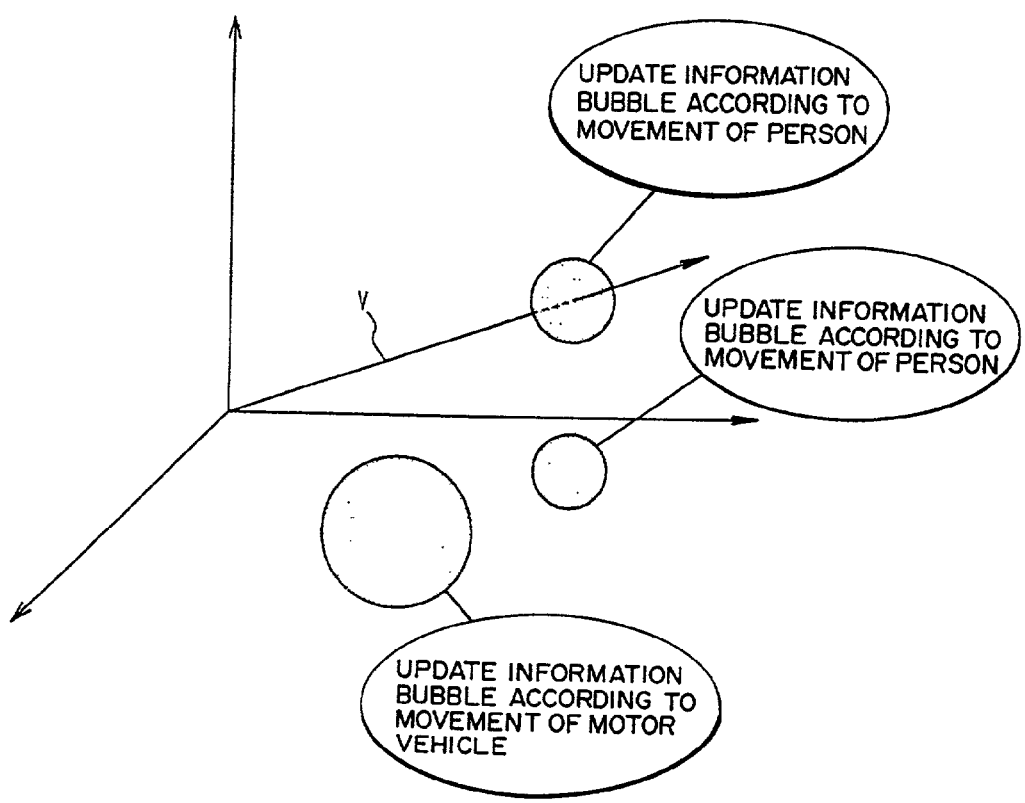
FIG. 31 is an illustration of an image of spatial occupancy of bubble data according to the third modification of the first embodiment of the invention.

FIG. 31 is an illustration of images (information bubbles) of spatial occupancy information of bubble data according to the third modification of the first embodiment of the present invention. In FIG. 31, the positions of the information bubbles vary with the movement of the motor vehicle 52 or the people 53. Sequential updating of the contents held in the URL is also possible.

Accordingly, a user can face the portable terminal 11 toward the motor vehicle 52 for obtaining information (for example, advertisement) of the motor vehicle 52. In addition, since the information is updated at a high frequency, the user can get fine information.

(A4) Description of Fourth Modification of First Embodiment of the Invention

This modification relates to an example of rendering a service in exhibition halls such as art museum.

Figure 32:
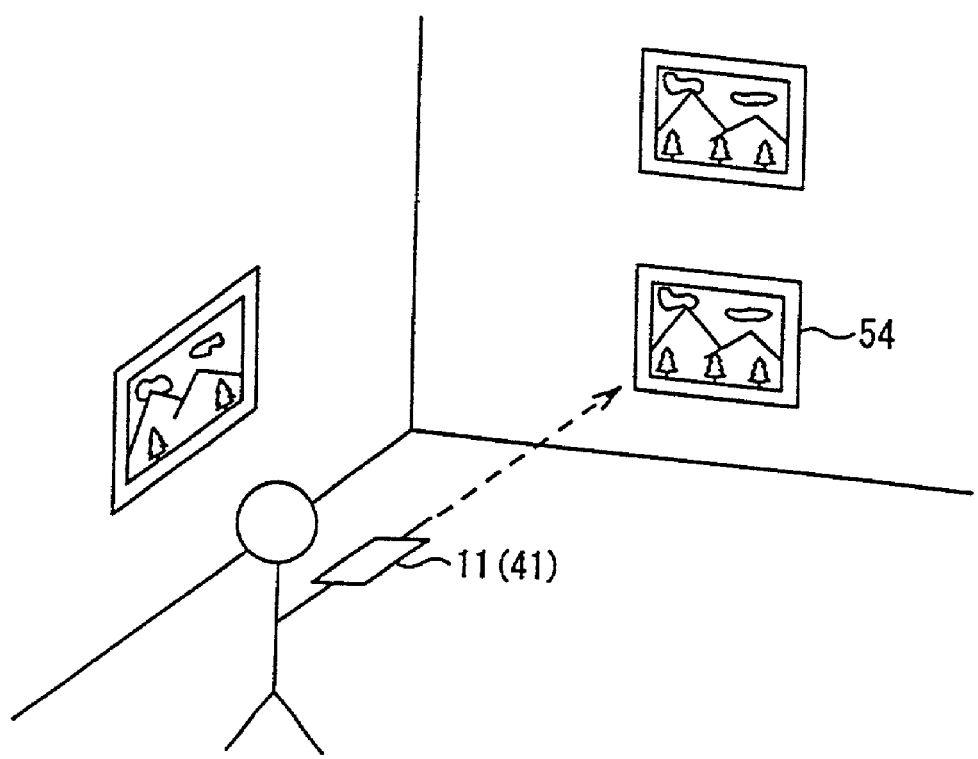
FIG. 32 is an illustration useful for describing a service according to a fourth modification of the first embodiment of the invention.

FIG. 32 is an illustration useful for explaining a service according to a fourth modification of the first embodiment of the present invention. In FIG. 32, pictures 54 are placed in an art museum. In addition, a server (not shown) including a database is installed in this art museum, and when facing the portable terminal 11 toward the picture 54, a user can obtain information on the picture 54.

Accordingly, even in small-scale facilities, the user can offer a service through the use of his/her own portable terminal 11.

In addition, in this modification, it is also appropriate that the portable terminal 11 is equipped with a distance measuring sensor 11$k$.

Figure 33:
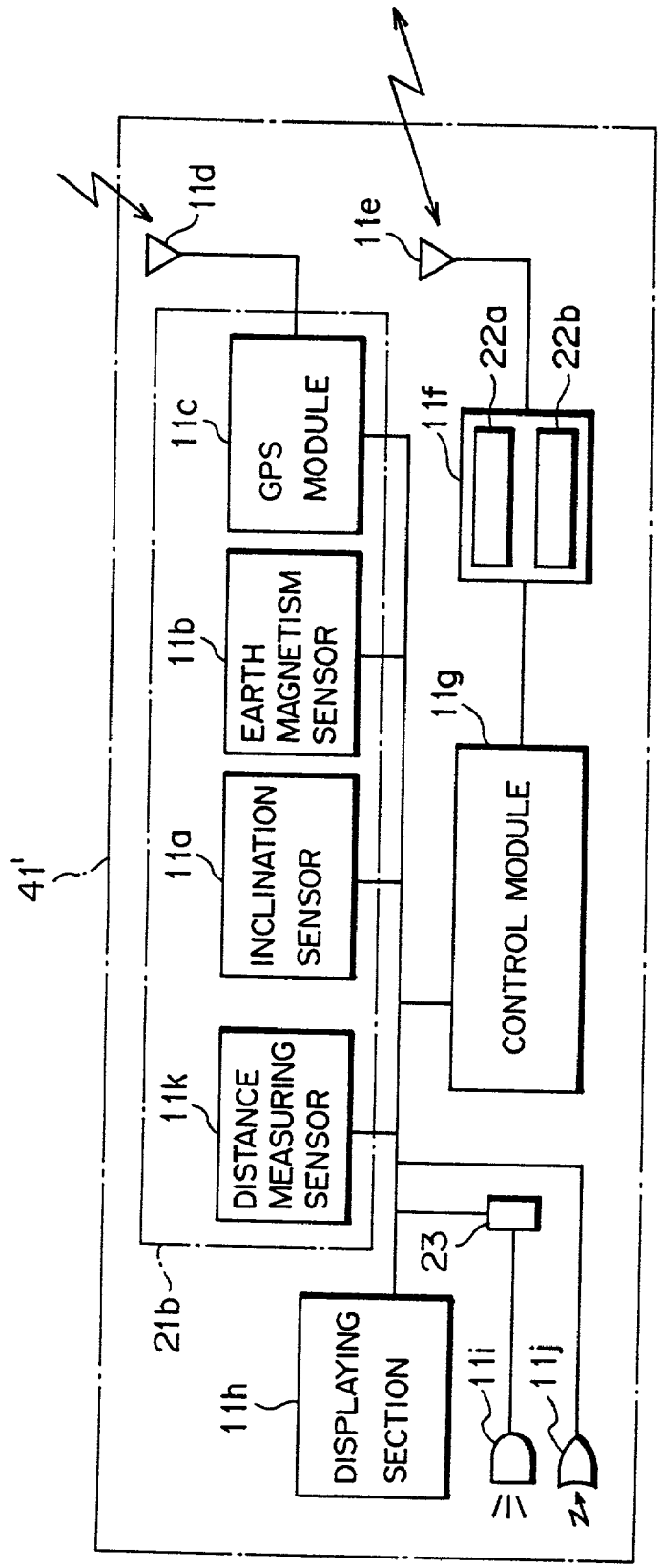
FIG. 33 is a block diagram showing a portable terminal according to the fourth modification of the first embodiment of the invention.

FIG. 33 is a block diagram showing a portable terminal according to the fourth modification of the first embodiment of the present invention. In FIG. 33, a portable terminal 41' is of a type having a function to measure a distance between an object and the portable terminal 41', but other functions thereof are the same as those of the above-mentioned portable terminal 11. In FIG. 33, the parts marked with the same numerals as those used above display the same or corresponding features, and the description thereof will be omitted because of repetition.

The distance measuring sensor 11$k$ is for measuring a distance between the portable terminal 41' and another object. When a user faces the portable terminal 41' toward the picture 54, the distance measuring sensor 11$k$ measures the distance between the user and the picture 54. The portable terminal 41' transmits the distance therebetween to the server installed in the museum, and the server retrieves information in a desired range on the basis of that distance, thus allowing the user to obtain desired information.

Incidentally, it is also acceptable that the user inputs a distance with his/her hand in place of the use of the distance measuring sensor 11$k$.

This decreases the volume of information the portable terminal 41' transmits to the server installed in a facility, which improves the transmission/reception efficiency. Accordingly, the server can accept more access from the users, thus resulting in improvement of service quality.

In addition, this modification is also applicable to a case of providing information on play or game facilities in a theme park, information on constellations in a planetarium and information on history or topography, such as mountain, river, peninsula and island in a sight-seeing resort.

In this case, the portable terminal 11 (or the portable terminal 41') is designed to set a mode dedicated to each information. For example, a mode "constellation information retrieving mode" is set separately from a bubble data receiving mode.

Therefore, a user can avoid confusion with the ordinary bubble data and can obtain appropriate information according to spot.

(A5) Description of Fifth Modification of First Embodiment of the Invention

This modification relates to a case in which the portable terminal 11 is not equipped with a direction sensor 11b.

Figure 34:
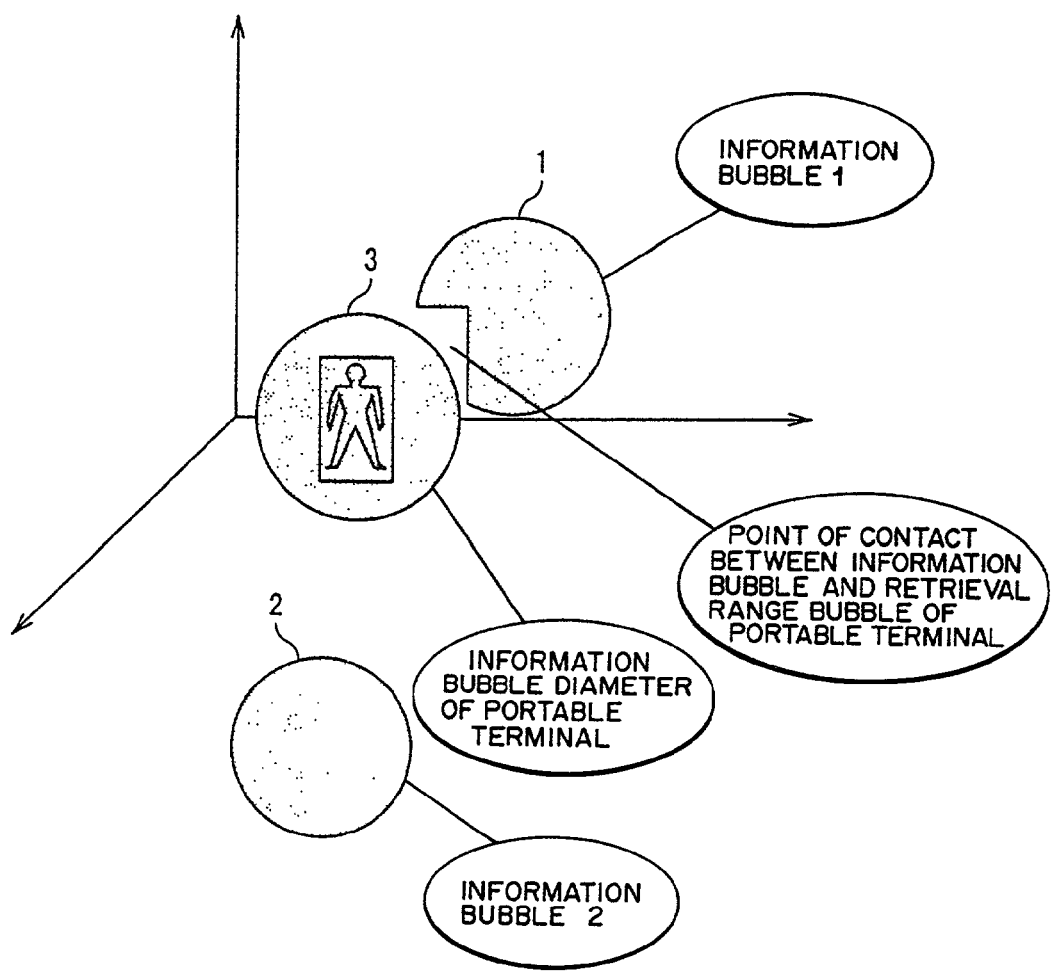
FIG. 34 is an illustration useful for describing a service according to a fifth modification of the first embodiment of the invention.

FIG. 34 is an illustration useful for explaining a service according to the fifth modification of the first embodiment of the present invention. In FIG. 34, an information bubble 3 lies between other information bubbles 1 and 2, and by enlarging its bubble diameter, the information bubbles 3 is retrieved in a state brought into contact with the information bubble 1 or 2. In this case, the information bubble 3 comes into contact with the information bubble 1 but it does not contact with the information bubble 2. Thus, in this example, the information on only the information bubble 1 undergoes retrieval, and the extracted information is transmitted from the service center 19 to the portable terminal 11.

In addition, it is also possible that the bubble diameter of the spatial occupancy information of bubble data involving confidential information is set at a small value while the bubble diameter of the spatial occupancy information of bubble data having enterprise's propagation/advertisement information is set at a large value.

Still additionally, the retrieval of the bubble data takes place after the user designates the value of the bubble diameter. Accordingly, a system operating enterprise such as a content provider can sell a specified spatial range to enterprise in view of enterprise's propagation. The price thereof can be calculated on the basis of the spatial occupancy information and the bubble diameter.

Thus, even if a sensor group of the portable terminal 11 gets out of order, the user can accomplish the retrieval, and since the retrieval range can be changed only by increasing the bubble diameter, easy information retrieval becomes possible.

(B) Description of Second Embodiment of the Invention

A service according to the second embodiment is similar to the service according to the first embodiment, except that the interchange of data between the service center 19 and the portable terminal 11 takes place through a mail. The mail server 13d (see FIG. 3) and the mail transmitting/receiving section 18d (see FIG. 2) have a function (GPS mapping feature) to associate a latitude, a longitude, an altitude and a bubble diameter with a mail address.

Figure 35:
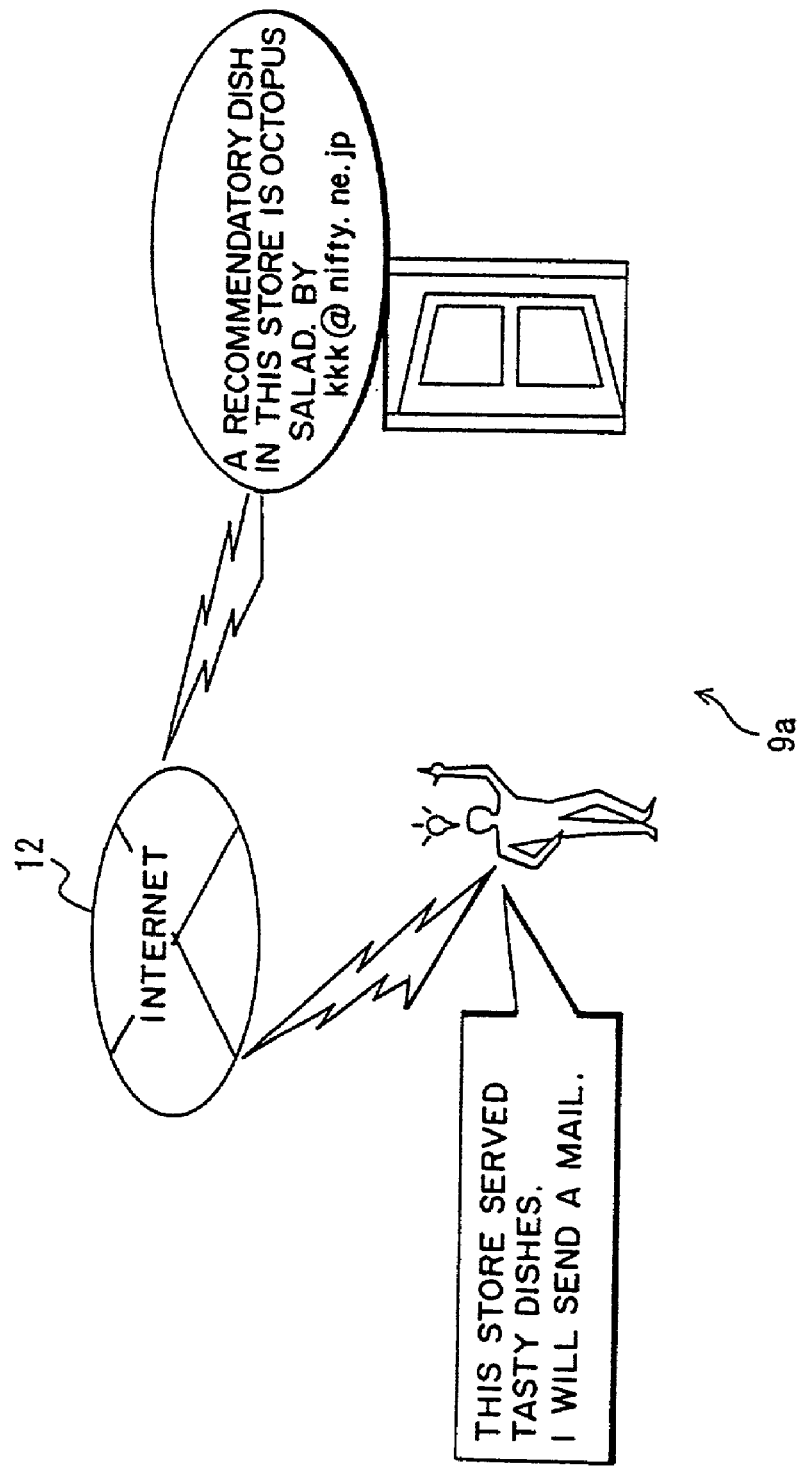
FIG. 35 is a conceptual illustration of a service according to a second embodiment of the invention.

FIG. 35 is a conceptual illustration of a service according to the second embodiment of the present invention. In FIG. 35, a system 9a constitutes an information providing service system comprising a service center 19 retaining data in which spatial occupancy information composed of a latitude of an object (for example, an actually existing object such as a building, each floor of a building and a sign, or an object traveling in a space), a longitude thereof, an altitude thereof and a bubble diameter thereof is associated with assorted information related to this object or information such as a URL related to the assorted information, and a portable terminal (user terminal) 11 connected through an internet 12 to the service center 19 and made to display service information attached to information.

Furthermore, in FIG. 35, a user writes the acquired information in a database 15 (see FIG. 2) through the use of a mail. For example, the user registers the names of recommendatory meals through a mail, while other users see the contents.

Still furthermore, the database 15 sets data, in which information on a latitude of the portable terminal 11, a longitude thereof and an altitude thereof and spatial occupancy information are mutually associated with each other, as a mail address, and retains bubble data in association with this mail address.

That is, the positional information itself is used as a mail address, and service information is directly associated with the mail address. Therefore, for example, application to a message notifying plate service in a station. A user can leave a message to another waiting user without writing the message on a blackboard.

The owner of a restaurant registers service information such as food and drink in a state linked with bubble data so that the owner can advertise his/her store to general users. Accordingly, enterprise indicates the mail address as destination of opinions or the like to users, and hence, the bubble data corresponding to that mail address is utilizable.

Figure 36:
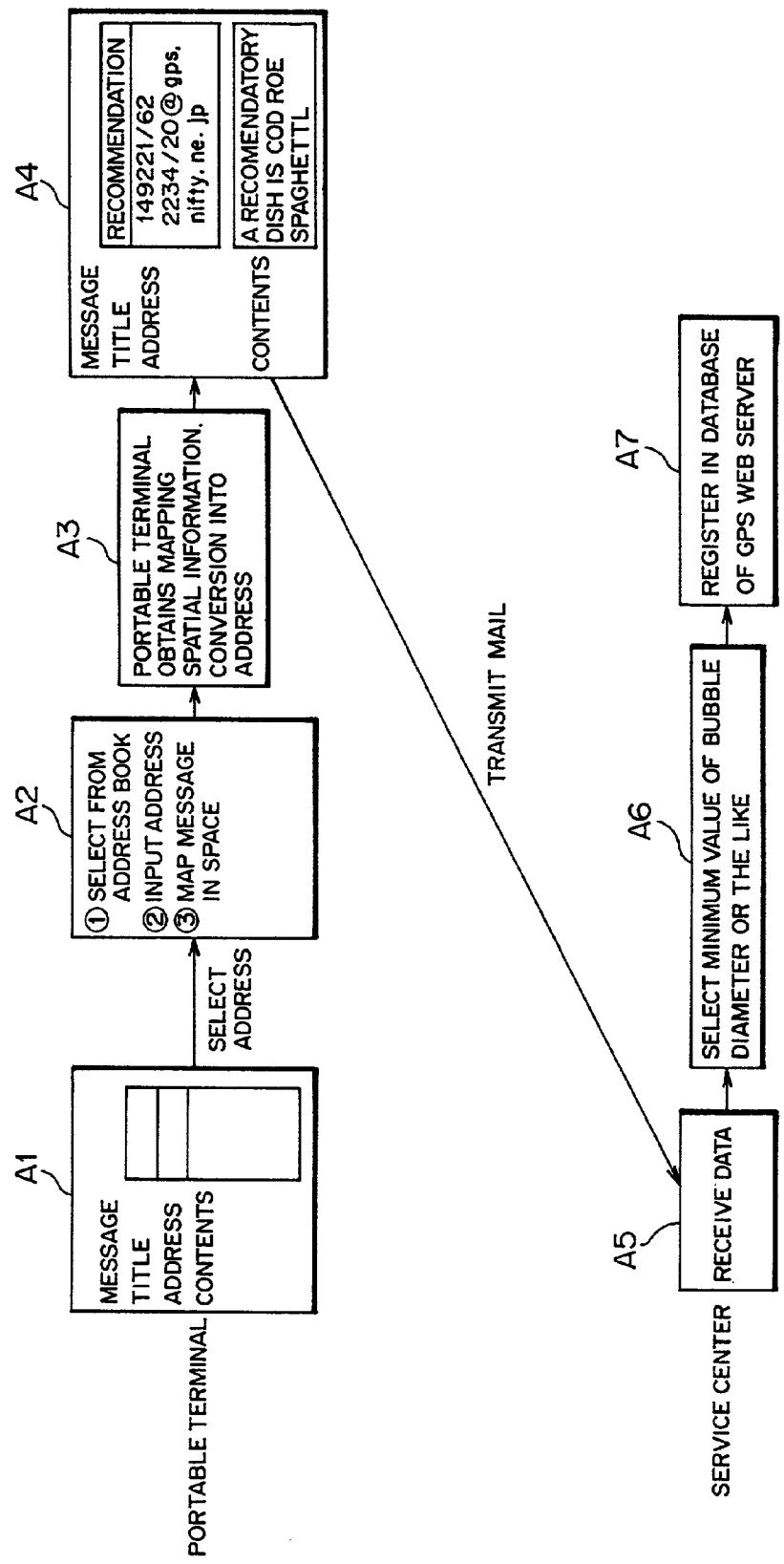
FIG. 36 is a sequence illustration useful for describing registration in an information providing service system according to the second embodiment of the invention.

FIG. 36 is a sequence illustration useful for explaining registration in the information providing service system according to the second embodiment of the present invention, showing an example of registration using a mail.

First, the portable terminal 11 displays an input screen (step A1), and when the user selects an address on the screen, makes switching to an input screen corresponding to that address (step A2) At a step A3, when the user selects "map message in space", the portable terminal 11 acquires positional information and converts it into a mail address.

In addition, the user inputs a message (step A4), and transmits that mail to the service center 19. When receiving the mail data (step A5), the service center 19 selects the minimum value for the bubble diameter or the like (step A6) and writes it in the database 15 of the web server (GPS web server) 13b or the web information outputting section 18b (step A7).

Figure 37:
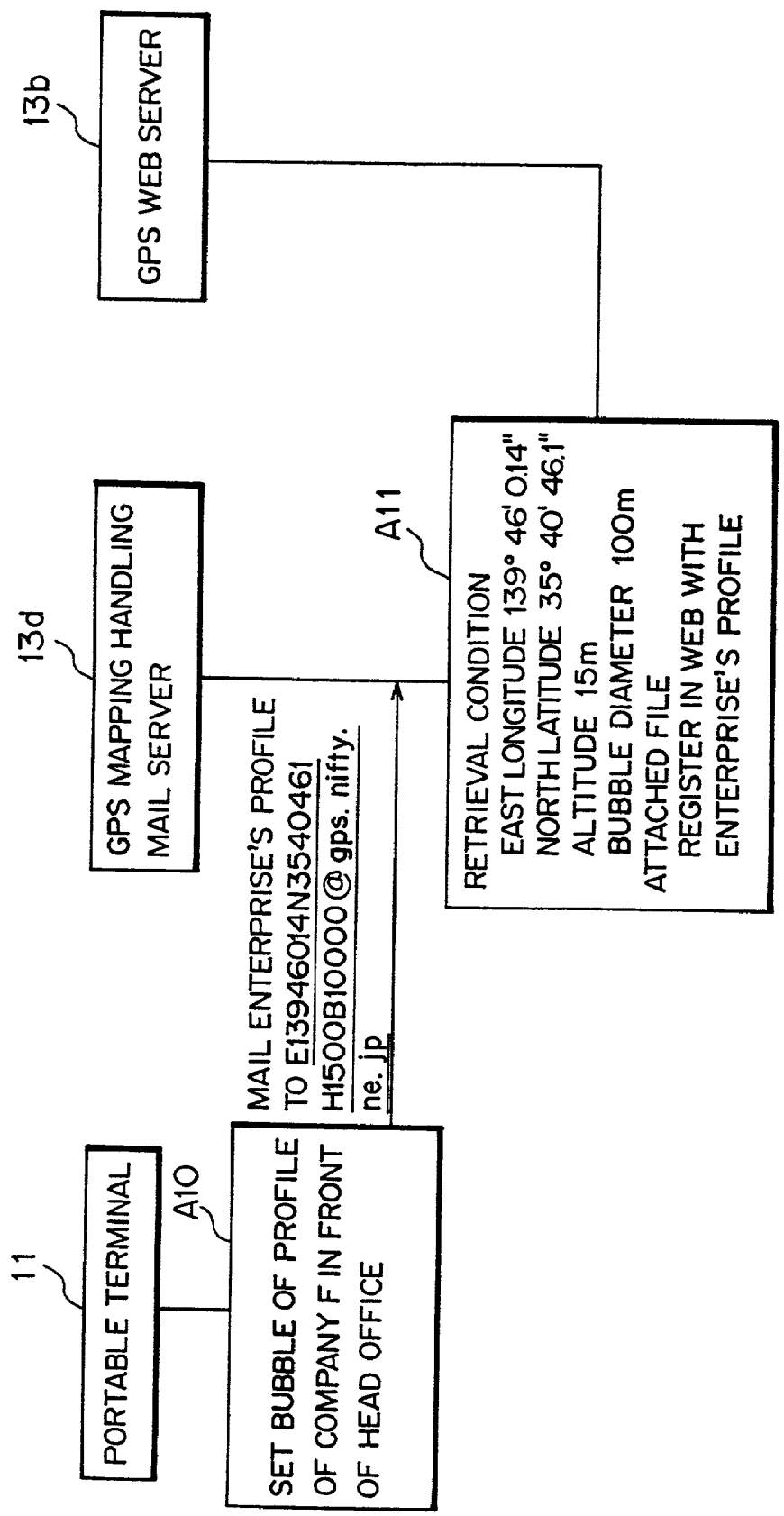
FIG. 37 is a sequence illustration useful for describing an information providing service system according to the second embodiment of the invention.

FIG. 37 is a sequence illustration useful for explaining an information providing service according to the second embodiment of the present invention, showing interchange of data among the portable terminal 11, the mail server (GPS mapping mail server) 13d and the web server (GPS web server) 13b.

First, at step A10, a user (for example, a person in charge in an enterprise) sets bubble data of an enterprise profile of an company F in front of the company F in Tokyo. The position of the setting of this bubble data is at 139°46'0.1.4" East Longitude and 35°40'46.1" North Latitude, and is at an altitude of 15 m and further is 100 m in bubble diameter. In addition, the user sets a mail address in conjunction with this enterprise profile. For example, this address is E13946014N3540461H1500B10000@gps.nifty.ne.jp. Still additionally, the user mails a retrieval condition and the enterprise profile to this address.

At a step A11, the mail server 13d receives the aforesaid retrieval condition and enterprise profile, and starts the retrieval and registers the attached file as an enterprise profile in the web server 13b.

Thus, the user transmits a value indicative of a predetermined range as a mail address, thereby retrieving bubble data including spatial occupancy information existing in that range.

Accordingly, a retrieval tag based on a position can be put to use, and the user can easily and fast information.

In this case, for example, bubble data in which a bubble diameter is set at a large value is easy to retrieve, whereas bubble data in which a bubble diameter is set at a small value is relatively hard to retrieve. For this reason, alternatively, the bubble diameter of the bubble data including secret information is set at a small value, while the bubble diameter of the bubble data including information on advertisement, such as an enterprise profile, to as many users as possible is set at a large value.

Figure 38:
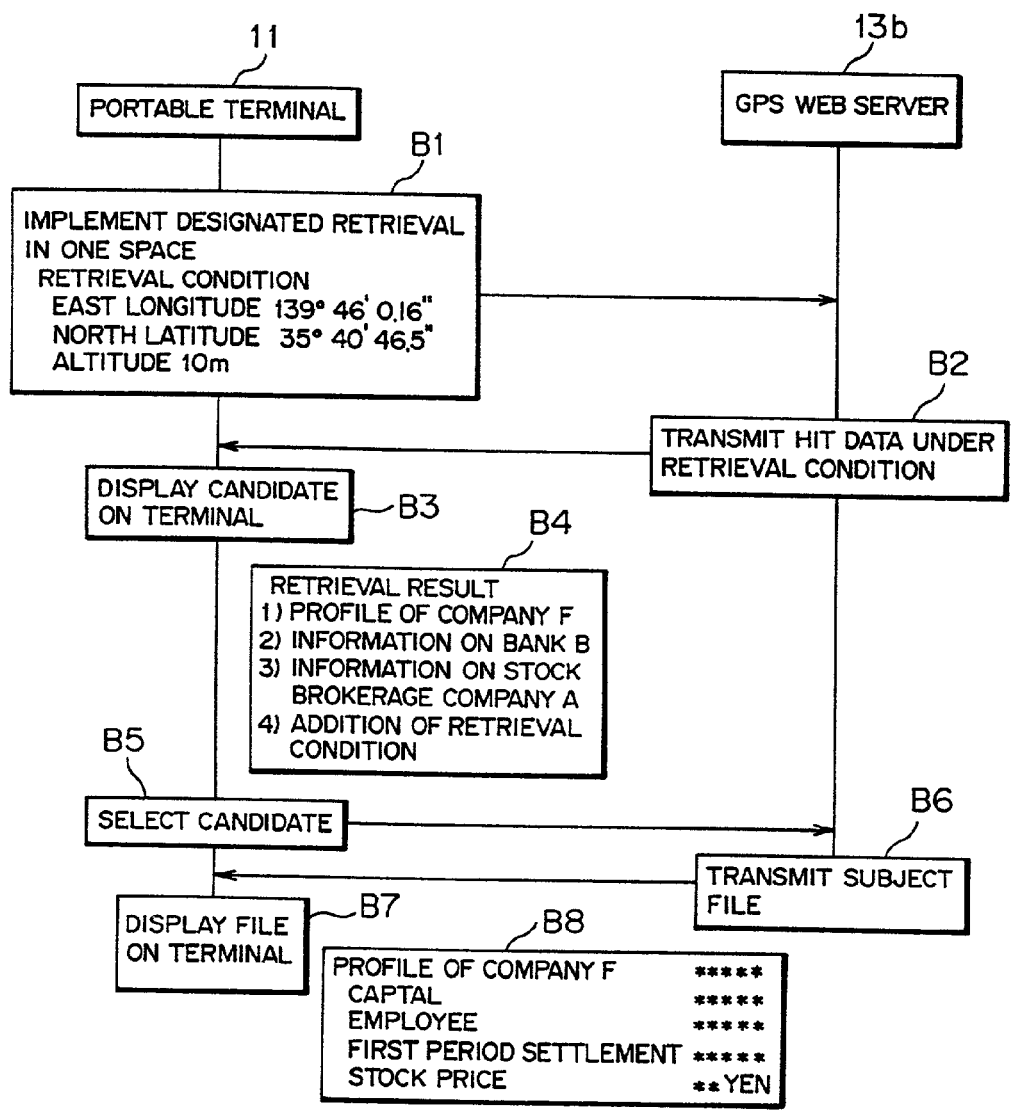
FIG. 38 is a sequence illustration useful for describing a retrieving method according to the second embodiment of the invention.

FIG. 38 is a sequence illustration useful for explaining a retrieving method according to the second embodiment of the present invention. In FIG. 38, at a step B1, a user conducts a designated retrieval through the use of the portable terminal 11. In this case, the retrieval condition is the same as that mentioned above. The portable terminal 11 transmits this condition to the web server 13b and makes a request for the retrieval. For example, the transmission content is http://www.gps.nifty.ne.jp/Titles?qt=%C5%EC% B7%D0139%A1%EB46%A1%C701.6%A1%C9%CB% CC%B0%DE35%A1%EB40%A1%C746.5%A1%C9% B9%E2%C5%D9%A3%B10%A3%B10%A3%ED& SUBMIT=+%B8%A1%BA%F7+&1K=no frames&svx= 100600&col=JW.

Following this, at a step B2, the web server 13b makes a retrieval on the retrieval condition and displays the hit data and further transmits it to the portable terminal 11. At a step B3, the portable terminal 11 displays candidates hit in the retrieval result. This display example is as shown in a display B4. Subsequently, the user selects a candidate (step B5), and transmits it to the web server 13b. At a step B6, the web server 13b transmits a file forming a subject to the portable terminal 11. At a step B7, the portable terminal 11 displays the contents of that file, and the user obtains a profile such as capital (see display B8).

In this way, a mail address is used as a position tag, and data and a message linked with the mail address are outputted to the user so that the user can obtain information on advertisement of an enterprise or menu and reputation of a restaurant.

In addition, the user can retrieve information on a building in his/her visual range with an analog sensation such as "this way".

Still additionally, since a service takes place between the portable terminal 11 and the web server 13b, the restaurant can realize a service without using special equipment.

Moreover, since the user designates the value of the bubble diameter for retrieval, a system operating enterprise such as a content provider sell a specified spatial range to enterprise in view of enterprise's propagation. The price thereof can be calculated on the basis of the spatial occupancy information and the bubble diameter.

(C) Description of Third Embodiment of the Invention

A system 9 according to the third embodiment is for providing a navigation (road guide) service using voice. That is, a service center 19 recognizes a viewing direction transmitted from a portable terminal, and transmits a target (for example, sign) in user's sight to the portable terminal on the basis of map data for offering a navigation through the use of an audio circuit placed in the portable terminal.

The system 9 according to the third embodiment also constitutes an information providing service system comprising a server retaining data in which spatial occupancy information composed of a latitude of an object (for example, an actually existing object such as a building, each floor of a building and a sign, or an object traveling in a space), a longitude thereof, an altitude thereof and a bubble diameter thereof is associated with assorted information related to this object or information such as a URL related to the assorted information, and a portable terminal (user terminal) connected through an internet 12 to the server and made to display service information attached to information.

Figure 39:
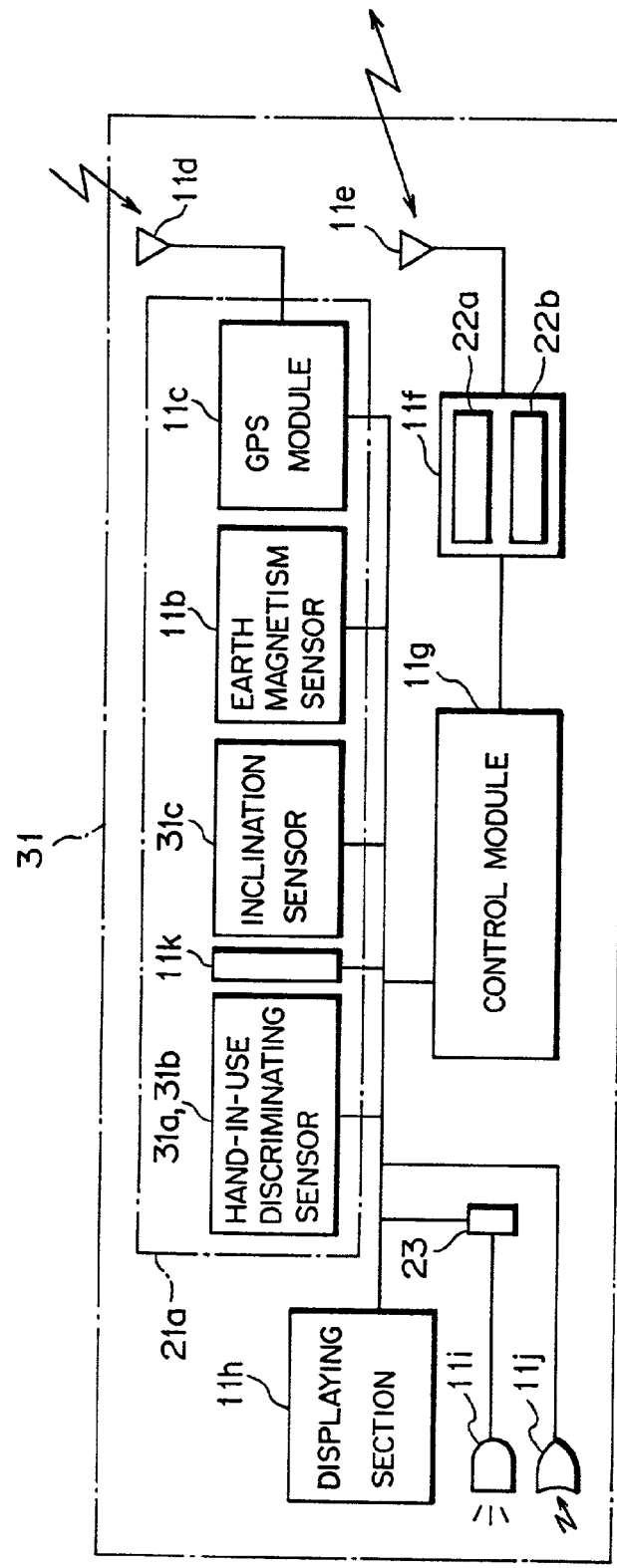
FIG. 39 is a block diagram showing a portable terminal according to a third embodiment of the invention.

FIG. 39 is a block diagram showing a portable terminal according to the third embodiment of the present invention. In FIG. 39, a portable terminal 31 is connected through the internet 12 to a service center 19 and is made to display service information attached to information, and is, for example, a portable telephone. In addition, the portable terminal 31 is equipped with a voice guide section, and a detecting section 21a for detecting a terminal position includes a GPS module 11c, an earth magnetism sensor 11b, a distance measuring sensor 11k, an inclination sensor 31c and hand-in-use discriminating sensors (hand-in-use discriminating sections) 31a and 31b.

In FIG. 39, the parts marked with the same numerals as those used above have the same or corresponding functions, and the description thereof will be omitted because of avoiding repetition.

The voice guide section 23 is for conducting a navigation to a providing place of specified service information, received in a second receiving section 22b, through the use of a speech file. This function is realizable by a ROM placed in the portable terminal 31. That is, the voice guide section 23 has a plurality of types of speech files to output voice data, such as "go straight on", "turn right at the next corner" and "turn left at the next corner" on the basis of, for example, identification information transmitted from the service center 19.

Thus, it is possible to reduce the volume of data to be transmitted from the service 19 to the portable terminal 31. In addition, the portable terminal 31 transmits its own posture information to the service center 19, while in notifying a user of a target, in place of transmitting voice data, the service center 19 transmits identification information to reproduce a desired speed file for presenting it to the user.

FIGS. 42(a) and 42(b) are illustrations useful for explaining a method of detecting an inclination angle according to the third embodiment of the present invention. In FIG. 42(a), an inclination sensor 31c detects an inclination of the head of a user to detect a viewing direction on the basis of the inclination angle. In addition, the user arranges the line of sight, the portable terminal 31 and a retrieval subject in a straight line.

In FIG. 42(b), when viewed from the front side, the bottom surface of the portable terminal 31 is tilted to make an inclination angle $\alpha$ ($\alpha$ is a real number between 0 and 90) with respect to the horizontal plane, thereby detecting the user's viewing direction. Incidentally, if the bottom surface of the portable terminal 31 is not in a horizontal condition, the inclination angle $\alpha$ signifies an angle a plane perpendicular to the longitudinal axis penetrating the housing of the portable terminal 31 makes with respect to the horizontal plane.

In addition, a second transmitting section 22a of the portable terminal 31 is designed to transmit, to the service center 19, the user's viewing direction detected on the basis of the inclination angle of the portable terminal 31 with respect to the horizontal plane, while the service center 19 retrieves a retrieval subject, the user wants, on the basis of that viewing direction. Accordingly, since the inclination angle of the portable terminal 31 is detectable automatically, the user can receive a speech navigation service smoothly.

Moreover, in FIG. 39, each of the hand-in-use discriminating sensors 31a and 31b is for detecting the number of fingers put on the housing of the portable terminal 31 to discriminate a user's hand which is in use (holding). In a case in which the user carries the portable terminal 31, the difference between the right hand and the left hand causes the inclination angles of the portable terminal 31, made when the human body faces the front, to be become just opposite to each other. For this reason, one of the user's right and left hands which holds the portable terminal 31 is detected automatically to acquire an inclination angle thereof.

Figure 40:
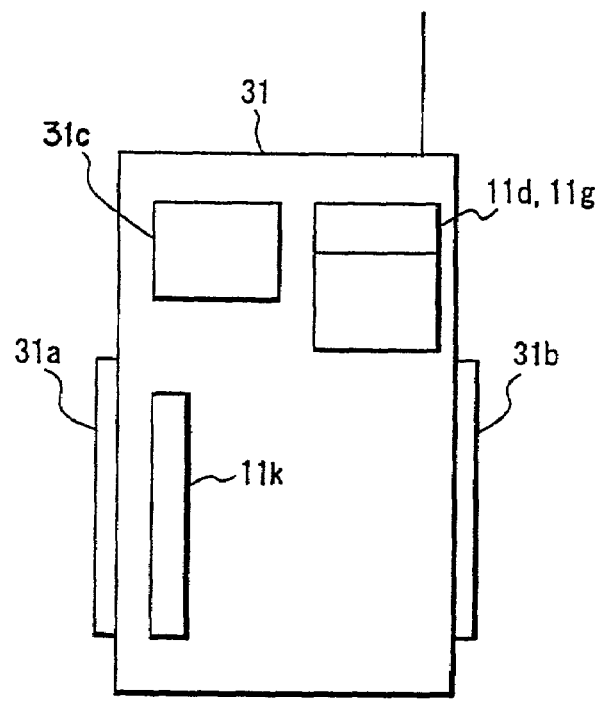
FIG. 40 is a front elevational view showing the portable terminal according to the third embodiment of the invention.

FIG. 40 is a front elevational view showing the portable terminal 31 according to the third embodiment of the present invention, where the hand-in-use discriminating sensors 31a and 31b are provided on side surfaces of the housing. Each of these hand-in-use discriminating sensors 31a and 31b is realizable by, for example, a device using a variable resistor. That is, it is possible to use a device having a function whereby the detection of the difference between one finger and four fingers is feasible on the basis of a variation in resistance of only a portion touched by the finger.

Figure 41:
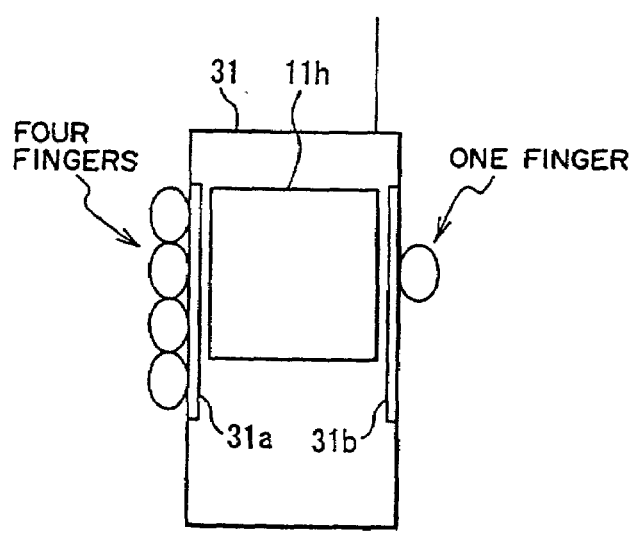
FIG. 41 is an illustration useful for describing a hand-in-use discriminating sensor according to the third embodiment of the invention.

FIG. 41 is an illustration useful for explaining the hand-in-use discriminating sensors 31a and 31b according to the third embodiment of the present invention. In FIG. 41, the portable terminal 31 is held by the right hand of a user. The hand-in-use discriminating sensor 31a detects that four fingers touch the housing, while the hand-in-use discriminating sensor 31b detects one finger. If the user shifts the portable terminal 31 to his/her left hand, the hand-in-use discriminating sensors 31a and 31b detect four fingers and one finger, respectively.

Accordingly, the user's hand used is automatically discriminated from the other hand on the basis of detected locations of fingers, which reduces the volume of information on the direction of the portable terminal 31 to be transmitted to the service center 19.

Figure 43:
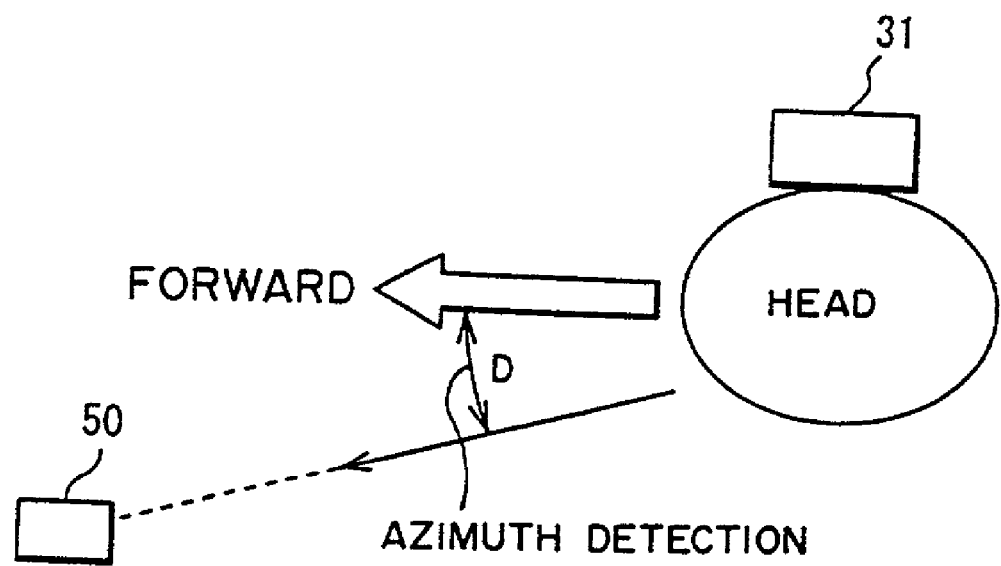
FIG. 43 is an illustration useful for describing a direction detecting method according to the third embodiment of the invention.

FIG. 43 is an illustration useful for explaining a method of detecting an azimuth according to the third embodiment of the present invention, showing the head of a user viewed from the above. In FIG. 43, the portable terminal 31 acquires a direction from the portable terminal 31 to an object 50 on the basis of a user's viewing direction (frontward) and earth magnetism. In this case, the earth magnetism sensor 11b placed inside the portable terminal 31 or outside the housing acquires a value of the earth magnetism, thus providing an azimuth D.

Furthermore, the second transmitting section 22a of the portable terminal 31 transmits, to the service center 19, the user's viewing direction detected on the basis of the inclination angle of the portable terminal 31 with respect to the horizontal plane, while the service center 19 retrieves a desired retrieval subject on the basis of that viewing direction.

Thus, the user's viewing direction is recognized on the basis of map data, and the user can obtain information on a target (for example, sign) in sight. In addition, the voice guide section 23 reproduces a speech such as "turn right at the next corner" on the basis of identification information transmitted from the service center 19.

Furthermore, the portable terminal 31 transmits information on a posture of the portable terminal 31 to the service center 19, while the service center 19 notifies the user of the target so that a desired speech file is reproduced and given to the user. In addition to the earth magnetism sensor 11b, the inclination angle of the portable terminal 31 is taken into consideration, thus realizing a service.

Accordingly, the terminal position is measured by the GPS module 11c and the retrieval vector V is measured by the earth magnetism sensor 11b and the inclination sensor 31c, thereby detecting a direction of the portable terminal 31 in three dimensions.

Furthermore, taking into consideration the data by the inclination sensor 11a in addition to the data by the earth magnetism sensor 11b, the measurement value obtained by the detecting section 21a is corrected appropriately. Therefore, it is possible to register a position with higher accuracy.

Still furthermore, not only when the user moving speed is high but also when the user is moving at a low speed or is in a stopping condition, it is possible to seize the user's moving direction.

Figure 44:
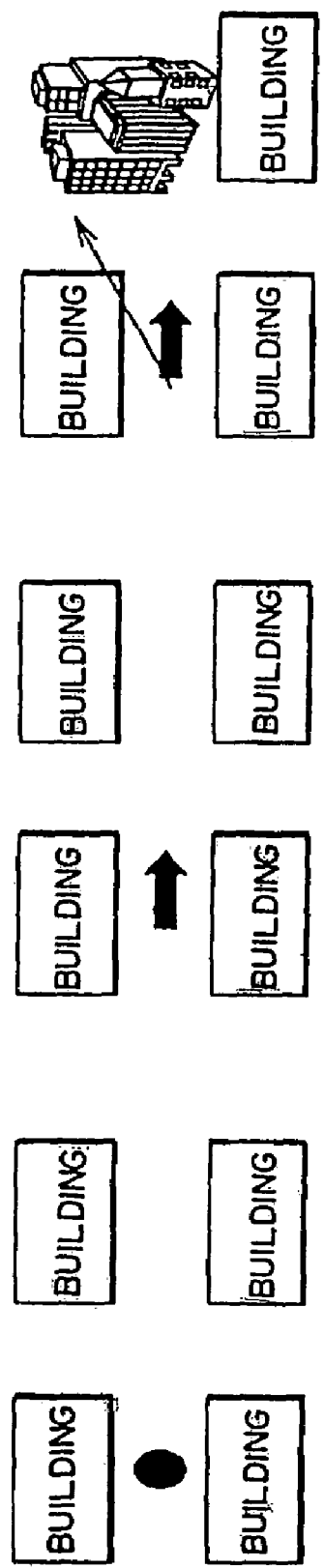
FIGS. 44(a) to 44(c) are illustrations useful for describing posture detection of the portable terminal according to the third embodiment of the invention.
Figure 45:
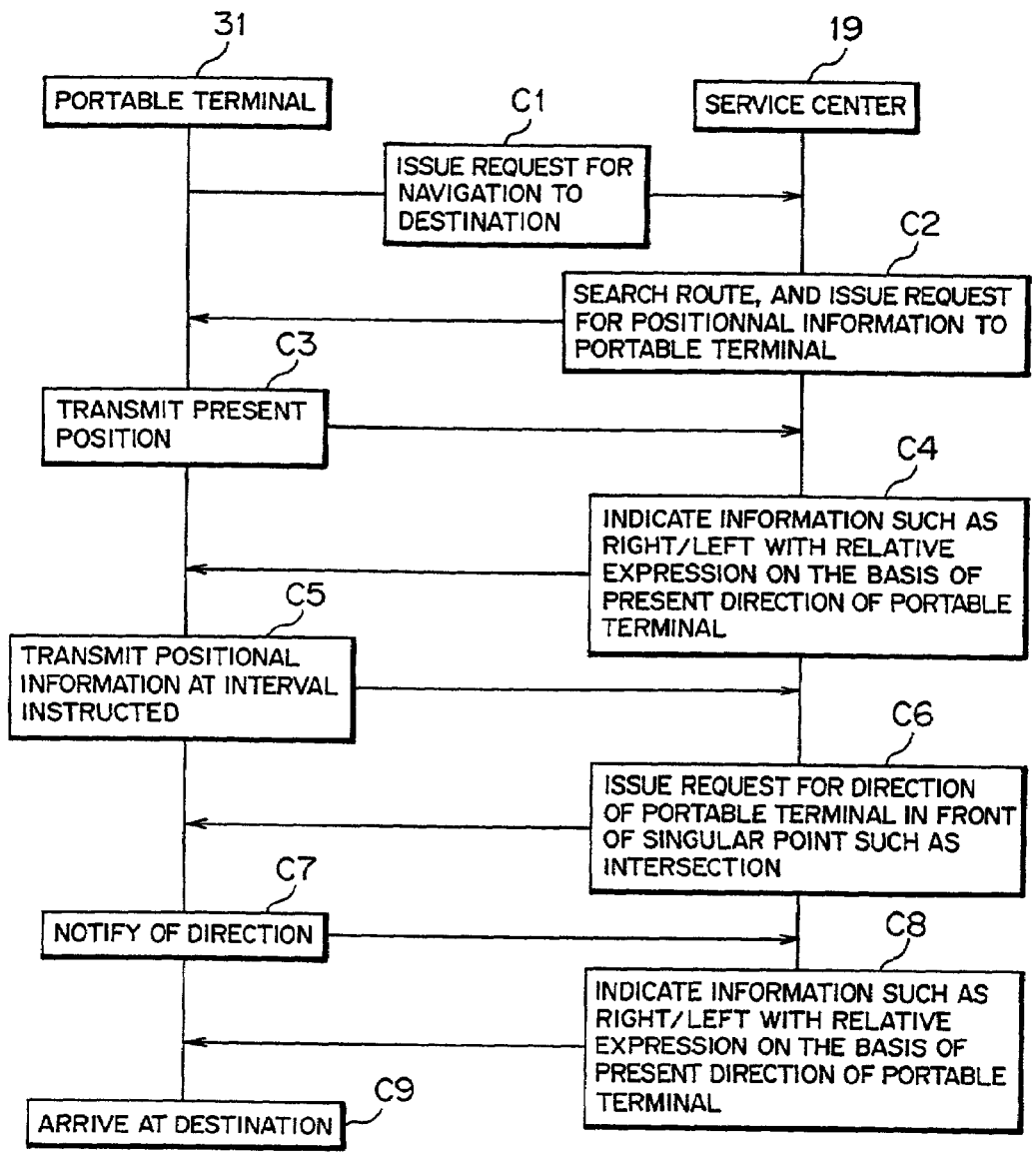
FIG. 45 is a sequence illustration of an example of a service according to the third embodiment of the invention.

Referring to FIGS. 44 and 45, a detailed description will be given hereinbelow of a service method based on the above-described configuration according to the third embodiment of the present invention.

FIG. 44 is useful for explaining a posture detection of a portable terminal according to the third embodiment of the present invention, where a user is moving between buildings (indicated by rectangles).

In FIG. 44 the absolute position of a portable terminal detected by a GPS module and then indicated by a black circle.

FIG. 44 the front direction of the portable terminal is indicated by an arrow. This direction is detected my an earth magnetism sensor and a hand-in-use discriminating sensor, as have been previously described.

An inclination angle, shown as an arrow indicating direction to a building, of the portable terminal is detected by an inclination sensor as previously described.

FIG. 45 is a sequence illustration of an example of a service according to the third embodiment of the present invention. In FIG. 45, first, the portable terminal 31 issues a request for a navigation to a desired destination toward the service center 19 (step C1), and the service center 19 retrieves a route and issues a request for positional information to the portable terminal 31 (mobile unit) (step C2), while the portable terminal 31 transmits the present positional information to the service center 19 (step C3).

In addition, the service center 19 provides information on indication to the right or left by a speech of relative expression on the basis of the present direction of the portable terminal 31 (step C4), while the portable terminal 31 transmits, to the service center 19, positional information at an interval instructed by the service center 19 (step C5).

Still additionally, the service center 19 issues, to the portable terminal 31, a request for transmission of information on the direction of the portable terminal 31 in front of a singular point such as an intersection (step C6), and the portable terminal 31 notifies the service center 19 of the direction (step C7).

Moreover, the service center 19 gives information on indication to the right or left with relative expression on the basis of the present direction of the portable terminal 31 (step C8) so that the portable terminal 31 reaches the destination (step C9).

In this way, the user can efficiently arrive at a desired place owing to the automatic detection of the information on each of the earth magnetism, the direction, the GPS information, the inclination angle and the user's hand in use and the interchange of data between the portable terminal 31 and the service center 19.

Meanwhile, it is also acceptable to previously register the right or left in the database 15 in place of detecting the user's hand in use.

Figure 46:
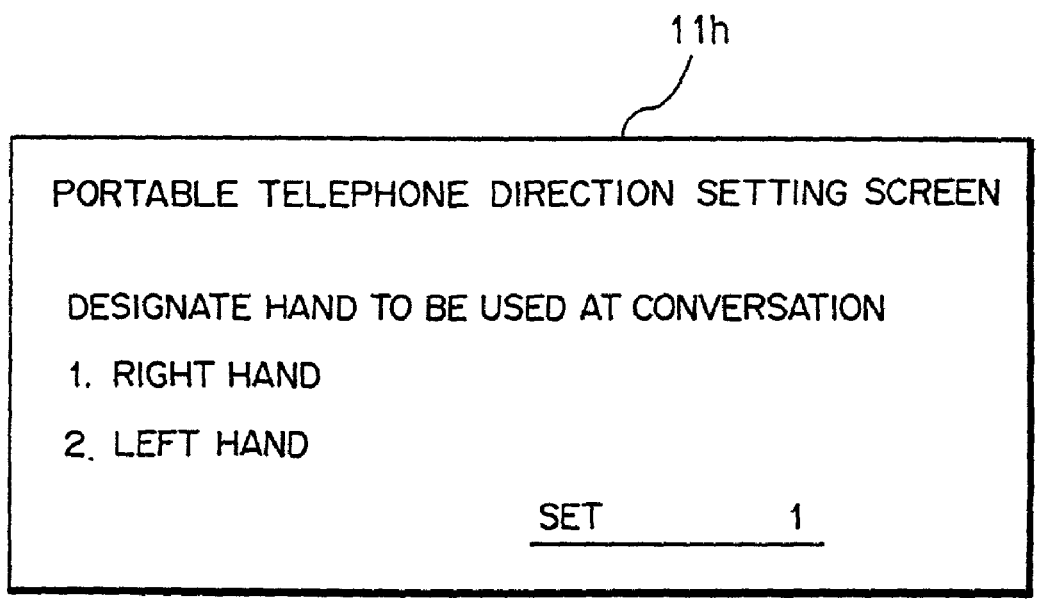
FIG. 46 is an illustration useful for describing another hand-in-use discriminating method according to the third embodiment of the invention.

FIG. 46 is an illustration useful for explaining another hand-in-use discriminating method according to the third embodiment of the present invention. In FIG. 46, a display (display section 11h) of a setting screen takes place to a user, and the user sets the using hand. That is, the portable terminal 31 makes a display for the designation of the using hand at conversation, and the user selects the hand.

Thus, not only when the user moving speed is high but also when the user is moving at a low speed or is in a stopping condition, it is possible to seize the user moving direction.

In addition, the user can receive such a service without preparing high-priced equipment.

Still additionally, as described above, since a service takes place between the portable terminal 11 and the service center 19, a restaurant can realize a service without using special equipment.

Moreover, in this way, the bubble data is registered, and the user designates the value of the bubble diameter for retrieval, and hence, a system operating enterprise (for example, a content provider) can sell a specified spatial range to enterprise in view of enterprise's propagation. The price thereof can be calculated on the basis of the spatial occupancy information and the bubble diameter.

Thus, the system 9 uses expression such as "go toward the north", "relatively right/left" and "somewhat right/forward/backward" without using expression hard to understand to human beings; therefore, it is possible to accomplish a navigation with an analog sensation matching with human sensation.

(C1) Description of Modification of Third Embodiment of the Invention

According to the third embodiment, the portable terminal 31 can use a data communication terminal having only a data communication function in addition to a portable telephone capable of making voice communication.

That is, a data communication terminal (not shown) according to this modification is connected through a network 12 to a service center 19 and is designed to display service information attached to information, and is made up of the aforesaid detecting section, second transmitting section 22a, second receiving section 22b and displaying section 11h.

In addition, the data communication terminal according to this modification includes a voice guide section 23 to conduct, through the use of a predetermined speech file, a navigation to the place of a service information providing subject to be retrieved, received in the second receiving section 22b.

Thus, as well as the above-described portable terminal 31, the data communication terminal transmits information on its posture to the service center 19, while the service center 19 notifies a user of a target so that a desired speech file is reproduced and given to the user.

Accordingly, since a retrieval is made on the basis of the registered bubble data, a system operating enterprise can advise enterprise advertisement.

Therefore, it is possible to accomplish a navigation with an analog sensation matching with human sensation without using expression hard to understand to the human beings.

(D) Others

It should be understood that the present invention is not limited to the above-described embodiments and modifications thereof, and that it is intended to cover all changes of the embodiments and the modifications, which do not constitute departures from the spirit and scope of the invention.

The assorted information related to an object can cover, in addition to the above-stated things, city halls, parks, recreation grounds, historical buildings, natural mountains and others. In this connection, the service information related to the assorted information can also cover life information, time information on opening to the public, time information on vacancy of attraction, history explanation, sight-seeing information and others.

In addition, the detecting section 21 (21a) can also be provided in the exterior of the portable terminal 11 (31, 41). In this case, the detecting section 21 (21a) detects positional information including a latitude of an object to be detected, a longitude thereof, an altitude thereof, a direction thereof and an inclination angle thereof. Still additionally, in this case, the positional information on the object to be detected is not limited to latitude, longitude, altitude, direction and inclination angle.

Furthermore, the database 15 can also retain information on celestial sphere such as constellations as the spatial range information in a three-dimensional space to provide these information on celestial sphere as the service information. Still furthermore, in addition to the above-mentioned information, the inscription contents of the database 15 can be altered diversely according to design plan.

Moreover, it is also possible to use, in place of the above-mentioned URL, a URI (Uniform Resource Identifier) or a URN (Uniform Resource Name) as an address. As well known, the URI is a name having http, given uniformly to the resources of the internet 12. For example, it is an IP address representative of a computer forming a resource of the internet 12. In the URL, before a URI representative of a resource of the internet 12, is put a protocol used for that resource. A format thereof is such that "protocol: URI", for example, http://130. *, ftp://130. *, gopher://130. ***. Incidentally, the URN represents a sole address.

The portable terminal 11 (portable terminal 31 or portable terminal 41') can gain access through the radio network 10 to the service center 19 without charge according to subscriber contract with a system operating enterprise or advertisement.

In addition, the user terminal is not limited to a portable telephone or a data communication terminal, even a portable personal computer having a radio transmitter/receiver is also feasible. Accordingly, it is possible to employ a personal computer, a portable telephone and a data communication terminal for the registration in FIG. 15. Incidentally, it is also appropriate that, in FIG. 15, the map information is recorded on a recording medium such as a hard disk or a CD-ROM (Compact Disc-Read Only Memory) and fetched therefrom.

In the first embodiment, in the retrieval condition, if manufactured or natural things exist before or after a retrieval subject designated by a user, it is also possible to display these additionally, and to display a list in a state where the number of things to be displayed is limited.

Moreover, in the third modification of the first embodiment, in a case in which the person 53 registers his/her own positional information, it is possible to prevent missing or to manage the destinations of the family being out.

Still moreover, in the fourth modification of the first embodiment, in a concert hall, it is also possible to register performance tunes or information on the tunes as the bubble data.

In addition, a system operating enterprise can also operate the system 9 (9a) with not only a three-dimensional information but also a plane two-dimensional information.

In this case, the system operating enterprise registers a region (area) to the database 15 on the basis of a latitude of an object such as a building and so on, a longitude thereof and a bubble diameter thereof within a positional information (latitude, longitude, altitude, bubble diameter).

And the extracting section 40 extracts a specified URL on the basis of positional information including a latitude of the portable terminal 11 (31, 41'), a longitude thereof, an altitude thereof and a direction thereof within a positional information (latitude, longitude, altitude, direction and inclination angle) transmitted from the portable terminal 11 (31, 41').

In short, a bubble data is retrieved using a direction of a portable terminal 11 (31, 41') and a inclination angle of the portable terminal 11 (31, 41') has become no relationship between the retrieval.

Consequently, a server according to the present invention, in a system 9 (9a) which provides information to a portable terminal 11 (31, 41'), comprises a database 15 for retaining bubble data in which region range information (area range information) in a two-dimensional space is associated with retrieval information (URL) for obtaining service information to be provided, an extracting section 40 for extracting, on the basis of positional information transmitted from the portable terminal 11 (31, 41'), specified retrieval information (specified URL) corresponding to specified region range information including the positional information, of the region range information retained in the database 15, and a providing section 41 for providing, to the portable terminal 11 (31, 41'), specified service information corresponding to the specified retrieval information extracted in the extracting section 41.

What is claimed is:

1. A user terminal for use in a system which provides information to said user terminal, said user terminal comprising:
   a detecting section for detecting positional information including a latitude of an object, a longitude thereof, a direction thereof and an inclination angle thereof;
   a transmitting section for transmitting said positional information, detected in said detecting section, to a server;
   a receiving section for receiving, in connection with said positional information transmitted from said transmitting section, specified service information corresponding to specified spatial range information including said positional information, of spatial range information comprising a latitude of an object, a longitude thereof and a bubble diameter thereof in a three-dimensional space transmitted from said server and a pair of the latitude and longitude is a center point of the spatial range, and the bubble diameter is a radius of the spatial range; and
   a displaying section for displaying said specified service information received in said receiving section.

2. A user terminal for use in a system which provides information to said user terminal, said user terminal comprising:
   a detecting section for detecting a piece of positional information about an object;
   a transmitting section for transmitting said positional information piece detected in said detecting section to a server;
   a receiving section for receiving a piece of service information transmitted from said server in response to the positional information from said transmitting section, the service information piece being associated with a spatial range information, which specifies a spatial range including a position according with the positional information in a space and includes a latitude of an object, a longitude thereof and a bubble diameter thereof in the space, and a pair of the latitude and longitude is a center point of the spatial range, and the bubble diameter is a radius of the spatial range;
   a displaying section for displaying the service information received by said receiving section; and
   a voice guide section for conducting a guide using a speech file to a place relating to the service information received by said receiving section.

3. A server for use in a system which provides information to a user terminal, said server comprising:
   a database for retaining a plurality of pieces of bubble data, each of the bubble data pieces including:
      a piece of spatial range information, which specifies a spatial range in a space and includes a latitude of an object, a longitude thereof and a bubble diameter thereof in the space, and a pair of the latitude and longitude is a center point of the spatial range, and the bubble diameter is a radius of the spatial range, and
      a piece of retrieval information, which is associated with the spatial range information piece and is linked to a piece of service information;
   an extracting section, responsive to a piece of positional information transmitted from the user terminal, for retrieving from said database a spatial range information piece whose spatial range includes a position that accords with the positional information piece, and extracting a retrieval information piece associated with the retrieved spatial range information piece from said database; and
   a providing section for providing the user terminal with a service information piece linked with the retrieval information extracted by said extracting section.

4. A server according to claim 3, wherein said database sets an address based on said spatial range information as an electronic mail address, and retains said spatial range information in corresponding relation to said electronic mail address.

5. A server according to claim 3, wherein said database retains, as said bubble data, service information on a public transportation terminal and information on transportation time.

6. A server according to claim 5, wherein said database updates said information on transportation time according to the present time.

7. A server for a system according to claim 3, wherein said piece of spatial range information, specifies a spatial range in a two-dimensional space.

8. A server for a system according to claim 3, wherein said piece of spatial range information, specifies a spatial range in a three-dimensional space.

9. A server for use in a system which provides information to a user terminal, said server comprising:
   a database for retaining a plurality of pieces of bubble data, each of the bubble data pieces including:
      a piece of spatial range information, which specifies a spatial range in a space and includes a latitude of an object, a longitude thereof and a bubble diameter thereof in the space, and a pair of the latitude and longitude is a center point of the spatial range, and the bubble diameter is a radius of the spatial range, and an address associated with the spatial range information piece and linked to a piece of service information relating to the object;

an extracting section, responsive to a piece of positional information that is transmitted from the user terminal and includes a latitude of the user terminal, a longitude thereof, a direction thereof and an inclination angle thereof, for retrieving from said database a spatial range information piece whose spatial range includes a position that accords with the positional information piece, and extracting an address associated with the retrieved spatial range information from said database; and a providing section for providing the user terminal with a service information piece linked with the address extracted by said extracting section.

10. A server according to claim 9, wherein said database is designed to sequentially update said bubble diameter of said bubble data on the basis of said positional information transmitted from a moving object.

11. A server for use in a system which provides information to a user terminal, said server comprising:

a database for retaining a plurality of pieces of bubble data, each of the plural bubble data pieces including:

a piece of spatial range information, which specifies a spatial range in a space and includes a latitude of a building, a longitude thereof and a bubble diameter thereof in the space, and a pair of the latitude and longitude is a center point of the spatial range, and the bubble diameter is a radius of the spatial range, and a uniform resource locator, which is associated with the spatial range information piece and is linked to a piece of service information related to the facility;

an extracting section, responsive to a piece of positional information that is transmitted from the user terminal and includes a latitude of the user terminal, a longitude thereof, a direction thereof and an inclination angle thereof, for retrieving from said database a spatial range information piece whose spatial range includes a position that accords with the positional information piece, and extracting a uniform resource locator associated with the retrieved bubble data piece from said database; and a providing section for providing the user terminal with a service information piece linked with the uniform resource locator extracted by said extracting section.

12. A server according to claim 11, further comprising a web information outputting section for holding user information and an address generating section for generating an address retaining said user information held in said web information output section.

13. A server for use in a system which provides information to a user terminal, said server comprising:

a database for retaining a plurality of pieces of bubble data, each of the bubble data pieces including:

a piece of spatial range information, which specifies a spatial range in a space and includes a latitude of a target, a longitude thereof and a bubble diameter thereof in the space, and a pair of the latitude and longitude is a center point of the spatial range, and the bubble diameter is a radius of the spatial range, and an address associated with the spatial range information piece and linked to a piece of message information retained in a range of the bubble diameter;

an extracting section, responsive to a piece of positional information that is transmitted from said user terminal and includes a latitude of said user terminal, a longitude thereof, a direction thereof and an inclination angle thereof, for retrieving from said database a spatial range information piece whose spatial range includes a position that accords with the positional information piece, and extracting a message information piece associated with the retrieved bubble data piece from said database; and a providing section for providing the user terminal with the message information extracted by said extracting section.

14. An information providing service method for use in a system which provides information to a user terminal, said method comprising:

a map information acquiring step in which a communication terminal acquires map information;

a service providing place selecting step in which said communication terminal selects a desired service providing place from said map information acquired in said map information acquiring step; and a generating step in which a server connected through a network to said communication terminal generates bubble data in association with said place selected in said service providing place selecting step, wherein said bubble data having a piece of spatial range information, which specifies a spatial range in a space and includes a latitude of an object, a longitude thereof and a bubble diameter thereof in the space, and a pair of the latitude and longitude is a center point of the spatial range, and the bubble diameter is a radius of the spatial range; and a registering step in which the server writes, in a database the bubble data generated in a generating step related to a service information to provide the service information to said user terminal.

15. An information providing service method for use in a system which has a server and a user terminal and provides information from said server to said user terminal, wherein said server includes a database for retaining a plurality of pieces of bubble data, each of the bubble data pieces having a piece of spatial range information, which specifies a spatial range in a space and includes a latitude of an object, a longitude thereof and a bubble diameter thereof in the space, and a pair of the latitude and longitude is a center point of the spatial range, and the bubble diameter is a radius of the spatial range, and a piece of retrieval information, which is associated with the spatial range information piece and is linked to a piece of service information, said method comprising:

a measuring step in which said user terminal measures positional information including its own latitude, longitude, direction and inclination angle;

a measured information transmitting step in which said user terminal transmits to said server said positional information measured in said measuring step and a retrieval condition;

a retrieving step in which, responsive to said positional information transmitted in said measured information transmitting step, said server retrieves from said database a service information piece whose spatial range includes a position that accords with the positional information piece, and extracts a retrieval information piece associated with the retrieved spatial range information piece from said database; and a retrieval result notifying step in which said server notifies said user terminal of the service information extracted in said retrieving step.

16. An information providing service method according to claim 15, further comprising, after said retrieval result notifying step, a selected information transmitting step in which said user terminal transmits, of said plurality of specified service information notified in said retrieval result notifying step, service information selected by a user to said server and a displaying step in which said user terminal displays said service information selected in said selected information transmitting step.

17. An information providing service method according to claim 15, wherein said retrieval result notifying step is made to give, to a user, information including characters, images or voice on a subject to be retrieved.

18. An information providing service method, for use in a system which has a server and a user terminal and provides information from said server to said user terminal, wherein said server includes a database for retaining a plurality of pieces of bubble data, each of the bubble data pieces having a piece of spatial range information, which specifies a spatial range in a space, and a piece of retrieval information, which is associated with the spatial range information piece and is linked to a piece of service information, said method comprising:

a measuring step in which said user terminal measures positional information including its own latitude, longitude, altitude, direction and inclination angle;

a measured information transmitting step in which said user terminal transmits to said server said positional information measured in said measuring step and a retrieval condition;

a retrieving step in which, responsive to said positional information transmitted in said measured information transmitting step, said server retrieves from said database a service information piece whose spatial range includes a position that accords with the positional information piece, and extracts a retrieval information piece associated with the retrieved spatial range information piece from said database; and a retrieval result notifying step in which said server notifies said user terminal of the service information extracted in said retrieving step wherein said retrieving step includes:

an extracting step of extracting a second information bubble from a plurality of information bubbles representative of images of spatial occupancy information of bubble data on the basis of said positional information and said spatial range information of said bubble data;

an address extracting step of selecting a third information bubble from said second information bubble extracted in said extracting step, and of extracting a uniform resource locator corresponding to said third information bubble; and a selecting step of selecting and outputting said specified service information corresponding to said uniform resource locator extracted in said address extracting step.

19. An information providing service method according to claim 18, wherein, in said retrieving step, an intersection information bubble intersecting a retrieval vector representative of a direction of said user terminal toward a subject to be retrieved is extracted as said second information bubble from said plurality of information bubbles.

20. An information providing service method according to claim 19, wherein said extracting step is made to extract a bubble, positioned in a direction of the retrieval vector, as said second information bubble from said plurality of information bubbles, and said selecting step is made to output all said second information bubbles.

21. An information providing service method according to claim 20, wherein said selecting step is made to output, of said second information bubble, a bubble existing in a predetermined range.

22. An information providing service method according to claim 19, wherein said extracting step is made to extract, as said second information bubble, the first visible object of objects in a direction said user terminal takes, through the use of map data.

23. An information providing service method according to claim 19, wherein said extracting step is made to extract said second information bubble taking configuration and location of a subject to be retrieved into consideration.

24. An information providing service system which has a server and a user terminal and provides information from said server to said user terminal:

said server comprising:

a database for retaining a plurality of pieces of bubble data, each of the bubble data pieces having a piece of spatial range information, which specifies a spatial range in a space and includes a latitude of an object, a longitude thereof and a bubble diameter thereof in the space, and a pair of the latitude and longitude is a center point of the spatial range, and the bubble diameter is a radius of the spatial range, and a piece of retrieval information, which is associated with the spatial range information piece and is linked to a piece of service information, an extracting section, responsive to a piece of positional information transmitted from the user terminal, for retrieving from said database a spatial range information piece whose spatial range includes a position that accords with the positional information piece, and extracting a retrieval information piece associated with the retrieved spatial range information piece from said database, and a providing section for providing the user terminal with a service information piece linked with the retrieval information extracted by said extracting section;

said user terminal comprising a detecting section for detecting a piece of positional information about an object, a transmitting section for transmitting said positional information piece detected in said detecting section to a server, a receiving section for receiving the service information piece transmitted from said server in response to the positional information from said transmitting section, and a displaying section for displaying the service information received by said receiving section.

25. An information providing service system according to claim 24, wherein said transmitting section transmits, to said server, a user's viewing direction detected on the basis of an inclination angle of said user terminal with respect to a horizontal line, while said server retrieves a desired subject on the basis of said viewing direction.

* * * * *